US012764617B2

(12) United States Patent
Wu et al.

(10) Patent No.: US 12,764,617 B2
(45) Date of Patent: Oct. 13, 2026

(54) CONDITIONAL CONFIGURATION IN A DISTRIBUTED BASE STATION

(71) Applicant: GOOGLE LLC, Mountain View, CA (US)

(72) Inventors: Chih-Hsiang Wu, Taoyuan (TW); Jing Hsieh, Taipei (TW)

(73) Assignee: GOOGLE LLC, Mountain View, CA (US)

( * ) Notice: Subject to any disclaimer, the term of this patent is extended or adjusted under 35 U.S.C. 154(b) by 519 days.

(21) Appl. No.: 17/760,095

(22) PCT Filed: Feb. 3, 2021

(86) PCT No.: PCT/US2021/016274
§ 371 (c)(1),
(2) Date: Aug. 3, 2022

(87) PCT Pub. No.: WO2021/158577
PCT Pub. Date: Aug. 12, 2021

(65) Prior Publication Data
US 2023/0045700 A1 Feb. 9, 2023

Related U.S. Application Data

(60) Provisional application No. 62/976,333, filed on Feb. 13, 2020, provisional application No. 62/969,621, filed on Feb. 3, 2020.

(51) Int. Cl.
*H04W 36/00* (2009.01)
*H04W 36/08* (2009.01)
*H04W 36/36* (2009.01)

(52) U.S. Cl.
CPC ... *H04W 36/00698* (2023.05); *H04W 36/087* (2023.05); *H04W 36/362* (2023.05)

(58) Field of Classification Search
CPC ......... H04W 36/00698; H04W 36/087; H04W 36/362
See application file for complete search history.

(56) References Cited

U.S. PATENT DOCUMENTS

2014/0024376 A1 1/2014 Suga
2014/0045502 A1 2/2014 Whinnett et al.
(Continued)

FOREIGN PATENT DOCUMENTS

EP 3 911 018 A1 11/2021
WO WO-2018/194326 A1 10/2018
(Continued)

OTHER PUBLICATIONS

Google, "CU to DU RRC Info Usage in UE Context Setup for Handover," 3GPP Draft (2019).
(Continued)

*Primary Examiner* — Fred A Casca
(74) *Attorney, Agent, or Firm* — MARSHALL, GERSTEIN & BORUN LLP

(57) ABSTRACT

To configure a UE, a DU of a distributed base station receives, from a central unit (CU) of the distributed base station, a UE context request message including a conditional indication related to a conditional procedure (2202); generates, and in response to the conditional indication, configuration information related to the conditional procedure (2220); and transmits, to the CU, a UE context response message including the configuration information (2216).

16 Claims, 28 Drawing Sheets

(56) References Cited

U.S. PATENT DOCUMENTS

| | | | | |
|---|---|---|---|---|
| 2018/0160336 | A1 | 6/2018 | Dai et al. | |
| 2018/0279193 | A1 | 9/2018 | Park et al. | |
| 2020/0059395 | A1* | 2/2020 | Chen | H04W 28/082 |
| 2020/0154330 | A1 | 5/2020 | Paladugu et al. | |
| 2021/0337443 | A1* | 10/2021 | Chang | H04W 36/0058 |
| 2022/0070740 | A1* | 3/2022 | Futaki | H04W 36/0077 |
| 2022/0086704 | A1* | 3/2022 | Futaki | H04W 76/15 |

FOREIGN PATENT DOCUMENTS

| | | | |
|---|---|---|---|
| WO | WO-2019/096396 | A1 | 5/2019 |
| WO | WO-2019/139517 | A1 | 7/2019 |

OTHER PUBLICATIONS

Office Action for European Application No. 21707869.0, dated Feb. 21, 2025.

"3rd Generation Partnership Project; Technical Specification Group Radio Access Network; NG-RAN; F1 Application Protocol (F1AP) (Release 16)," 3GPP Draft (2020).

Ericsson et al., "Conditional Handover-Disaggregated gNB Impact," 3GPP Draft (2019).

International Search Report and Written Opinion for Application No. PCT/US2021/016274, dated May 25, 2021.

Samsung, "Introducing CHO Indication to gNB-DU and bNB-CU-UP," 3GPP Draft (2019).

Samsung, "TP for NR Mob enh BL CR for TS 38.473): Introducing CHO Indication over F1," 3GPP Draft (2019).

First Examination Report for India Application No. 202247046684, dated Nov. 29, 2022.

CATT, "Draft stage-2 CR for Conditional PSCell Addition/ Change," 3GPP TSG-RAN2 Meeting #108 (2019).

Ericsson, "Running CR for Introduction of Even futher Mobility enhancement in E-UTRAN," 3GPP TSG-RAN2 Meeting #108 (2019).

Intel Corporation, "RRC running CR for NR mobility on CHO ( [107bis#54])," 3GPP TSG-RAN WG2 Meeting #108 (2019).

* cited by examiner

CONDITIONAL CONFIGURATION IN A DISTRIBUTED BASE STATION

This disclosure relates generally to wireless communications and, more particularly, to concurrently managing respective configuration for immediate and conditional procedures.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides signaling radio bearers (SRBs) and data radio bearers (DRBs) to the Radio Resource Control (RRC) sublayer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs using the lower-layer resources of only the MN can be referred as MCG DRBs, DRBs using the lower-layer resources of only the SN can be referred as SCG DRBs, and DRBs using the lower-layer resources of both the MCG or and the SCG can be referred to as split DRBs.

The UE in some scenarios can concurrently utilize resources of multiple RAN nodes (e.g., base stations or components of a distributed base station), interconnected by a backhaul. When these network nodes support different radio access technologies (RATs), this type of connectivity is referred to as Multi-Radio Dual Connectivity (MR-DC). When a UE operates in MR-DC, one base station operates as a master node (MN) that covers a primary cell (PCell), and the other base station operates as a secondary node (SN) that covers a primary secondary cell (PSCell). The UE communicates with the MN (via the PCell) and the SN (via the PSCell). In other scenarios, the UE utilizes resources of one base station at a time. One base station and/or the UE determines that the UE should establish a radio connection with another base station. For example, one base station can determine to hand the UE over to the second base station, and initiate a handover procedure.

3GPP technical specifications (TS) 36.300 and 38.300 describes procedures for handover (or called reconfiguration with sync) scenarios. These procedures involve messaging (e.g., RRC signaling and preparation) between RAN nodes that generally causes latency, which in turn increases the probability of handover procedures. These procedures do not involve conditions associated with the UE, and can be referred to as "immediate" handover procedures. R2-1914640 and R2-1914834 describes procedures for conditionally handover scenarios.

3GPP specification TS 37.340 (v16.0.0) describes procedures for a UE to add or change an SN in DC scenarios. These procedures involve messaging (e.g., RRC signaling and preparation) between radio access network (RAN) nodes. This messaging generally causes latency, which in turn increases the probability that the SN addition or SN change procedure will fail. These procedures, which do not involve conditions that are checked at the UE, can be referred to as "immediate" SN addition and SN change procedures.

UEs can also perform handover procedures to switch from one cell to another, whether in single connectivity (SC) or DC operation. The UE may handover from a cell of a first base station to a cell of a second base station, or from a cell of a first distributed unit (DU) of a base station to a cell of a second DU of the same base station, depending on the scenario. 3GPP specifications 36.300 v16.0.0 and 38.300 v16.0.0 describe a handover procedure that includes several steps (RRC signaling and preparation) between RAN nodes, which causes latency in the handover procedure and therefore increases the risk of handover failure. This procedure, which does not involve conditions that are checked at the UE, can be referred to as an "immediate" handover procedure.

More recently, for both SN or PSCell addition/change and handover, "conditional" procedures have been considered (i.e., conditional SN or PSCell addition/change and conditional handover). Unlike the "immediate" procedures discussed above, these procedures do not add or change the SN or PSCell, or perform the handover, until the UE determines that a condition is satisfied. As used herein, the term "condition" may refer to a single, detectable state or event (e.g., a particular signal quality metric exceeding a threshold), or to a logical combination of such states or events (e.g., "Condition A and Condition B," or "(Condition A or Condition B) and Condition C", etc.).

To configure a conditional procedure, the RAN provides the condition to the UE, along with a configuration (e.g., a set of random-access preambles, etc.) that will enable the UE to communicate with the appropriate base station, or via the appropriate cell, when the condition is satisfied. For a conditional addition of a base station as an SN or a candidate cell as a PSCell, for example, the RAN provides the UE with a condition to be satisfied before the UE can add that base station as the SN or that candidate cell as the PSCell, and a configuration that enables the UE to communicate with that base station or PSCell after the condition has been satisfied.

UE in some cases can receive a configuration for a conditional procedure and, prior to detecting a condition for applying the configuration, receives a message related to an immediate procedure. For example, the UE can receive a conditional configuration related to a candidate base station and receive a command to hand over to a different, target base station. Currently, the UE releases all conditional configuration in response to a message related to an immediate procedure, regardless of whether the RAN provides a release indicator for the conditional configuration (see R2-1914834 mentioned above). This approach however prevents the RAN from configuring the UE with both an immediate procedure and a conditional procedure, which in turn can prevent the RAN from providing the UE with a robust mobility configuration.

Moreover, an immediate procedure can fail. When the conditional configuration is released and immediate procedure fails, the UE no longer has the conditional configuration for connecting to the candidate cell.

SUMMARY

A base station of this disclosure provides conditional configuration for a conditional procedure in a message related to an immediate procedure, directly to a UE or to another base station that communicates with the UE. The UE attempts to perform the immediate procedure and subsequently applies the conditional configuration. The immediate procedure in these scenarios is related to a target cell, and the conditional procedure is related to a candidate cell.

The target cell and the candidate cell can be associated with the same non-distributed base station, different distributed units (DUs) of the same distributed base station, or different base stations.

In some cases, the UE completes the immediate procedure to connect to the target cell and, after successfully completing the immediate procedure, begins to evaluate the one or more conditions for applying the conditional configuration for connecting to the candidate cell. In other cases, the UE fails to complete the immediate procedure and begins to evaluate the one or more conditions for applying the conditional configuration for connecting to the candidate cell after the failure of the immediate procedure. According to some implementations, after the UE fails to complete the immediate procedure, the UE attempts to connect to the candidate cell in accordance with the conditional configuration regardless of whether the condition for applying the conditional procedure is satisfied.

The immediate and conditional procedures can include handover procedures, secondary node (SN) addition or change procedures, primary secondary cell (PSCell) addition or change procedures, etc. The message related to the immediate procedure and including conditional configuration in various implementations can be a handover command, an RRC reconfiguration command, an RRC container, etc.

An example embodiment of these techniques is a method in a base station operating in a RAN, for configuring a UE. The method can be executed by processing hardware and comprises determining that the UE is to connect to a target cell in the RAN in accordance with an immediate procedure; obtaining conditional configuration information including (i) a conditional configuration related to a candidate cell operating in the RAN, and (ii) a condition to be satisfied before the UE applies the conditional configuration; and transmitting a message related to the immediate procedure and including the conditional configuration.

Another example embodiment of these techniques is a base station including processing hardware and configured to implement the method above.

Still another example embodiment of these techniques is a method in a UE for mobility configuration. The method can be implemented by processing and comprises receiving, from a base station, a message associated with an immediate procedure for connecting to a target cell, the message including conditional configuration information with (i) a conditional configuration related to a candidate cell and (ii) a condition to be satisfied before the UE applies the conditional configuration during a conditional procedure; attempting to connect to the target cell in response to the message; and in response to determining that the condition is satisfied, connecting to the candidate cell in accordance with the conditional configuration.

BRIEF DESCRIPTION OF THE DRAWINGS

FIGS. 24-1 and 24-2 illustrate respective portions of a flow diagram of yet another example method for generating configuration for an immediate or a conditional procedure, which can be implemented in a DU of this disclosure.

DETAILED DESCRIPTION OF THE DRAWINGS

In accordance with the techniques discussed below, a base station provides a robust mobility configuration to a UE by transmitting configuration information for a conditional procedure along with an instruction to perform an immediate procedure. The UE retains the conditional configuration while executing the immediate procedure and, in some cases, performs the conditional procedure after completing the conditional procedure.

Figure 1A:
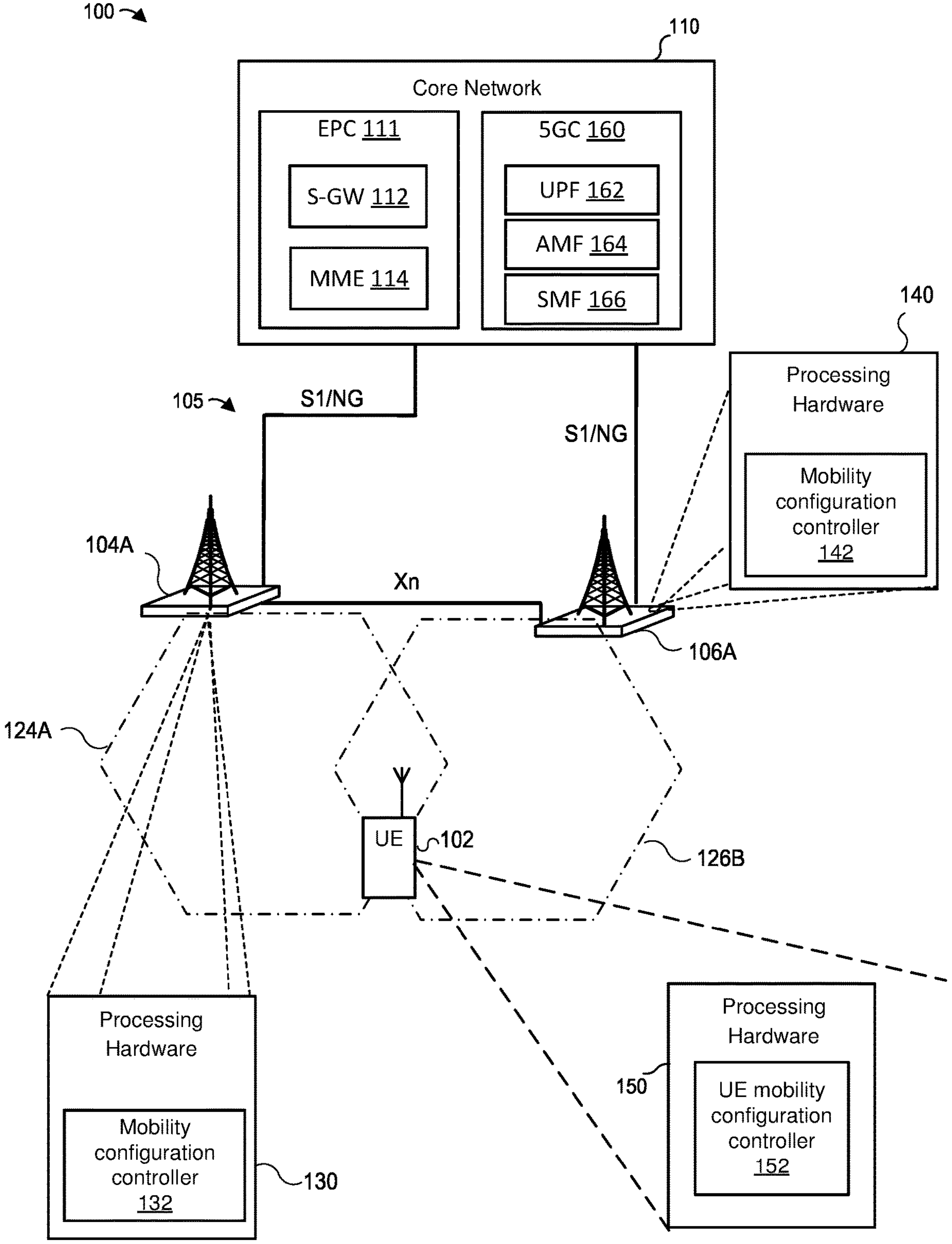
FIG. 1A is a block diagram of an example system in which a radio access network (RAN) and a user device can implement the techniques for managing concurrent immediate and conditional mobility configuration.
Figure 1B:
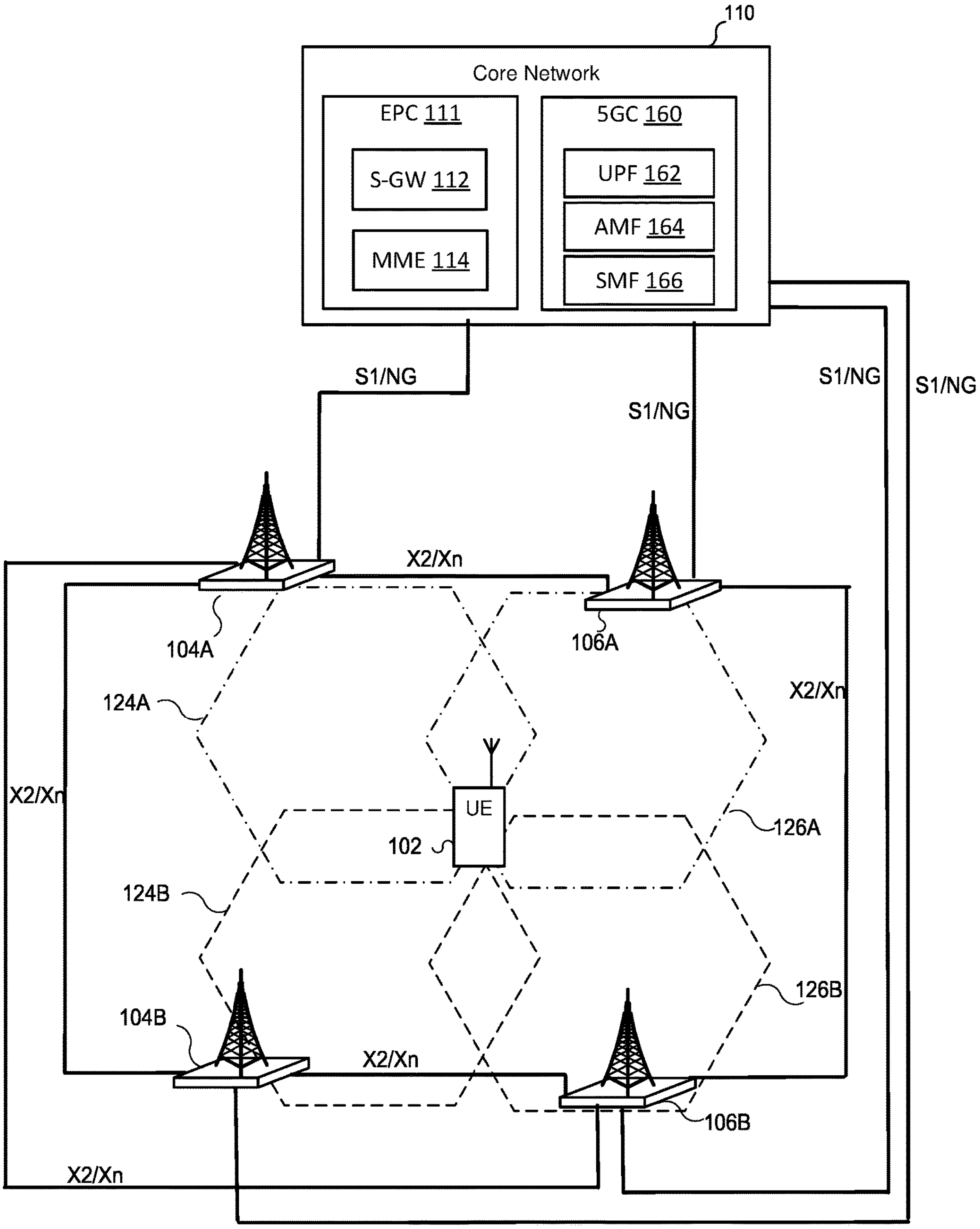
FIG. 1B is another block diagram of an example system in which a radio access network (RAN) and a user device can implement the techniques of this disclosure for managing concurrent immediate and conditional mobility configuration.
Figure 1C:
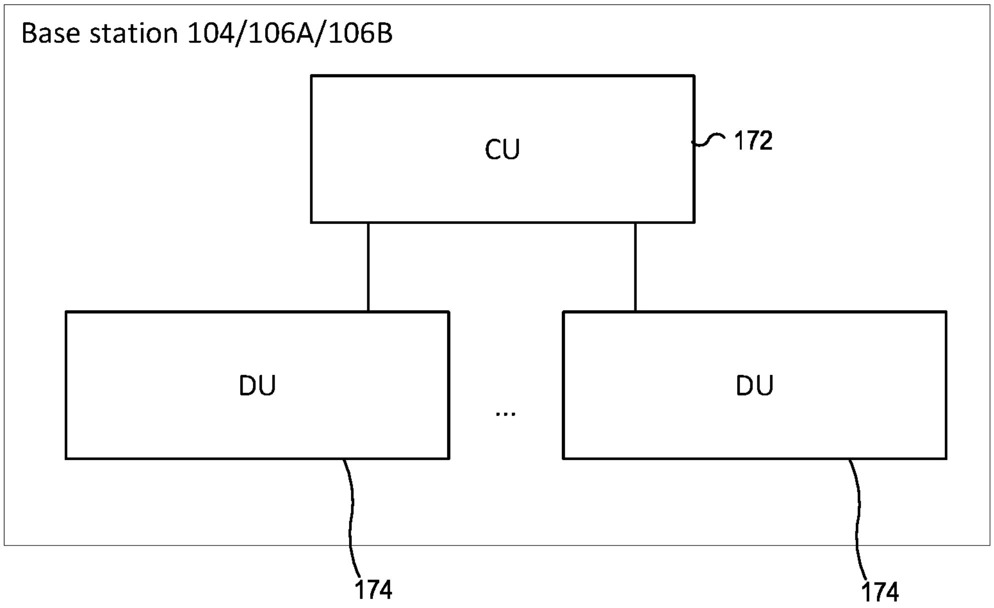
FIG. 1C is a block diagram of an example base station in which a centralized unit (CU) and a distributed unit (DU) that can operate in the system of FIG. 1A or FIG. 1B.

Prior to discussing the techniques the UE can implement to make this determination, example communication systems in which these techniques are considered with reference to FIGS. 1A-C.

Referring first to FIG. 1A, an example wireless communication system 100 includes a UE 102, a base station (BS) 104A, a base station 106A, and a core network (CN) 110. The base stations 104A and 106A can operate in a RAN 105 connected to the same core network (CN) 110. The CN 110 can be implemented as an evolved packet core (EPC) 111 or a fifth generation (5G) core (5GC) 160, for example.

Among other components, the EPC 111 can include a Serving Gateway (S-GW) 112 and a Mobility Management Entity (MME) 114. The S-GW 112 in general is configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1A, the base station 104A supports a cell 124A, and the base station 106A supports a cell 126A. The cells 124A and 126A can partially overlap, so that the UE 102 can communicate in DC with the base station 104A and the base station 106A operating as a master node (MN) and a secondary node (SN), respectively. To directly exchange messages during DC scenarios and other scenarios discussed below, the MN 104A and the SN 106A can support an X2 or Xn interface. In general, the CN 110 can connect to any suitable number of base stations supporting NR cells and/or EUTRA cells. An example configuration in which the EPC 110 is connected to additional base stations is discussed below with reference to FIG. 1B.

The base station 104A is equipped with processing hardware 130 that can include one or more general-purpose processors such as CPUs and non-transitory computer-readable memory storing machine-readable instructions executable on the one or more general-purpose processors, and/or special-purpose processing units. The processing hardware 130 in an example implementation includes a mobility configuration controller 132 configured to manage immediate configuration for an immediate procedure such as handover, PSCell addition or change, and SN addition or change, as well as conditional configuration for one or more conditional procedures such as CHO, CPAC, or CSAC, when the base station 104A operates as an MN.

The base station 106A is equipped with processing hardware 140 that can also include one or more general-purpose processors such as CPUs and non-transitory computer-readable memory storing machine-readable instructions executable on the one or more general-purpose processors, and/or special-purpose processing units. The processing hardware 140 in an example implementation includes a mobility configuration controller 142 configured to manage immediate configuration for an immediate procedure such as handover, PSCell addition or change, and SN addition or change, as well as conditional configurations for one or more conditional procedures such as CHO, CPAC, or CSAC, when the base station 106A operates as an SN.

Still referring to FIG. 1A, the UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes a UE mobility configuration controller 152 configured to manage immediate and conditional configuration for one or conditional procedures.

More particularly, the mobility configuration controllers 132, 142, and 152 can implement at least some of the techniques discussed with reference to the messaging and flow diagrams below to receive conditional configuration, release the conditional configuration in response to certain events, apply the conditional configuration, etc. Although FIG. 1A illustrates the mobility configuration controllers 132 and 142 as separate components, in at least some of the scenarios the base stations 104A and 106A can have similar implementations and in different scenarios operate as MN or SN nodes. In these implementations, each of the base stations 104A and 106A can implement both the mobility configuration controller 132 and the mobility configuration controller 142 to support MN and SN functionality, respectively.

In operation, the UE 102 can use a radio bearer (e.g., a DRB or an SRB) that at different times terminates at the MN 104A or the SN 106A. The UE 102 can apply one or more security keys when communicating on the radio bearer, in the uplink (from the UE 102 to a BS) and/or downlink (from a base station to the UE 102) direction. The UE in some cases can use different RATs to communicate with the base stations 104A and 106A. Although the examples below may refer specifically to specific RAT types, 5G NR or EUTRA, in general the techniques of this disclosure also can apply to other suitable radio access and/or core network technologies.

FIG. 1B depicts an example wireless communication system 100 in which communication devices can implement these techniques. The wireless communication system 100 includes a UE 102, a base station 104A, a base station 104B, a base station 106A, a base station 106B and a core network (CN) 110. The UE 102 initially connects to the base station 104A. The BSs 104B and 106B may have similar processing hardware as the base station 106A. The UE 102 initially connects to the base station 104A.

Immediate PSCell addition or change discussed below can involve changing the SN or not changing the SN. "CPAC" may refer to conditional PSCell addition or change with or without SN change. "CSAC" may refer to conditional SN addition or change. In some cases, a CPAC procedure involve only conditional PSCell change. For example, the UE in DC with an MN and an SN can receive a C-SN configuration for conditional PSCell change. In other scenarios, the CPAC may only involve conditional SN change. For example, a UE in DC with an MN and an SN can receive a C-SN configuration for conditional SN change to a C-SN.

In some scenarios, the base station 104A can perform immediate SN addition to configure the UE 102 to operate in dual connectivity (DC) with the base station 104A (via a PCell) and the base station 106A (via a PSCell other than cell 126A). The base stations 104A and 106A operate as an MN and an SN for the UE 102, respectively. The UE 102 in some cases can operate using the MR-DC connectivity mode, e.g., communicate with the base station 104A using 5G NR and communicate with the base station 106A using EUTRA, or communicate with the base station 104A using EUTRA and communicate with the base station 106A using 5G NR.

At some point, the MN 104A can perform an immediate SN change to change the SN of the UE 102 from the base station 106A (source SN, or "S-SN") to the base station 104B (target SN, or "T-SN") while the UE 102 is in DC with the MN 104A and the S-SN 106A. In another scenario, the SN 106A can perform an immediate PSCell change to change the PSCell of the UE 102 to the cell 126A. In one implementation, the SN 106A can transmit a configuration changing the PSCell to cell 126A to the UE 102 via a signaling radio bearer (SRB) (e.g., SRB3) for the immediate PSCell change. In another implementation, the SN 106A can transmit a configuration changing the PSCell to the cell 126A to the UE 102 via the MN 104A for the immediate PSCell change. The MN 104A may transmit the configuration immediately changing the PSCell to the cell 126A to the UE 102 via SRB1.

In other scenarios, the base station 104A can perform a conditional SN Addition procedure to first configure the base station 106B as a C-SN for the UE 102, i.e. conditional SN addition or change (CSAC). At this time, the UE 102 can be in single connectivity (SC) with the base station 104A or in DC with the base station 104A and the base station 106A. If the UE 102 is in DC with the base station 104A and the base station 106A, the MN 104A may determine to perform the conditional SN Addition procedure in response to a request received from the base station 106A or in response to one or more measurement results received from the UE 102 or obtained by the MN 104A from measurements on signals received from the UE 102. In contrast to the immediate SN Addition case discussed above, the UE 102 does not immediately attempt to connect to the C-SN 106B. In this scenario, the base station 104A again operates as an MN, but the base station 106B initially operates as a C-SN rather than an SN.

More particularly, when the UE 102 receives a configuration for the C-SN 106B, the UE 102 does not connect to the C-SN 106B until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the C-SN 106B, so that the C-SN 106B begins to operate as the SN 106B for the UE 102. Thus, while the base station 106B operates as a C-SN rather than an SN, the base station 106B is not yet connected to the UE 102, and accordingly is not yet servicing the UE 102. In some implementations, the UE 102 may disconnect from the SN 106A to connect to the C-SN 106B.

In yet other scenarios, the UE 102 is in DC with the MN 104A (via a PCell) and SN 106A (via a PSCell other than cell 126A and not shown in FIG. 1A). The SN 106A can perform conditional PSCell addition or change (CPAC) to configure a candidate PSCell (C-PSCell) 126A for the UE 102. If the UE 102 is configured a signaling radio bearer (SRB) (e.g., SRB3) to exchange RRC messages with the SN 106A, the SN 106A may transmit a configuration for the C-PSCell 126A to the UE 102 via the SRB, e.g., in response to one or more measurement results which may be received from the UE 102 via the SRB or via the MN 104A or may be obtained by the SN 106A from measurements on signals received from the UE 102. In case of via the MN 104A, the MN 104A receives the configuration for the C-PSCell 126A. In contrast to the immediate PSCell change case discussed above, the UE 102 does not immediately disconnect from the PSCell and attempt to connect to the C-PSCell 126A.

More particularly, when the UE 102 receives a configuration for the C-PSCell 126A, the UE 102 does not connect to the C-PSCell 126A until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the C-PSCell 126A, so that the C-PSCell 126A begins to operate as the PSCell 126A for the UE 102. Thus, while the cell 126A operates as a C-PSCell rather than a PSCell, the SN 106A may not yet connect to the UE 102 via the cell 126A. In some implementations, the UE 102 may disconnect from the PSCell to connect to the C-PSCell 126A.

In some scenarios, the condition associated with CSAC or CPAC can be signal strength/quality, which the UE 102 detects on the C-PSCell 126A of the SN 106A or on a C-PSCell 126B of C-SN 106B, exceeding a certain threshold or otherwise corresponding to an acceptable measurement. For example, when the one or more measurement results the UE 102 obtains on the C-PSCell 126A are above a threshold configured by the MN 104A or the SN 106A or above a pre-determined or pre-configured threshold, the UE 102 determines that the condition is satisfied. When the UE 102 determines that the signal strength/quality on the C-PSCell 126A of the SN 106A is sufficiently good (again, measured relative to one or more quantitative thresholds or other quantitative metrics), the UE 102 can perform a random access procedure on the C-PSCell 126A with the SN 106A to connect to the SN 106A. Once the UE 102 successfully completes the random access procedure on the C-PSCell 126A, the C-PSCell 126A becomes a PSCell 126A for the UE 102. The SN 106A then can start communicating data (user-plane data or control-plane data) with the UE 102 through the PSCell 126A. In another example, when the one or more measurement results the UE 102 obtains on the C-PSCell 126B are above a threshold configured by the MN 104A or the C-SN 106B or above a pre-determined or pre-configured threshold, the UE 102 determines that the condition is satisfied. When the UE 102 determines that the signal strength/quality on the C-PSCell 126B of the C-SN 106B is sufficiently good (again, measured relative to one or more quantitative thresholds or other quantitative metrics), the UE 102 can perform a random access procedure on the C-PSCell 126B with the C-SN 106B to connect to the C-SN 106B. Once the UE 102 successfully completes the random access procedure on the C-PSCell 126B, the C-PSCell 126B becomes a PSCell 126B for the UE 102 and the C-SN 106B becomes a SN 106B. The SN 106B then can start communicating data (user-plane data or control-plane data) with the UE 102 through the PSCell 126B.

In various configurations of the wireless communication system 100, the base station 104A can be implemented as a master eNB (MeNB) or a master gNB (MgNB), and the base station 106A or 106B can be implemented as a secondary gNB (SgNB) or a candidate SgNB (C-SgNB). The UE 102 can communicate with the base station 104A and the base station 106A or 106B (106A/B) via the same RAT such as EUTRA or NR, or different RATs. When the base station 104A is an MeNB and the base station 106A is an SgNB, the UE 102 can be in EUTRA-NR DC (EN-DC) with the MeNB and the SgNB. In this scenario, the MeNB 104A may or may not configure the base station 106B as a C-SgNB to the UE 102. In this scenario, the SgNB 106A may configure cell 126A as a C-PSCell to the UE 102. When the base station 104A is an MeNB and the base station 106A is a C-SgNB for the UE 102, the UE 102 can be in SC with the MeNB. In this scenario, the MeNB 104A may or may not configure the base station 106B as another C-SgNB to the UE 102.

In some cases, an MeNB, an SeNB or a C-SgNB is implemented as an ng-eNB rather than an eNB. When the base station 104A is a Master ng-eNB (Mng-eNB) and the base station 106A is a SgNB, the UE 102 can be in next generation (NG) EUTRA-NR DC (NGEN-DC) with the Mng-eNB and the SgNB. In this scenario, the MeNB 104A may or may not configure the base station 106B as a C-SgNB to the UE 102. In this scenario, the SgNB 106A may configure cell 126A as a C-PSCell to the UE 102. When the base station 104A is an Mng-NB and the base station 106A is a C-SgNB for the UE 102, the UE 102 can be in SC with the Mng-NB. In this scenario, the Mng-eNB 104A may or may not configure the base station 106B as another C-SgNB to the UE 102.

When the base station 104A is an MgNB and the base station 106A/B is an SgNB, the UE 102 may be in NR-NR DC (NR-DC) with the MgNB and the SgNB. In this scenario, the MeNB 104A may or may not configure the base station 106B as a C-SgNB to the UE 102. In this scenario, the SgNB 106A may configure cell 126A as a C-PSCell to the UE 102. When the base station 104A is an MgNB and the base station 106A is a C-SgNB for the UE 102, the UE 102 may be in SC with the MgNB. In this scenario, the MgNB 104A may or may not configure the base station 106B as another C-SgNB to the UE 102.

When the base station 104A is an MgNB and the base station 106A/B is a Secondary ng-eNB (Sng-eNB), the UE 102 may be in NR-EUTRA DC (NE-DC) with the MgNB and the Sng-eNB. In this scenario, the MgNB 104A may or may not configure the base station 106B as a C-Sng-eNB to the UE 102. In this scenario, the Sng-eNB 106A may configure cell 126A as a C-PSCell to the UE 102. When the base station 104A is an MgNB and the base station 106A is a candidate Sng-eNB (C-Sng-eNB) for the UE 102, the UE 102 may be in SC with the MgNB. In this scenario, the MgNB 104A may or may not configure the base station 106B as another C-Sng-eNB to the UE 102.

The base stations 104A, 106A, and 106B can connect to the same core network (CN) 110 which can be an evolved packet core (EPC) 111 or a fifth-generation core (5GC) 160. The base station 104A can be implemented as an eNB supporting an S1 interface for communicating with the EPC 111, an ng-eNB supporting an NG interface for communicating with the 5GC 160, or as a base station that supports the NR radio interface as well as an NG interface for communicating with the 5GC 160. The base station 106A can be implemented as an EN-DC gNB (en-gNB) with an S1 interface to the EPC 111, an en-gNB that does not connect to the EPC 111, a gNB that supports the NR radio interface as well as an NG interface to the 5GC 160, or a ng-eNB that supports an EUTRA radio interface as well as an NG interface to the 5GC 160. To directly exchange messages during the scenarios discussed below, the base stations 104A, 106A, and 106B can support an X2 or Xn interface.

As illustrated in FIG. 1B, the base station 104A supports a cell 124A, the base station 104B supports a cell 124B, the base station 106A supports a cell 126A, and the base station 106B supports a cell 126B. The cells 124A and 126A can partially overlap, as can the cells 124A and 124B, so that the UE 102 can communicate in DC with the base station 104A (operating as an MN) and the base station 106A (operating as an SN) and, upon completing an SN change, with the base station 104A (operating as MN) and the SN 104B. More particularly, when the UE 102 is in DC with the base station 104A and the base station 106A, the base station 104A operates as an MeNB, a Mng-eNB or a MgNB, and the base station 106A operates as an SgNB or a Sng-eNB. The cells 124A and 126B can partially overlap. When the UE 102 is in SC with the base station 104A, the base station 104A operates as an MeNB, a Mng-eNB or a MgNB, and the base station 106B operates as a C-SgNB or a C-Sng-eNB. When the UE 102 is in DC with the base station 104A and the base station 106A, the base station 104A operates as an MeNB, a Mng-eNB or a MgNB, the base station 106A operates as an SgNB or a Sng-eNB, and the base station 106B operates as a C-SgNB or a C-Sng-eNB.

In general, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure also can apply to other suitable radio access and/or core network technologies such as sixth generation (6G) radio access and/or 6G core network or 5G NR-6G DC.

FIG. 1C depicts an example distributed implementation of a base station such as the base station 104A, 104B, 106A, or 106B. The base station in this implementation can include a centralized unit (CU) 172 and one or more distributed units (DUs) 174. The CU 172 is equipped with processing hardware that can include one or more general-purpose processors such as CPUs and non-transitory computer-readable memory storing machine-readable instructions executable on the one or more general-purpose processors, and/or special-purpose processing units. In one example, the CU 172 is equipped with the processing hardware 130. In another example, the CU 172 is equipped with the processing hardware 140. The processing hardware 140 in an example implementation includes an (C-) SN RRC controller 142 configured to manage or control one or more RRC configurations and/or RRC procedures when the base station 106A operates as an SN or a candidate SN (C-SN). The base station 106B can have hardware same as or similar to the base station 106A. The DU 174 is also equipped with processing hardware that can include one or more general-purpose processors such as CPUs and non-transitory computer-readable memory storing machine-readable instructions executable on the one or more general-purpose processors, and/or special-purpose processing units. In some examples, the processing hardware in an example implementation includes a medium access control (MAC) controller configured to manage or control one or more MAC operations or procedures (e.g., a random access procedure) and a radio link control (RLC) controller configured to manage or control one or more RLC operations or procedures when the base station 106A operates as a MN, an SN or a candidate SN (C-SN). The process hardware may include further a physical layer controller configured to manage or control one or more physical layer operations or procedures.

Figure 2:
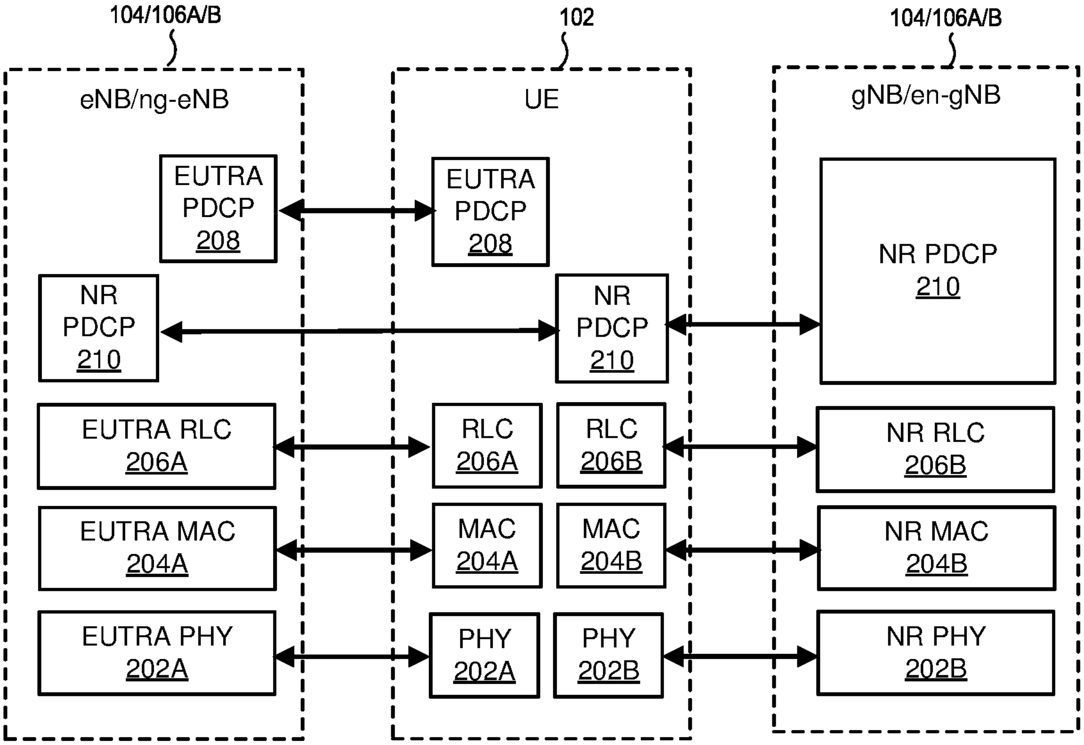
Figure 2 (PRIOR ART)
FIG. 2 is a block diagram of an example protocol stack according to which the UE of FIG. 1A communicates with base stations.

FIG. 2 illustrates, in a simplified manner, an example radio protocol stack 200 according to which the UE 102 may communicate with an eNB/ng-eNB or a gNB (e.g., one or more of the base stations 104A, 104B, 106A, 106B). In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to the EUTRA PDCP sublayer 208 and, in some cases, to the NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides RLC channels or bearers to the NR PDCP sublayer 210. The UE 102, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102 can support layering of NR PDCP sublayer 210 over the EUTRA RLC sublayer 206A.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages, for example. On a user plane, the EUTRA PDCP sublayer 208 and the NR PDCP sublayer 210 can provide DRBs to support data exchange.

In scenarios where the UE 102 operates in EUTRA/NR DC (EN-DC), with the base station 104A operating as an MeNB and the base station 106A operating as an SgNB, the wireless communication system 100 can provide the UE 102 with an MN-terminated bearer that uses the EUTRA PDCP sublayer 208, or an MN-terminated bearer that uses the NR PDCP sublayer 210. The wireless communication system 100 in various scenarios can also provide the UE 102 with an SN-terminated bearer, which uses only the NR PDCP sublayer 210. The MN-terminated bearer can be an MCG bearer or a split bearer. The SN-terminated bearer can be an SCG bearer or a split bearer. The MN-terminated bearer can be an SRB (e.g., SRB1 or SRB2) or a DRB. The SN-terminated bearer can an SRB or a DRB.

Next, several example scenarios in which a UE and/or a base station manage immediate and conditional configuration are discussed with reference to the messaging diagrams of FIGS. 3A-8B.

Figure 7A:
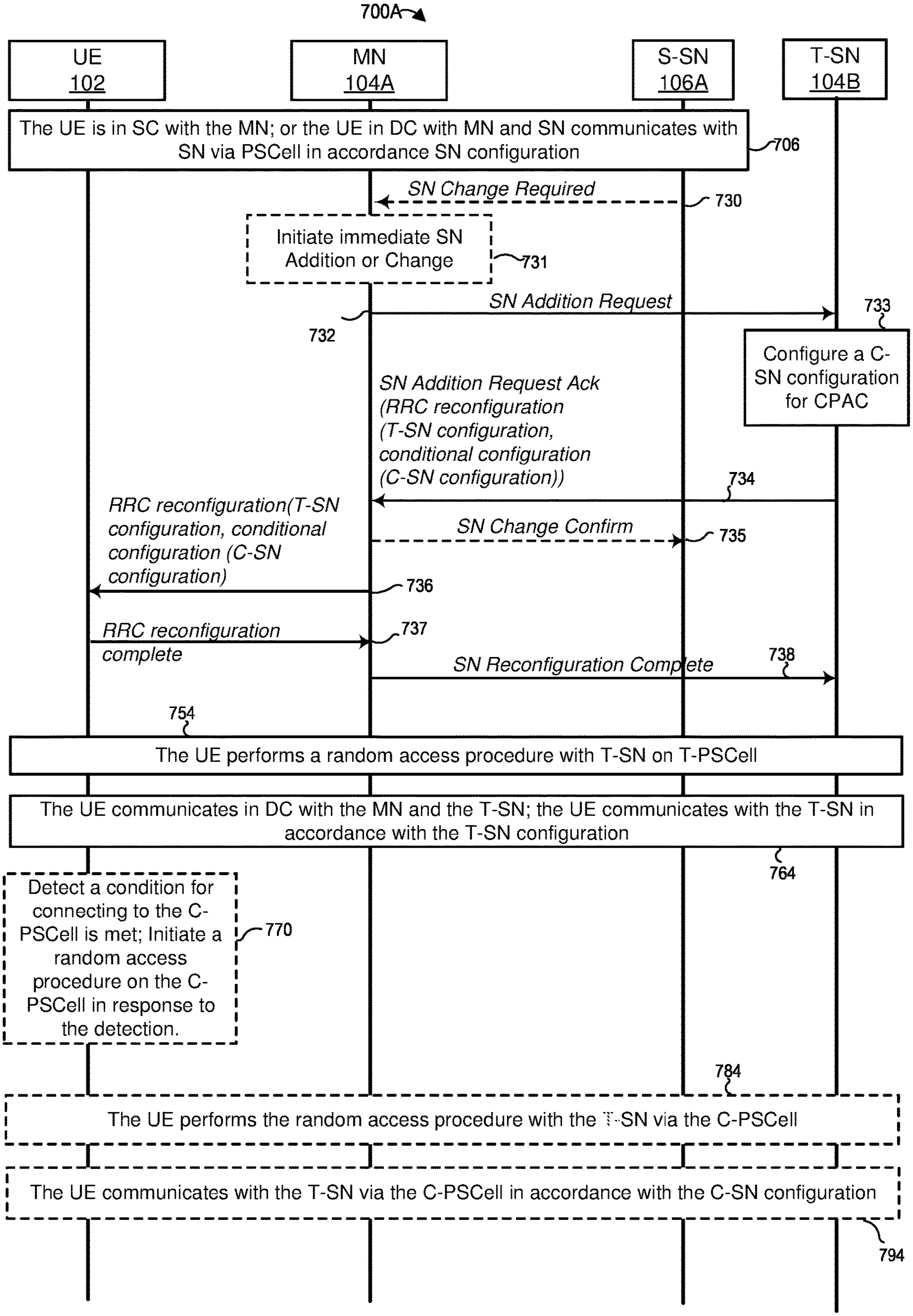
FIG. 7A is a messaging diagram of an example scenario in which a T-SN receives an SN addition request and generates a C-SN configuration for conditional PSCell addition or change (CPAC) for the UE.
Figure 7B:
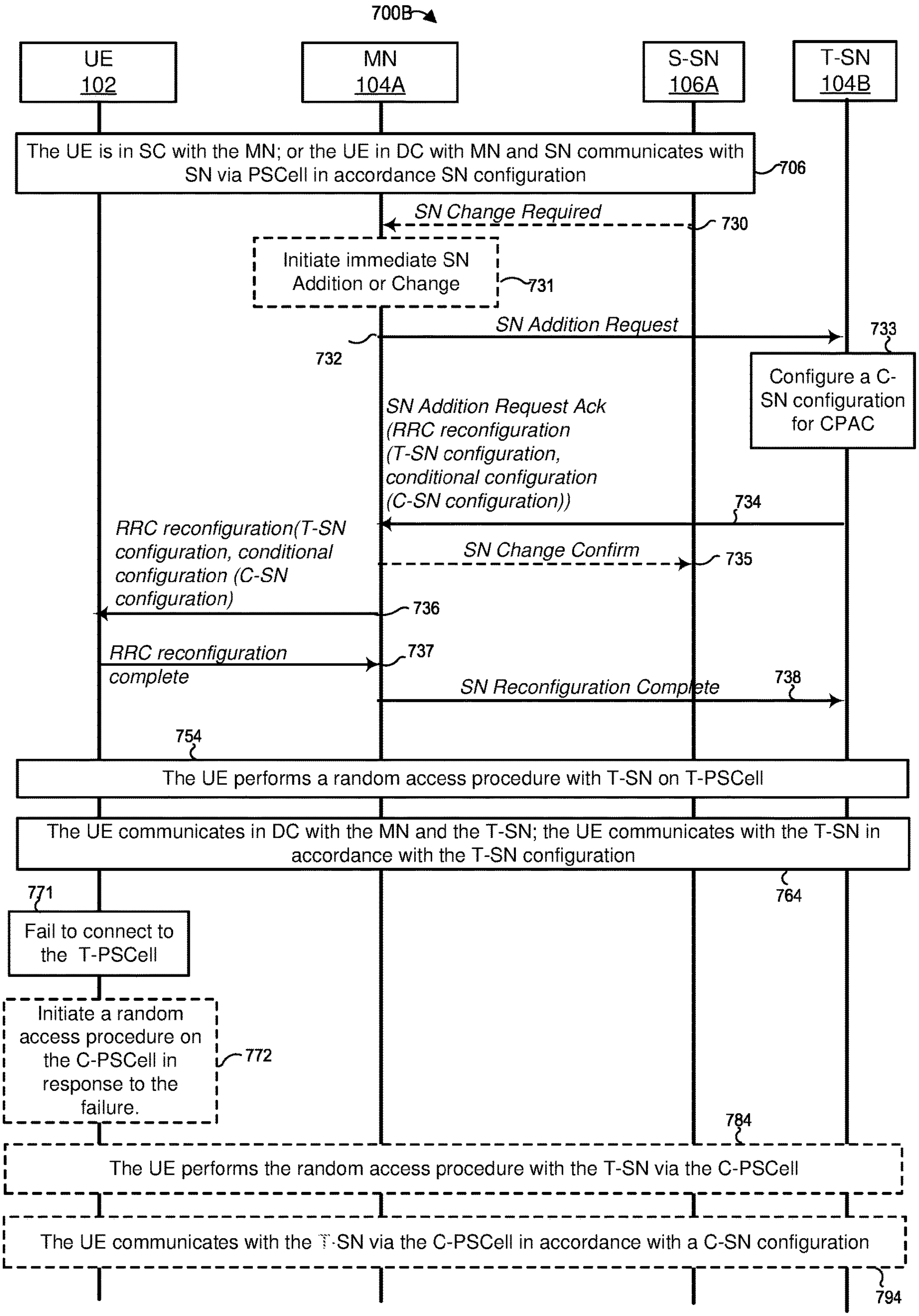
FIG. 7B is a messaging diagram of a scenario similar to the scenario of FIG. 7A, but with the UE failing to connect to the T-PSCell and connecting to the C-PSCell.
Figure 8A:
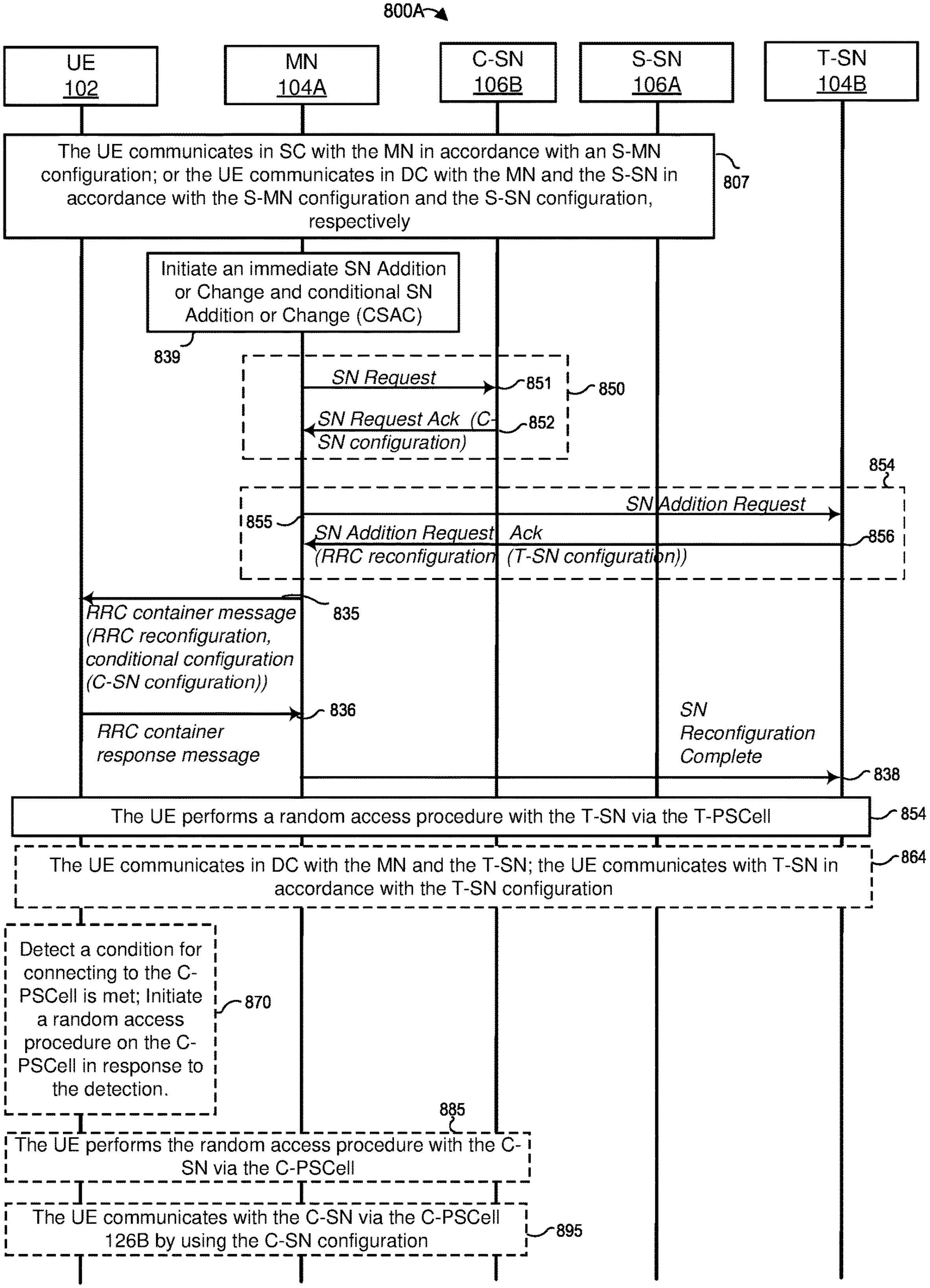
FIG. 8A is a messaging diagram of an example scenario in which an MN initiates both an immediate SN additional or change procedure and a conditional SN addition or change (CSAC) procedure.
Figure 8B:
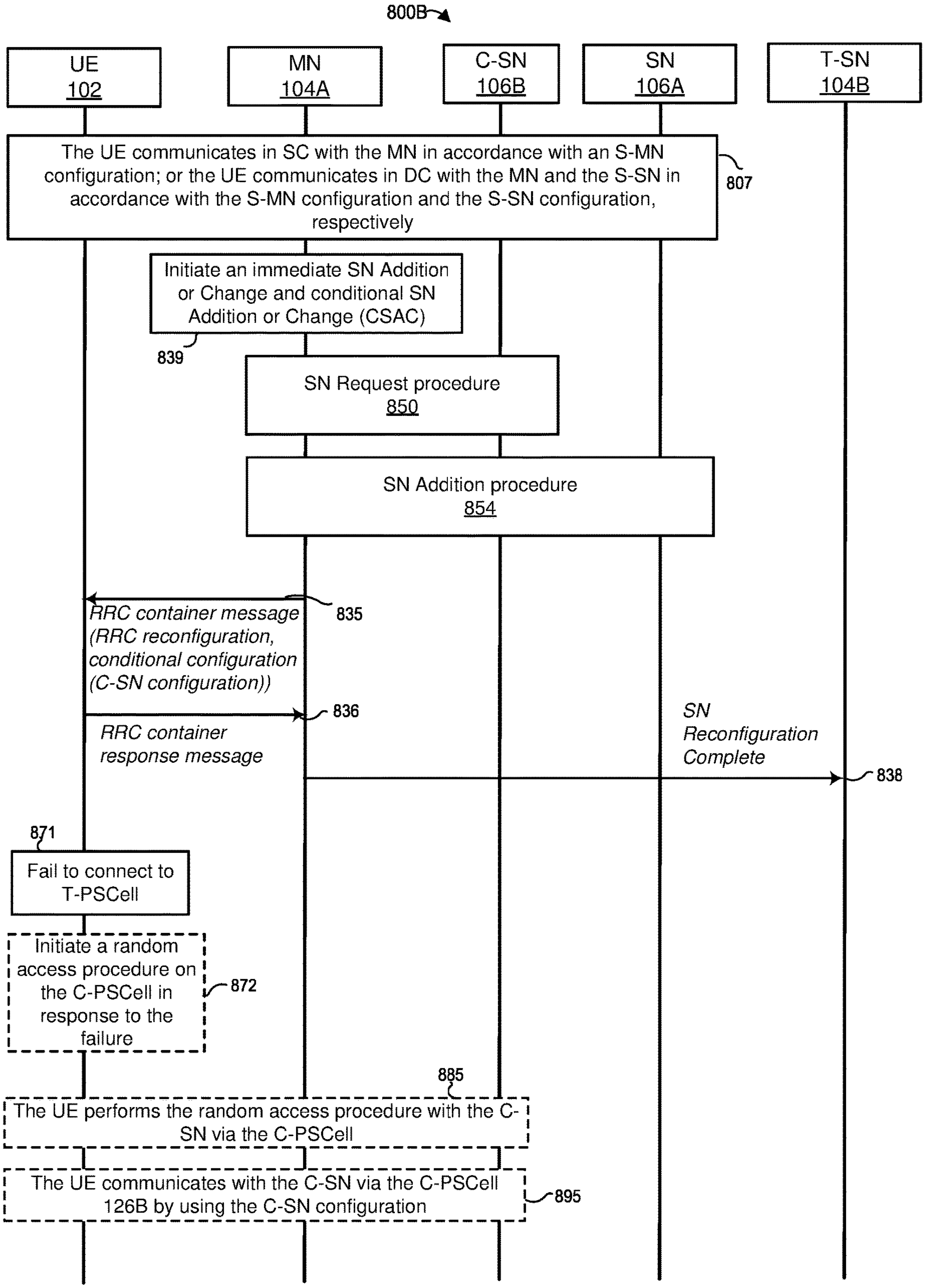
FIG. 8B is a messaging diagram of a scenario similar to the scenario of FIG. 8A, but with the UE failing to connect to the T-PSCell and connecting to the C-PSCell.

Next, several messaging diagrams illustrate example scenarios in which a UE and/or a base station manage an immediate procedure concurrently with conditional configuration for conditional handover (FIGS. 3A-6A), conditional PSCell addition or change, or CPAC (FIGS. 6B-7B), or conditional SN addition or change, or CSAC (FIGS. 8A and 8B).

Figure 3A:
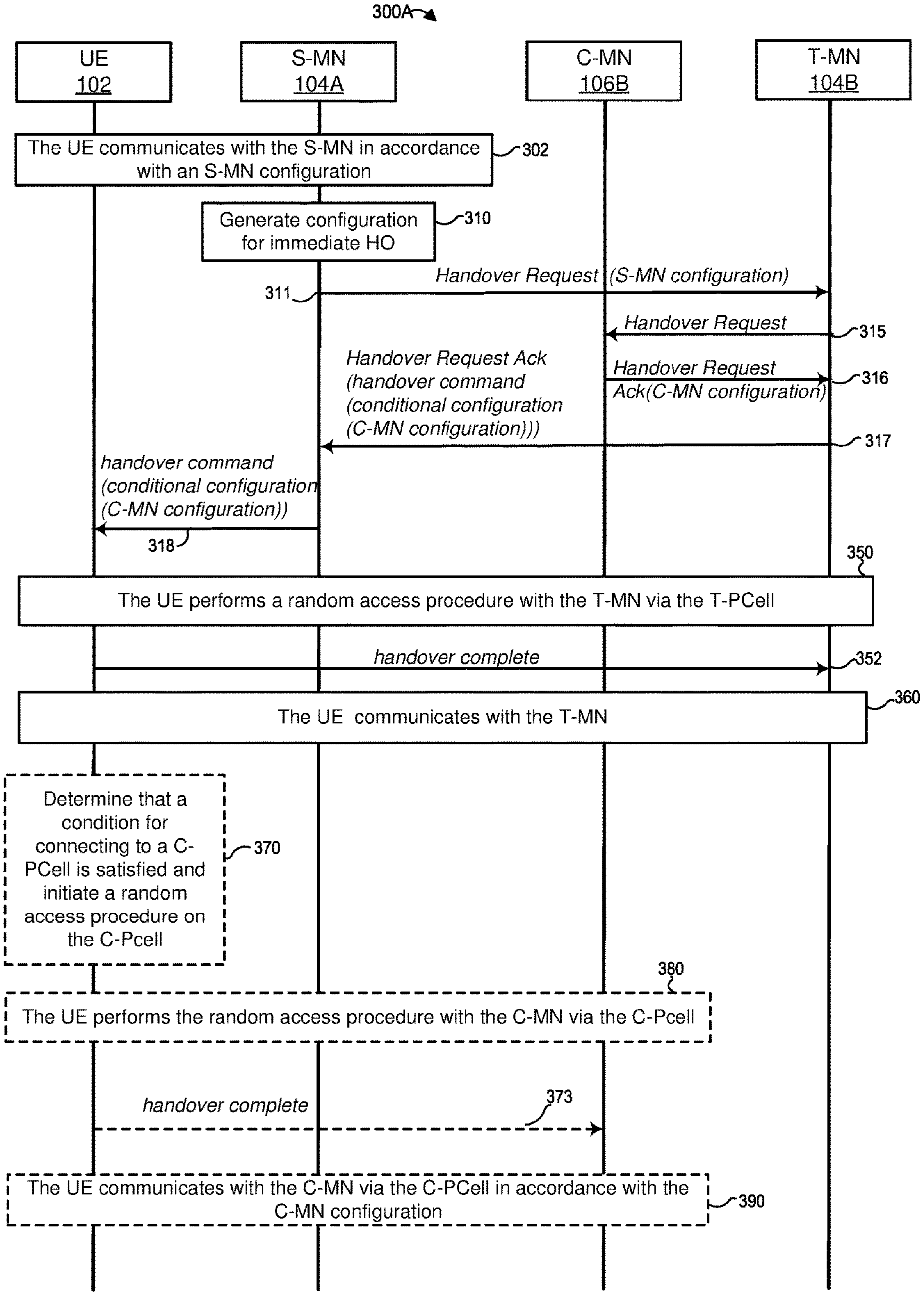
FIG. 3A is a messaging diagram of an example scenario in which a source master node (S-MN) requests a target master node (T-MN) to support an immediate handover of a UE from the S-MN to the T-MN, and the T-MN requests a conditional handover to a conditional master node (C-MN)

Referring first to FIG. 3A, a scenario 300A involves an immediate handover procedure with a conditional handover configuration procedure. The base station 104A in the scenario 300 operates as an S-MN, the base station 106B operates as a C-MN, and the base station 104B operates as a T-MN. Initially, the UE 102 communicates 302 data (e.g., UL Data PDUs and/or DL Data PDUs) with the S-MN 104A via a cell 124A (e.g., the PCell 124A) in accordance with an S-MN configuration. The S-MN 104A determines 310 that the UE 102 should perform an immediate handover to connect to a cell of the T-MN 104B. The S-MN 104A can make this determination in response to one or more measurement results received from the UE 102 or by measuring signals from the UE 102, for example. The S-MN 104A then transmits 311 a Handover Request message including the S-MN configuration to the T-MN 104B.

Upon receiving 311 the Handover Request message, the T-MN 104B determines that it can improve robustness of mobility configuration for the UE 102 by obtaining conditional configuration for a C-MN 106B. The T-MN 104B can make this determination based on one or more measurement results received from the S-MN 104A (e.g., via a X2 or Xn connection established between the S-MN 104A and the T-MN 104B). As another example, the T-MN 104B can make this determination in view of network topology, coverage or deployment of the C-MN 106B. More generally, the T-MN 104B can use any suitable signals or a combination of signals.

According to the scenario 300A, the T-MN 104B requests 315 a C-MN configuration for the UE 102 from the C-MN 106B, in a Handover Request message. The C-MN 106B generates a C-MN configuration for the UE 102 and transmits 316 a Handover Request Acknowledge message with the C-MN configuration to the T-MN 104B, in response to the Handover Request message. The T-MN 104B then generates a conditional configuration including the C-MN configuration, generates a handover command message including the conditional configuration, and transmits 317 a Handover Request Acknowledge message with the conditional configuration to the S-MN 104A. The Handover Request Acknowledge message is a response to the Handover Request message of the event 311. The S-MN 104A in turn transmits 318 the handover command to the UE 102 via the radio interface.

In this example scenario, as well as the scenarios discussed below, a base station can generate conditional configuration information that includes, in addition to the C-MN configuration related to a cell, one or more conditions ("trigger conditions") that must be satisfied before the UE applies the C-MN configuration. The base station (in this example scenario, the T-MN 104B at event 317) can transmit a message including the conditional configuration including the C-MN configuration only or, alternatively, the conditional configuration including (i) the C-MN configuration and (ii) at least one trigger condition.

The UE 102 can start checking the one or more trigger conditions for connecting to the C-PCell 126B upon receiving 318 the conditional configuration or, in other implementations, after another event such as completion of an immediate procedure for example.

In some cases, the conditional configuration field or IE included in the handover command of the event 318 includes a configuration identifier (ID) that uniquely identifies the C-MN configuration or the conditional configuration. The T-MN 104B can allocate the configuration ID or receive the configuration ID from the C-MN 106B for example.

In response to receiving 318 the handover command, the UE 102 initiates the immediate handover procedure and performs 350 a random access procedure to access a T-PCell 124B of the T-MN 104B. The UE 102 in some scenarios uses one or more random access configurations included in the handover command message. The UE 102 retains (e.g., stores in the local memory) the conditional configuration or the C-MN configuration. The UE 102 transmits 352 a handover complete message during or after the random access procedure 350. If the UE 102 successfully completes the random access procedure 350, the T-MN 104B begins to operate as an MN 104B, the T-PCell 124B becomes the PCell 124B, and the UE 102 begins to communicate 360 signals and data with the MN 104B via the PCell 124B. In some implementations, the UE 102 disconnects from the PCell 124A and/or the S-MN 104A to perform the random access procedure 360. Further, in some implementations or scenarios, the UE 102 starts a timer (e.g., timer T304) upon receiving 318 the handover command. If the UE 102 successfully completes the random access procedure 360, the UE 102 stops the timer.

In some cases, the UE 102 subsequently determines 370 that the one or more conditions for connecting to the C-PCell 126B have been satisfied, and accordingly initiates 380 a random access procedure on the C-PCell 126B. The UE 102 performs 380 the random access procedure with the C-MN 106B via the C-PCell 126B. The UE 102 may transmit 373 a handover complete message during or after the random access procedure 380 via the C-PCell 126B. If the UE 102 successfully completes the random access procedure 380, the C-MN 106B begins to operate as the MN 106B, the C-PCell 126B becomes the PCell 126B, and the UE 102 begins to communicate 390 control signals and data with the MN 106B via the PCell 126B. In some implementations, the UE 102 can disconnect from the PCell 124B and/or the MN 104B to perform the random access procedure 380.

In the handover command message of event 317, the T-MN 104B in some cases includes a T-MN configuration, which can include multiple configuration parameters according to which the UE 102 can communicate with the T-MN 104B. The configuration parameters can configure radio resources which the UE 102 can use to communicate with the base station 104B via the PCell 126B as well as zero, one, or more candidate secondary cells (SCells) of the base station 104B. The configuration parameters can configure zero, one, or more radio bearers. The one or more radio bearers can include an SRB and/or DRBs. Further, in some implementations, the handover command message includes a mobility field such as a mobilityControlInfo field or a reconfigurationWithSync field.

When the MN 104A is implemented as a gNB, the handover command can be an RRCReconfiguration message, and the T-MN configuration can be one or more RRCReconfiguration-IEs as defined in 3GPP TS 38.331. In this case, the handover complete message (event 352) can be an RRCReconfigurationComplete message. When the S-MN 104A is implemented as an eNB or a next generation eNB (ng-eNB), the handover command can be an RRCConnectionReconfiguration message, and the T-MN configuration can be one or more RRCConnectionReconfiguration-r8-IEs as defined in 3GPP TS 36.331. In this case, the handover complete message can be an RRCConnectionReconfigurationComplete message.

In some implementations, the S-MN 104A includes the S-MN configuration in a HandoverPreparationInformation IE (or an RRC inter-node message) and include the HandoverPreparationInformation IE in the Handover Request message (event 311). In other implementations, the S-MN 104A can include the S-MN configuration in an RRC message (e.g., RRC reconfiguration message), include the RRC message in a HandoverPreparationInformation IE, and include the HandoverPreparationInformation IE in the Handover Request message (event 311). In some implementations, the T-MN 104B includes a configuration ID in the conditional configuration or the handover command.

Although the S-MN 104A and the T-MN 104B are interconnected via an X2 or Xn interface in the example systems of FIGS. 1A and 1B, in other scenarios the S-MN 104A and the T-MN 104B may not have an interface. In these cases, the S-MN 104A can transmit a Handover Required message including the S-MN configuration to the CN 110 (e.g., MME 114 or AMF 164) instead of transmitting 311 the Handover Request message. In other implementations, the S-MN 104A includes the RRC message or the HandoverPreparationInformation IE in the Handover Required message as described for the Handover Request message 306. Then the CN 110 includes the S-MN configuration, the RRC message or the HandoverPreparationInformation IE in a Handover Request message generated by the CN 110 as described for the Handover Request message 306. The CN 110 sends the generated Handover Request message to the T-MN 104B. That is, the Handover Required message and the CN generated Handover Request message can be used instead of the Handover Request message 306. Then the T-MN 104B generates a Handover Request Acknowledge message which includes the handover command message including the C-MN configuration, and sends the Handover Request Acknowledge message to the CN 110 in response to the Handover Request message received from the CN 110. The CN 110 sends a Handover Confirm message including the handover command message to the S-MN 104A in response to the Handover Required message. That is, the Handover Request Acknowledge message and the CN generated Handover Confirm message can be used instead of the Handover Request Acknowledge message 306.

With continued reference to FIG. 3A, the T-MN configuration in some implementations can be a complete and self-contained configuration (i.e., a full configuration). The T-MN configuration may include a full configuration indication (an information element (IE) or a field) that identifies the T-MN configuration as a full configuration. The UE 102 in this case can directly use the T-MN configuration to communicate with the T-MN 104B without relying on the S-MN configuration. On the other hand, the T-MN configuration in other cases can include a "delta" configuration, or one or more configurations that augment the S-MN configuration. The UE 102 in this case can use the delta T-MN configuration together with the S-MN configuration to communicate with the MN 104B.

In some implementations, the T-MN 104B includes the S-MN configuration in a HandoverPreparationInformation IE (or an RRC inter-node message) and include the HandoverPreparationInformation IE in the Handover Request message (event 315). In other implementations, the S-MN 104A can include the S-MN configuration in an RRC message (e.g., RRC reconfiguration message), include the RRC message in a HandoverPreparationInformation IE, and include the HandoverPreparationInformation IE in the Handover Request message (event 315). In yet other implementations, the T-MN 104B includes the T-MN configuration in a HandoverPreparationInformation IE (or an RRC inter-node message) and include the HandoverPreparationInformation IE in the Handover Request message (event 315). In additional implementations, the S-MN 104A can include the T-MN configuration in an RRC message (e.g., RRC reconfiguration message), include the RRC message in a HandoverPreparationInformation IE, and include the HandoverPreparationInformation IE in the Handover Request message (event 315).

The C-MN configuration in some implementations can be a complete and self-contained configuration (i.e., a full configuration). The C-MN configuration may include a full configuration indication (an information element (IE) or a field) that identifies the C-MN configuration as a full configuration. The UE 102 in this case can directly use the C-MN configuration to communicate with the C-MN 106B without relying on a prior MN configuration (e.g., the S-MN configuration or the T-MN configuration). On the other hand, the C-MN configuration in other cases can include a "delta" configuration, or one or more configurations that augment a previously received MN configuration (e.g., the S-MN configuration or the T-MN configuration). The UE 102 in this case can use the delta C-MN configuration together with the prior MN configuration to communicate with the C-MN 106B.

The T-MN configuration can include multiple configuration parameters for the UE 102 to communicate with the T-MN 104B via the PCell 124B as well as zero, one, or more secondary cells (SCells) of the T-MN 104B. The configuration parameters can configure radio resources which the UE 102 can use to communicate with the T-MN 104B via the PCell 124B and zero, one, or more SCells of the T-MN 104B. The multiple configuration parameters may configure zero, one, or more radio bearers, which can include an SRB and/or more or more DRBs.

The C-MN configuration can include multiple configuration parameters for the UE 102 to communicate with the C-MN 106B and may include random access configurations for the UE 102 to perform a random access procedure with the C-MN 106B via the C-PCell 126B. The configuration parameters can configure radio resources which the UE 102 can use to communicate with the C-MN 106B via the C-PCell 126B and zero, one, or more candidate secondary cells (C-SCells) of the C-MN 106B. The configuration parameters can configure zero, one, or more radio bearers, which can include an SRB and/or more or more DRBs.

The S-MN configuration can include multiple configuration parameters for the UE 102 to communicate with the S-MN 104A via the PCell 124A as well as zero, one, or more secondary cells (SCells) of the S-MN 104A. The configuration parameters can configure radio resources which the UE 102 can use to communicate with the S-MN 104A via the PCell 124A and zero, one, or more SCells of the S-MN 104A. The multiple configuration parameters may configure zero, one, or more radio bearers, which can include an SRB and/or more or more DRBs.

In some implementations, the C-MN configuration includes a cell group configuration (CellGroupConfig) IE that configures the C-PCell 126B as well as zero, one, or more C-SCells of the C-MN 106B. In one implementation, the C-MN configuration is an RRCReconfiguration message, RRCReconfiguration-IEs or the CellGroupConfig IE that conforms to 3GPP TS 38.331. The full configuration indication can be a field or an IE that conforms to 3GPP TS 38.331. In other implementations, the C-MN configuration is an RRCConnectionReconfiguration message or an RRCConnectionReconfiguration-IEs that conforms to 3GPP TS 36.331. The full configuration indication may be a field or an IE that conforms to 3GPP TS 36.331. In another implementation, the C-MN configuration is included in a conditional configuration field or IE, and the conditional configuration field or IE can be included in an RRCReconfiguration message, RRCReconfiguration-IEs or the CellGroupConfig IE that conforms to 3GPP TS 38.331. In other implementations, the C-MN configuration can be an RRCConnectionReconfiguration message or an RRCConnectionReconfiguration-IEs conforming to 3GPP TS 36.331. The conditional configuration field/IE can be a CHO-Config (e.g. CHO-Config-r16) for an NR configuration or a ConditionalReconfiguration (e.g. ConditionalReconfiguration-r16) for a EUTRA configuration. The conditional configuration field or IE can include a list of conditional configurations to be removed (e.g. cho-ConfigToRemoveList or condReconfigurationToRemoveList), a list of conditional configurations to be added or modified (e.g., cho-ConfigToAddModList or condReconfigurationToAddModList), and an attemptCHO field or IE. The list of conditional configuration to be added or modified is a list of conditional configurations that may contain a configuration ID (e.g. cho-ConfigId-r16 or condReconfigurationId-r16), an execution condition (e.g., cho-ExecutionCond-r16 or triggerCondition-r16), and the C-MN configuration, which is a configuration the UE 102 can apply when the execution condition is satisfied (e.g., cho-RRCReconfig-r16, condReconfigurationToApply-r16). The C-MN configuration release indicator in one implementation is the list of conditional configurations to be removed, and include a list of configuration IDs.

In some implementations, the S-MN configuration or the T-MN configuration can include a CellGroupConfig IE that configures the PCell 124A as well as zero, one, or more SCells of the S-MN 104A. In some implementations, the S-MN configuration or the T-MN configuration is an RRCReconfiguration message, RRCReconfiguration-IEs or the CellGroupConfig IE that conform to 3GPP TS 38.331. In other implementations, the S-MN configuration or the T-MN configuration is an RRCConnectionReconfiguration message or RRCConnectionReconfiguration-IEs that conform to 3GPP TS 36.331. In some implementations, the T-MN 104B includes the conditional configuration in the T-MN configuration or in the level of the handover command message.

In some implementations, the T-MN 104B is implemented as a CU and one or more DU as illustrated in FIG. 1C. The UE 102 can perform the random access procedure 350 with the DU. The DU may generate certain configuration parameters in the handover command and send the configurations to the CU. For example, the configuration parameters the DU generates can relate to random access configuration, a physical downlink control channel (PDCCH) configuration, or a physical uplink control channel (PUCCH) configuration. The CU can generate other configuration parameters in the handover command. The other configuration parameters can include an SRB configuration, a DRB configuration, a security configuration and/or a measurement configuration. In other implementations, the DU can generate a cell group configuration (CellGroupConfig) IE in the handover command message, and the CU can generate a radio bearer configuration (RadioBearerConfig) IE in the handover command message.

Similarly, the C-MN 106B can be implemented as a CU 172 and one or more DU 174 as illustrated in FIG. 1C. The DU of the C-MN 106B can generate a portion of the C-MN configuration and transmit the generated portion to the CU. This portion can include for example random access configuration, a PDCCH configuration, a PUCCH configuration, etc. The remaining C-MN configuration can include an SRB configuration, a DRB configuration, a security configuration, and/or a measurement configuration. In other implementations, the DU of the C-MN 106B can generate a cell group configuration IE, and the CU can generate a radio bearer configuration, similar to the T-MN 104B discussed above.

Figure 3B:
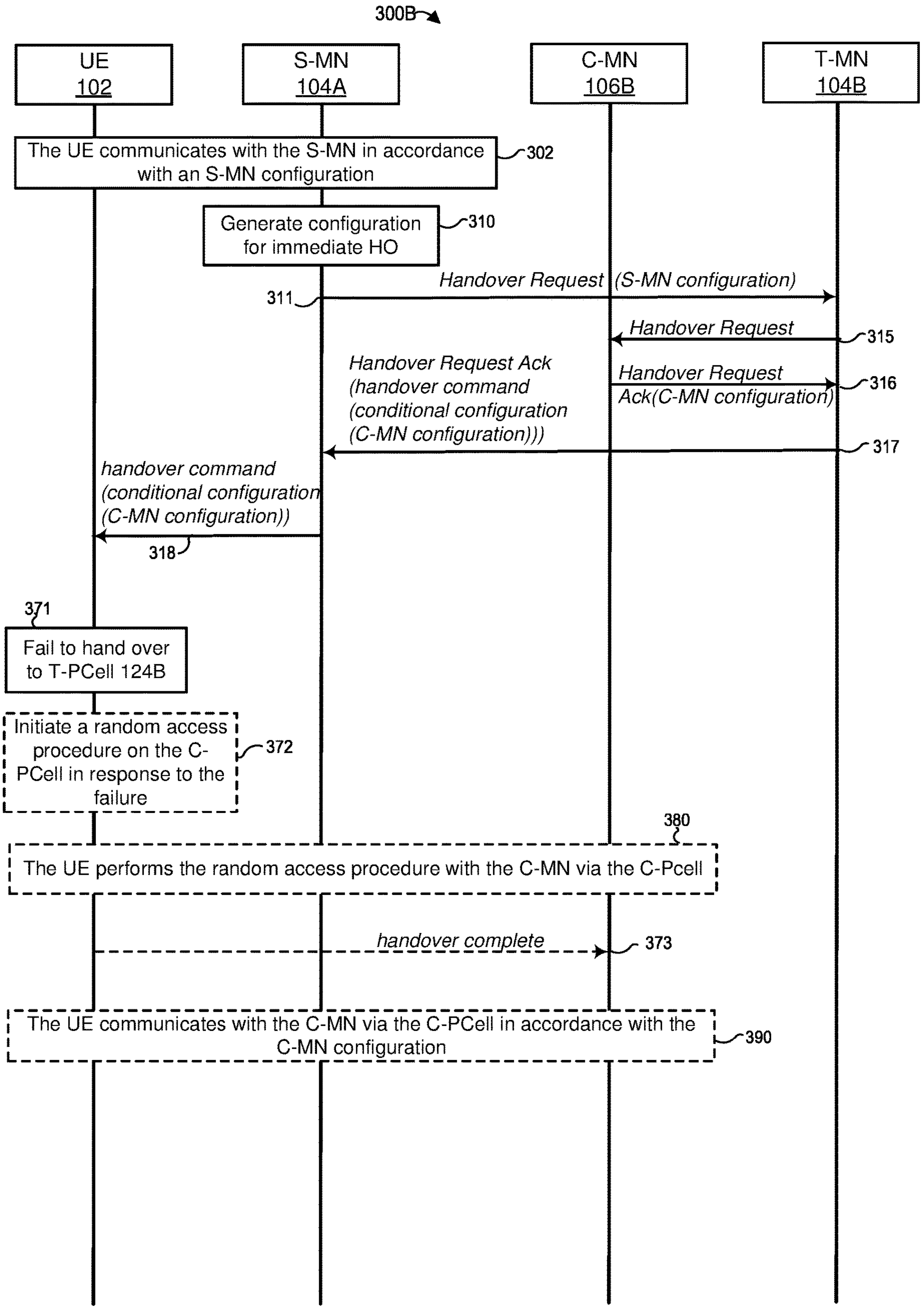
FIG. 3B is a messaging diagram of a scenario similar to the scenario of FIG. 3A, but with the UE failing to perform the immediate handover and performing the conditional handover in response to the failure.

Now referring to FIG. 3B, a scenario 300B also involves an immediate handover procedure with a conditional handover configuration procedure, similar to the scenario 300A discussed above. In this scenario, the UE 102 performs the conditional procedure after failing to complete the immediate procedure. Moreover, as discussed below, the UE 102 in some implementations can treat the failure of the immediate procedure as an equivalent of the trigger condition being satisfied. Events in FIG. 3B similar to those discussed above are labeled with same references numbers. The differences between the scenarios of FIG. 3A and FIG. 3B are discussed below.

The UE 102 fails 371 to hand over to the T-MN 104B (more particularly, to the T-PCell 124B) in accordance with the handover command of the event 318. After receiving the handover command during the event 318, the UE 102 in some implementations starts a first timer (e.g., timer T304). When the UE 102 in one implementation fails to complete a random access procedure on the T-PCell 124B before the first timer expires, the UE 102 can determine 371 that the immediate handover failed. In this case, the UE 102 determines that the immediate handover failed in response to expiration of the first timer. If the UE 102 successfully completes the random access procedure on the T-PCell 124B before the first timer expires, the UE 102 stops the first timer.

In response to this determination, the UE 102 determines 372 that it should initiate a random access procedure on the C-PCell 126B. In the scenario 300B, UE 102 determines that the C-PCell 126B is suitable although the UE 102 may not determine that the trigger condition is satisfied. In other words, the UE 102 performs the handover to the C-PCell in accordance with the conditional configuration regardless of whether the condition for performing this handover is satisfied In another implementation, however, the UE 102 in response to the failure of the immediate procedure starts checking whether the trigger condition for applying the configuration associated with the conditional handover is satisfied. Thus, the UE 102 in this implementation applies the conditional configuration after the failure of the immediate procedure and only if the corresponding trigger condition is satisfied.

In some implementations, the UE 102 starts a second timer (e.g., T311) upon expiration of the first timer. The UE 102 performs the procedures of the events 372, 380 or 373 before expirations of the second timer. If the UE 102 determines the C-PCell 126B is suitable, or the condition for connecting the C-PCell 126B is satisfied, or the uE 102 performs the procedures of the events 380 or 373 before the second timer expires, the UE 102 can stop the second timer. If the UE 102 does not determine that the C-PCell 126B is suitable, or does not determine that the condition for connecting the C-PCell 126B is satisfied, or the UE 102 does not perform the procedures of the event 380 or 373 before the second timer expires, the UE 102 can perform a RRC connection reestablishment procedure upon expiration of the second timer.

Figure 4:
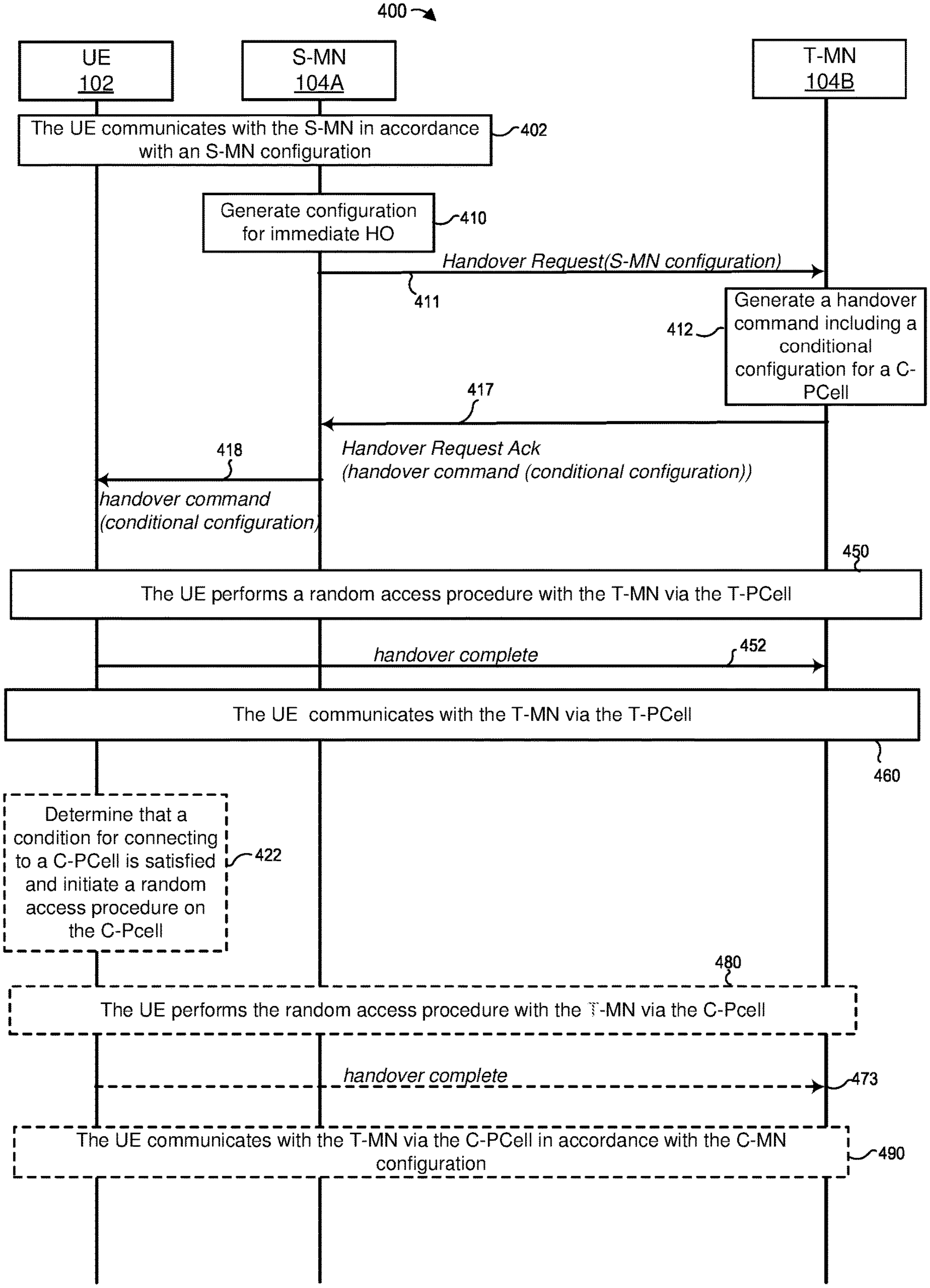
FIG. 4 is a messaging diagram of an example scenario in which an S-MN requests a T-MN to support an immediate handover of a UE from the S-MN to the T-MN, and the T-MN generates conditional configuration for a candidate primary cell (C-PCell) of the T-MN.

FIG. 4 illustrates a scenario 400 that also involves an immediate handover procedure with a conditional handover configuration procedure. Unlike the examples of FIGS. 3A and 3B, the target cell and the candidate cell in this scenario are associated with the same base station.

The base station 104A operates as an S-MN, and the base station 104B operates as a T-MN. Events 402, 410, 411, 417, 418, 450, 452, 460, 470, 473 are similar to the events 302, 310, 311, 317, 318, 350, 352, 360, 370, and 373, respectively, discussed above with reference to FIG. 3A. The differences between the scenarios of FIG. 3A and FIG. 4 are discussed below.

In response to receiving 411 the Handover Request message including the S-MN configuration, the T-MN 104B generates 412 a handover command including a conditional configuration with a C-MN configuration for a C-PCell. According to this configuration, the T-MN 104B serves both the T-PCell and the C-PCell. Upon receiving 411 the Handover Request message, the T-MN 104B determines that it can improve robustness of mobility configuration for the UE 102 by generating conditional configuration for the C-PCell, and accordingly configures a conditional handover for the UE 102. The T-MN 104B can make this determination based on one or more measurement results received from the S-MN 104A (e.g., via an X2 or Xn connection established between the S-MN 104A and the T-MN 104B). As another example, the T-MN 104B can make this determination in view of network topology, coverage or deployment of the C-PCell. More generally, the T-MN 104B can use any suitable signals or a combination of signals.

In any case, the T-MN 104B transmits 417 to the S-MN 104A a Handover Request Acknowledge message including the handover command that in turn includes the conditional configuration related to a conditional handover for the UE 102. The S-MN 104A transmits 418 the handover command to the UE 102. The procedures 480 and 490 are similar to the procedures 380 and 390, respectively, except that here the C-PCell is associated with the T-MN 104B rather than with the C-MN 106B as in FIG. 3.

Figure 5:
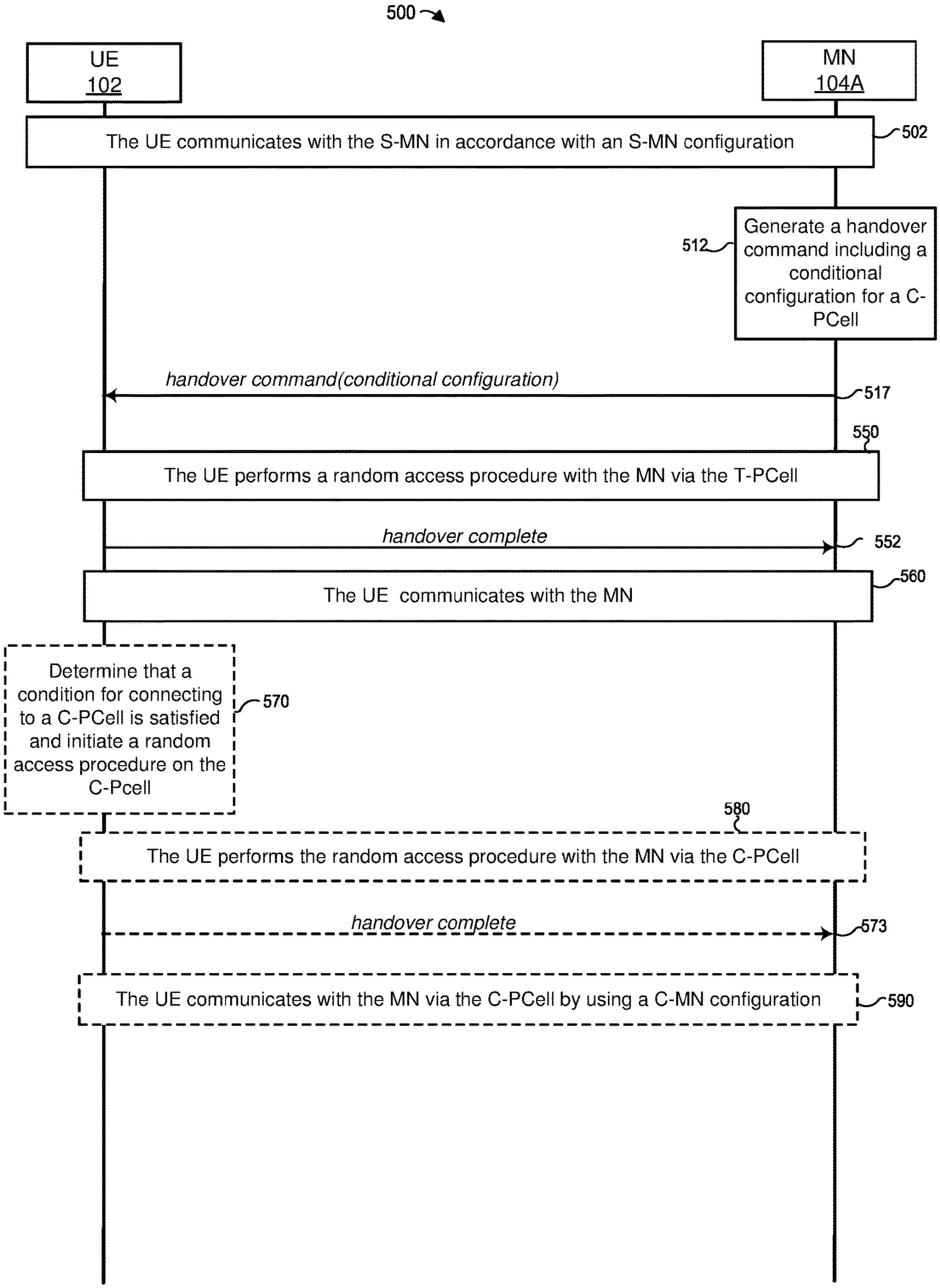
FIG. 5 is a messaging diagram of an example scenario in which an MN generates a command for the UE to initiate an immediate handover, and includes conditional configuration for a C-PCell in the generated command.

Now referring to FIG. 5, a scenario 500 also involves an immediate handover procedure with a conditional handover configuration procedure. However, the target cell, the candidate cell, and the cell via which the UE 102 currently communicates in this scenario are associated with the same base station.

The base station 104A in this scenario operates as an MN. Events 502, 517, 550, 552, 560, 570, 580, 573, and 590 and similar to events 302, 317, 350, 352, 360, 370, 380, 373, and 390, respectively. The differences between the scenarios of FIG. 3A and FIG. 5 are discussed next.

The MN 104A generates 512 a handover command including a conditional configuration for a C-PCell. The MN 104A serves both the PCell, via which UE 102 currently communicates 502, the T-PCell, and the C-PCell. The MN 104A transmits 517 the handover command message including the conditional configuration to the UE 102. The UE 102 and the MN 104A then perform procedures similar to those discussed above, but the MN 104A in this case serves the T-PCell and C-PCell (as opposed to the T-MN 104B and C-MN 106B serving the T-PCell and C-PCell, respectively, in FIG. 3A).

The MN 104A can determine 512 that it should generate the handover command in response to one or more measurement results received from the UE 102, or which the MN 104A obtains from measurements on signals received from the UE 102. In some implementations, the MN 104A determines the T-PCell to be included in the handover command if one or more measurement results for the T-PCell are above a first threshold. Further, in some implementations, the MN 104A determines the C-PCell to be included in the conditional configuration if one or more measurement results for the C-PCell are above the first threshold or a second threshold. The second threshold can be different from the first threshold. For example, the first threshold can be higher than the second threshold, so that the MN 104A can communicate with the UE 102 via the T-PCell with better signal strength/quality than via the C-PCell.

Referring to FIGS. 4 and 5, the UE 102 in other scenarios can fail to complete the immediate handover procedure and, similar to the scenario of FIG. 3A, can initiate the conditional procedure regardless of whether the corresponding trigger condition is satisfied. Thus, similar to the scenario of FIG. 3B, the UE 102 in these cases can treat the failure of the immediate procedure as an equivalent of the trigger condition being satisfied.

Figure 6A:
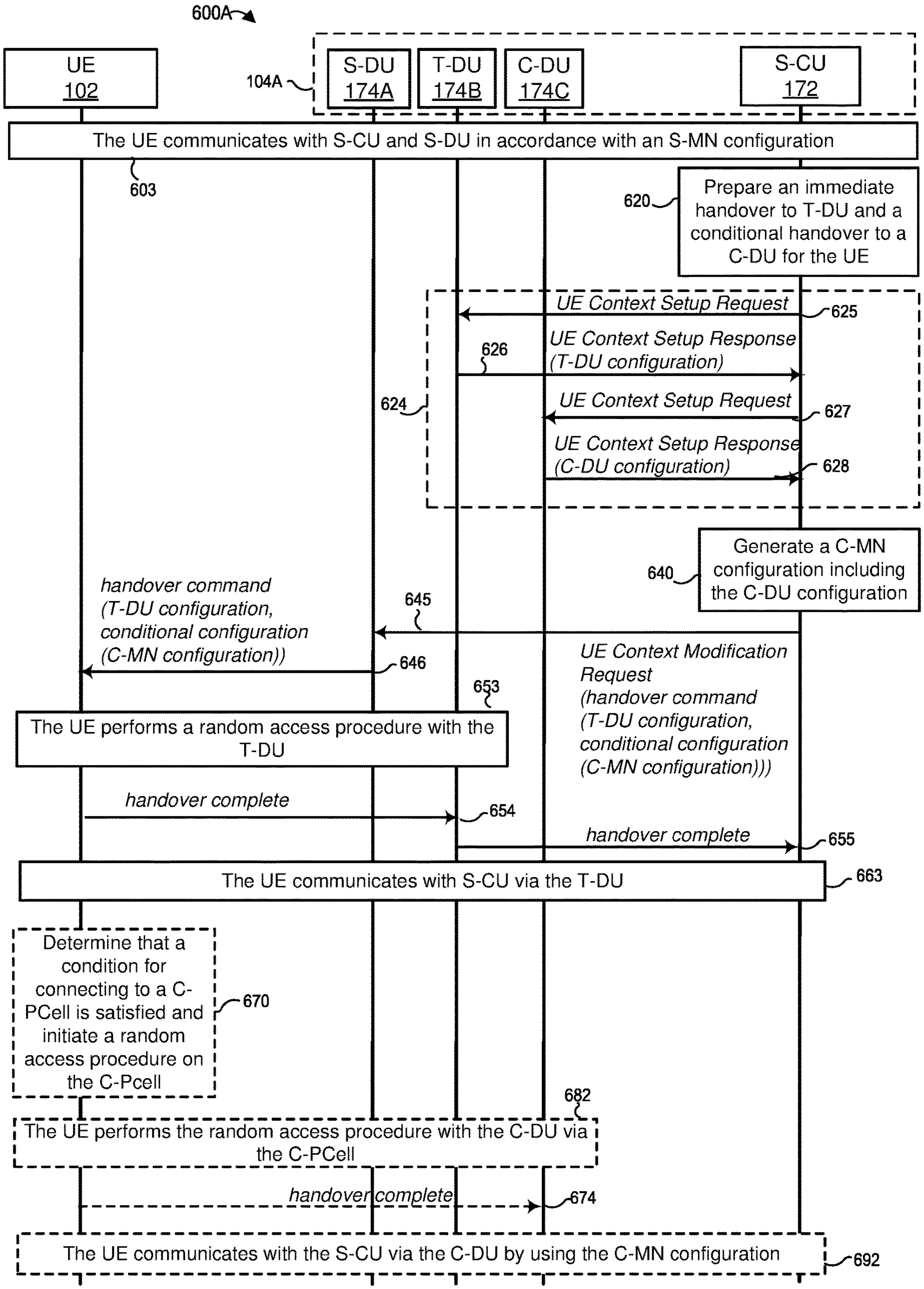
FIG. 6A is a messaging diagram of an example scenario in which a CU initiates an immediate handover of a UE from a source DU (S-DU) to a target DU (T-DU), and generates conditional configuration for a conditional handover to a candidate DU (C-DU)

Next, FIG. 6A illustrates a scenario 600A that involves an immediate handover procedure with a conditional handover procedure, similar to FIGS. 3A-5. However, the conditional handover procedure in this scenario is an intra-base station handover that involves multiple DUs of a distributed base station. The base station 104A in the scenario 600 operates as an S-MN made up of a CU 172 and three DUs 174A-C. The CU 172 operates as a source CU (S-CU). The three DUs 174A-C operate a source DU (S-DU), a target DU (T-DU) and a candidate DU (C-DU), respectively.

The UE 102 initially communicates 603 data (e.g., UL Data PDUs and/or DL Data PDUs) with the S-CU 172 and S-DU 174 via a cell 124A (i.e., PCell 124A) in accordance with an S-MN configuration. The S-CU 172 determines 620 to prepare an immediate handover to the T-DU 174B and also prepare a conditional handover to the C-DU 174C for the UE 102, e.g., in response to one or more measurement results received from the UE 102 or obtained by the S-CU 172 from measurements on signals received from the UE 102, via the S-DU 174A. In some implementations, the S-CU 172 selects the T-DU 174B as a target if one or more measurement results for a cell managed by the T-DU 174B are above a first threshold. In some implementations, the S-CU 172 selects the C-DU 174C as a candidate if one or more measurement results for a cell managed by the C-DU 174C are above the first threshold or a second threshold. The second threshold can be different from the first threshold.

For example, the first threshold can be higher than the second threshold, so that the S-CU 172 can communicate the UE 102 via the T-DU 172B with better signal strength/quality than via the C-DU 174C.

Next, as a part of performing 624 UE context setup procedures to obtain the T-DU configuration and the C-DU configuration, the S-CU 172 transmits 625 a UE Context Setup Request message to the T-DU 174B. Upon receiving 625 the UE Context Setup Request message, the T-DU 174B transmits 626 a UE Context Setup Response message including a T-DU configuration, to the CU 172. The S-CU 172 also transmits 627 a UE Context Setup Request message to the C-DU 174C. Upon receiving 627 the UE Context Setup Request message, the C-DU 174C replies 628 with a UE Context Setup Response message including a C-DU configuration. In general, the events 625/626 and 627/628 can occur in either order, or these events can be interleaved.

In some implementations, the S-CU 172 may include a CHO indication in the UE Context Setup Request message 627 to indicate the DU 174C to generate the C-DU configuration for CHO for the UE 102. Thus, the DU 174C generates the C-DU configuration for CHO in response to the CHO indication. The S-CU 172 does not include a CHO indication in the UE Context Setup Request message 625 to indicate the DU 174B to generate the T-DU configuration for immediate handover for the UE 102. Thus, the DU 174B becomes the T-DU 174B for the UE 102 in response to the UE Context Setup Request message 625 without the CHO indication. In other implementations, the S-CU 172 may include a common conditional indication (i.e., common for CHO and CPAC with and/or without SN change) in the UE Context Setup Request message 627 to indicate the C-DU 174C to generate the C-DU configuration. A DU 174 generates a C-DU configuration for CHO in response to the common conditional indication if a UE Context Setup Request message received by the DU 174 includes a HandoverPreparationInformation IE or includes a CellGroupConfig IE including a CellGroupID IE set to 0. In other words, the S-CU 172 includes a HandoverPreparationInformation IE or a CellGroupConfig IE with a CellGroupID IE set to 0 in the UE Context Setup Request message 627 to indicate the C-DU 174C to generate the C-DU configuration for CHO.

If a UE Context Setup Request message received by a DU 174 neither includes the CHO indication nor the common conditional indication, the DU 174C generates a T-DU configuration for immediate handover if the UE Context Setup Request message includes a HandoverPreparationInformation IE or a CellGroupConfig IE with a CellGroupID IE set to 0. For example, the S-DU 172 includes a HandoverPreparationInformation IE or a CellGroupConfig IE with a CellGroupID IE set to 0 in the UE Context Setup Request message 625 for the UE 102, so that the T-DU 174B generates the T-DU configuration for immediate handover.

In other implementations, the S-CU 172 does not include a conditional indication (e.g., the CHO indication or the common indication) in the UE Context Setup Request message 625 and the UE Context Setup Request message 627. In these implementations, the T-DU 174B and C-DU 174C are transparent to the "immediate" and "conditional" handover preparation. That is, the S-CU 172 determines to use a DU configuration received from a DU 174 as a T-DU configuration or a C-DU configuration. In other words, a DU 174 does now know it is a T-DU or a C-DU for a UE. A DU 174 generates the DU configuration for handover if a UE Context Setup Request message received by the DU 174 includes a HandoverPreparationInformation IE or a CellGroupConfig IE with a CellGroupID IE set to 0.

The C-DU 174 may include a CellGroupID IE set to 0 in the C-DU configuration for CHO and the T-DU 174 may include a CellGroupID IE set to 0 in the T-DU configuration for immediate handover. In some implementations, the S-CU 172 may send a UE Context Modification Request message to the T-DU 174 or the C-DU 174 instead of the UE Context Setup Request message and the T-DU 174 or C-DU 174 sends a UE Context Modification Response message to the S-CU 172 instead of the UE Context Setup Request message.

The C-DU configuration can include the parameters and configurations for the UE 102 to access a C-PCell associated with the C-DU 174C. The S-CU 172 generates 640 a C-MN configuration including the C-DU configuration received 628 from the C-DU 174C. The S-CU 172 transmits 645 a UE Context Modification Request message to the S-DU 174A including a handover command message with the T-DU configuration as well as a conditional configuration, which includes the C-MN configuration. The handover command message may further include configuration the S-CU 172 generated. The S-DU 174A then transmits 646 the handover command message including the T-DU configuration and the conditional configuration with the C-MN configuration to the UE 102. In one implementation, the S-DU 174A also transmits a UE Context Modification Response message to the CU 172 in response to the UE Context Modification Request message (not shown in FIG. 6A).

In response to receiving 646 the handover command message, the UE 102 performs 653 a random access procedure with the T-DU 174B, e.g., by using one or more random access configurations in the T-DU configuration. During the random access procedure 653, the UE may transmit 654 a handover complete message to the T-DU 174B in response to the handover request message 646, and the T-DU 174B in turn transmits 655 the handover complete message to the S-CU 172. If the UE 102 successfully completes the random access procedure 663, the UE 102 begins to communicate 562 with the S-CU 172 via the T-DU 174B. More specifically, the UE 102 communicates with the T-DU 174B in accordance with the configuration included in the T-DU configuration. If the handover command message includes a configuration generated by the S-CU 172, the UE 102 communicates with the S-CU 172 in accordance with the configuration generated by the S-CU 172.

The UE 102 may later determine 670 that a condition for connecting to a C-PCell is satisfied. The UE 102 accordingly initiates 682 a random access procure on the C-PCell. The UE 102 performs 682 the random access procedure with the C-DU 174C via the C-PCell, e.g., by using one or more random access configurations. During or after the random access procedure 682, the UE 102 can transmit 674 a handover complete message to the C-DU 174C in response to the detection 670. The C-DU 174C in turn transmits the handover complete message to the S-CU 172. In one such implementation, the C-DU 174C sends a UL RRC Message Transfer message including the handover complete message to the S-CU 172 (not shown). If the UE successfully completes the random access procedure 682, the UE 102 communicates 692 with the S-CU 172 via the C-DU 174C in accordance with the C-MN configuration. More specifically, the UE 102 communicates with the C-DU 174C in accordance with the configuration included in the C-DU configuration. If the C-MN configuration includes a configuration generated by the S-CU 172, the UE 102 communicates with the S-CU 172 in accordance with the configuration generated by the S-CU 172 and included in the C-MN configuration.

In some implementations, the UE Context Setup Request, UE Context Setup Response, UE Context Modification Request, UE Context Modification Response messages conform to 3GPP TS 38.473. When the T-DU 174B or the C-DU 174C transmit the T-DU configuration and the C-DU configuration, respectively, to the S-CU 172, the T-DU 174B and the C-DU 174C can use a DU to CU RRC Information IE. The S-CU 172 can include a CU to DU RRC Information IE in the UE Context Modification Request message.

In some implementations, the S-DU configuration or the T-DU configuration can be a CellGroupConfig IE. In other implementations, the S-DU configuration or the T-DU configuration can include multiple configurations such as physical layer configurations, a MAC configuration, an RLC configuration, and/or the one or more random access configurations. In some implementations, the C-DU configuration can be a CellGroupConfig IE. In other implementations, the C-DU configuration can include multiple configurations such as physical layer configurations, a MAC configuration and/or an RLC configuration, and/or the one or more random access configuration.

In some implementations, the S-MN configuration includes an S-DU configuration generated by the S-DU 174A. In one implementation, the S-CU 172 includes the S-DU configuration or the S-MN configuration in the UE Context Setup Request message (event 625). The T-DU 174B may generate the T-DU configuration which can include a "delta" configuration or one or more configurations that augment the S-DU configuration. The UE 102 in this case can use the delta T-DU configuration together with the S-DU configuration to communicate with the T-DU 174B. Alternatively, the T-DU 174B may generate the T-DU configuration which can be a complete and self-contained configuration (i.e., a full configuration). The UE 102 in this case can directly use the T-DU configuration to communicate with the T-DU 174B without relying on the S-DU configuration.

In other implementations, the S-CU 172 includes neither the S-DU configuration nor the S-MN configuration in the UE Context Setup Request message (event 625). Because the T-DU 174B cannot refer to an S-DU configuration, the T-DU 174B may generate the T-DU configuration which can be a complete and self-contained configuration (i.e., a full configuration). The UE 102 in this case can directly use the T-DU configuration to communicate with the T-DU 174B without relying on the S-DU configuration.

In some implementations, the S-CU 172 includes the S-DU configuration or the S-MN configuration in the UE Context Setup Request message (event 627). The C-DU 174C may generate the C-DU configuration which can include a "delta" configuration or one or more configurations that augment the S-DU configuration. The UE 102 in this case can use the delta C-DU configuration together with the S-DU configuration to communicate with the C-DU 174C. Alternatively, the C-DU 174C may generate the C-DU configuration which can be a complete and self-contained configuration (i.e., a full configuration). The UE 102 in this case can directly use the C-DU configuration to communicate with the C-DU 174C with neither relying on the S-DU configuration nor the T-DU configuration.

In other implementations, the S-CU 172 includes the T-DU configuration or the T-MN configuration in the UE Context Setup Request message (event 627). The C-DU 174C may generate the C-DU configuration which can include a "delta" configuration or one or more configurations that augment the T-DU configuration. The UE 102 in this case can use the delta C-DU configuration together with the T-DU configuration to communicate with the C-DU 174C. Alternatively, the C-DU 174C may generate the C-DU configuration which can be a complete and self-contained configuration (i.e., a full configuration). The UE 102 in this case can directly use the C-DU configuration to communicate with the C-DU 174C with neither relying on the T-DU configuration nor the S-DU configuration.

In other implementations, the S-CU 172 includes none of the S-DU configuration, the T-DU configuration, the S-MN configuration, or the T-MN configuration in the UE Context Setup Request message (event 627). The C-DU 174B may generate the C-DU configuration which can be a complete and self-contained configuration (i.e., a full configuration). The UE 102 in this case can directly use the C-DU configuration to communicate with the C-DU 174B without relying on either the S-DU configuration or the T-DU configuration.

In some implementations, the S-CU 172 includes the S-MN configuration in a HandoverPreparationInformation IE (or an RRC inter-node message) and includes the HandoverPreparationInformation IE in the UE Context Setup Request message (event 625, 627). In other implementations, the S-CU 172 includes the S-MN configuration in an RRC message (e.g., RRC reconfiguration message), includes the RRC message in a HandoverPreparationInformation IE, and includes the HandoverPreparationInformation IE in the UE Context Setup Request message (event 625, 627). In yet other implementations, the S-CU 172 includes the S-MN configuration in a HandoverPreparationInformation IE (or an RRC inter-node message) and includes the HandoverPreparationInformation IE in the UE Context Setup Request message (event 625). In other implementations, the S-CU 172 includes the S-DU configuration in a CellGroupConfig IE and includes the CellGroupConfig 1E in the UE Context Setup Request message (event 625, 627). In yet other implementations, the S-CU 172 includes the S-DU configuration in the UE Context Setup Request message (event 625, 627) without using any RRC wrapper IE (e.g., the HandoverPreparationInformation IE).

In some implementations, the S-CU 172 includes the T-MN configuration in a HandoverPreparationInformation IE (or an RRC inter-node message) and includes the HandoverPreparationInformation IE in the UE Context Setup Request message (event 627). In other implementations, the S-CU 172 includes the T-MN configuration in an RRC message (e.g., RRC reconfiguration message), includes the RRC message in a HandoverPreparationInformation IE, and includes the HandoverPreparationInformation IE in the UE Context Setup Request message (event 627). In yet other implementations, the S-CU 172 includes the T-MN configuration in a HandoverPreparationInformation IE (or an RRC inter-node message) and includes the HandoverPreparationInformation IE in the UE Context Setup Request message (event 625). In other implementations, the S-CU 172 includes the T-DU configuration in a CellGroupConfig IE and includes the CellGroupConfig 1E in the UE Context Setup Request message (event 625, 627). In yet other implementations, the S-CU 172 includes the T-DU configuration in the UE Context Setup Request message (event 625, 627) without using any RRC wrapper IE (e.g., the HandoverPreparationInformation IE).

In some implementations, the S-CU 172 includes a configuration ID in the conditional configuration or the handover command.

In addition to immediate and conditional handover procedures, the UE 102 can manage configurations related to PSCell addition or change procedures, immediate and conditional. Several example scenarios related to such scenarios are discussed below with reference to FIGS. 6B-7B.

Figure 6B:
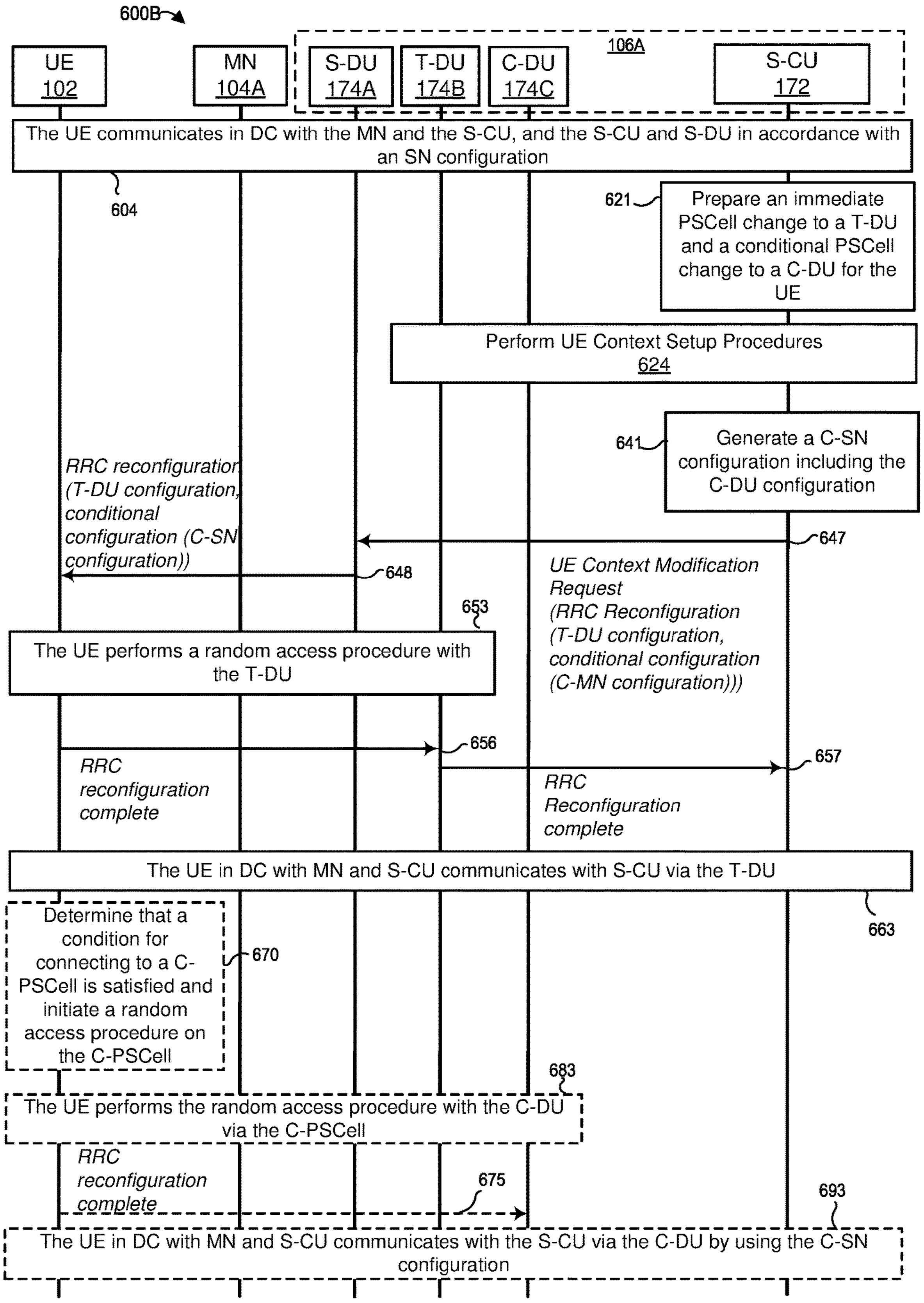
FIG. 6B is a messaging of an example scenario in which a CU initiates an immediate PSCell change for a UE to a target DU (T-DU), and generates conditional configuration for a conditional PSCell change to a candidate DU (C-DU)

Referring first to FIG. 6B, a scenario 600B involves an immediate PSCell addition or change procedure as well as a conditional PSCell addition or change configuration procedure (CPAC). The base station 104A in the scenario 600B operates as an MN, and the base station 106A operates as an SN including a CU 172 and multiple DUs. Similar to the configuration of FIG. 6A, the CU 172 operates as an S-CU 172, and the DUs include an S-DU 174A, a T-DU 174B, and a C-DU 174C.

Initially, the UE 102 communicates 604 in DC with the MN 104A and the SN 106. The UE 102 communicates 604 data (e.g., UL Data PDUs and/or DL Data PDUs) with the SN 106A via the S-CU 172 and the S-DU 174A via a cell 126A (in this case, a PSCell 126A) in accordance with an SN configuration. The S-CU 172 determines 621 that the UE 102 should go through an immediate PSCell change to the T-DU 174B. To improve the robustness of this mobility configuration, the S-CU 172 also determines 621 that it should prepare a conditional PSCell associated with the C-DU 174C for the UE 102. The S-CU 172 can make this determination in response to one or more measurement results received (directly or indirectly via the MN 104A) from the UE 102, or which the S-CU 172 obtains from measurements of signals received from the UE 102 through the S-DU 174. The S-CU 172 then performs 624 a UE context setup procedure discussed above with reference to FIG. 6A.

In some implementations, the S-CU 172 may include a CPAC indication in the UE Context Setup Request message 627 to indicate the DU 174C to generate the C-DU configuration for CPAC for the UE 102. Thus, the DU 174C generates the C-DU configuration for CPAC in response to the CPAC indication. Thus, the DU 174C becomes the C-DU 174C for the UE 102 in response to the CPAC indication. The S-CU 172 does not include a CPAC indication in the UE Context Setup Request message 625 to indicate the DU 174B to generate the T-DU configuration for immediate handover for the UE 102. Thus, the DU 174B becomes the T-DU 174B for the UE 102 in response to the UE Context Setup Request message 625 without the CPAC indication. In other implementations, the S-CU 172 may include a common conditional indication (i.e., common for CHO and CPAC with and/or without SN change) in the UE Context Setup Request message 627 to indicate the C-DU 174C to generate the C-DU configuration. A DU 174 generates a C-DU configuration for CPAC in response to the common conditional indication if a UE Context Setup Request message received by the DU 174 includes a CG-ConfigInfo IE or a CG-Config IE or includes a CellGroup-Config IE including a CellGroupID IE set to 1. In other words, the S-CU 172 includes a CG-ConfigInfo IE or a CG-Config IE, or includes a CellGroupConfig IE with a CellGroupID IE set to 1 in the UE Context Setup Request message 627 to indicate the C-DU 174C to generate the C-DU configuration for CPAC.

If a UE Context Setup Request message received by a DU 174 neither includes the CPAC indication nor the common conditional indication, the DU 174C generates a T-DU configuration for immediate PSCell addition or change if the UE Context Setup Request message includes a CG-Config-Info IE or a CG-Config IE, or includes a CellGroupConfig IE with a CellGroupID IE set to 1. For example, the S-DU 172 includes a CG-ConfigInfo IE or a CG-Config IE, or includes a CellGroupConfig IE with a CellGroupID IE set to 1 in the UE Context Setup Request message 625 for the UE 102, so that the T-DU 174B generates the T-DU configuration for immediate PSCell addition or change.

In some implementation, a CU 172 of a C-SN may include a CSAC indication in a UE Context Setup Request message to indicate a DU 172 to generate a C-DU configuration for CSAC, similar to generating a C-DU configuration for CPAC as described above. In some implementations, the common conditional indication can be common for CHO, CPAC without SN change and CSAC. A way to generate a C-DU configuration for CSAC is similar to generating a C-DU configuration for CPAC as described above. In this case, a DU 174 may not distinguish a C-DU configuration for CPAC from a C-DU configuration for CSAC. In other implementations, the common conditional indication can be common only for both CHO and the CPAC without SN change. In this case, a CU 172 of a C-SN may include a CSAC indication in a UE Context Setup Request message to indicate a DU 172 to generate a C-DU configuration for CSAC.

In other implementations, the S-CU 172 does not include a conditional indication (e.g., the CPAC indication or the common indication) in the UE Context Setup Request message 625 and the UE Context Setup Request message 627. In these implementations, the T-DU 174B and C-DU 174C are transparent to the “immediate” and “conditional” PSCell addition or change preparation. That is, the S-CU 172 determines to use a DU configuration received from a DU 174 as a T-DU configuration or a C-DU configuration. In other words, a DU 174 does now know it is a T-DU or a C-DU for a UE. A DU 174 generates the DU configuration for PSCell addition or change if a UE Context Setup Request message received by the DU 174 includes a CG-ConfigInfo IE or a CG-Config IE, or includes a CellGroupConfig IE with a CellGroupID IE set to 1.

The C-DU 174 may include a CellGroupID IE set to 1 in the C-DU configuration for CPAC and the T-DU 174 may include a CellGroupID IE set to 1 in the T-DU configuration for immediate PSCell addition or change. In some implementations, the S-CU 172 may send a UE Context Modification Request message to the T-DU 174 or the C-DU 174 instead of the UE Context Setup Request message and the T-DU 174 or C-DU 174 sends a UE Context Modification Response message to the S-CU 172 instead of the UE Context Setup Request message.

The C-DU configuration can include parameters according to which the UE 102 can access a C-PSCell associated with the C-DU 174C. The S-CU 172 generates 641 a C-SN configuration including the C-DU configuration received during the procedure 625. The S-CU 172 transmits 647 a UE Context Modification Request message to the S-DU 174A with an RRC reconfiguration message that includes the T-DU configuration and a conditional configuration. The conditional configuration in turn includes the C-SN configuration. The RRC reconfiguration message may also include the configuration generated by the S-CU 172. The S-DU 174A transmits 648 the RRC reconfiguration message including the T-DU configuration and the conditional configuration with the C-SN configuration to the UE 102. In one implementation, the S-DU 172A transmits a UE Context Modification Response message in response to receiving 647 the UE Context Modification Request message (not shown).

In response to receiving 648 the RRC reconfiguration message, the UE 102 performs 653 a random access procedure with the T-DU 174B, e.g., by using one or more random access configurations included in the T-DU configuration. During or after the random access procedure 653, the UE can transmit RRC reconfiguration complete message to the T-DU 174B, in response to the RRC reconfiguration message of the event 648. The T-DU 174B in turn forwards 657 the RRC reconfiguration complete message to the S-CU 172. The UE 102 begins to communicate 663 with the S-CU 172 via the T-DU 174B. More specifically, the UE 102 communicates with the T-DU 174B in accordance with the configuration included in the T-DU configuration. If the RRC reconfiguration message includes a configuration generated by the S-CU 172, the UE 102 communicates with the S-CU 172 in accordance with the configuration generated by the S-CU 172.

The UE 102 later may determine 670 that the trigger condition for connecting to a C-PSCell is satisfied. The UE 102 in this case initiates 670 a random access procedure on the C-PSCell. The UE 102 performs 683 the random access procedure with the C-DU 174 via the C-PSCell, e.g., by using one or random access configurations. During or after the random access procedure 630, the UE 102 may send 675 an RRC reconfiguration complete message to the C-DU 174 in response to the detection 670, and the C-DU 174C in turn forwards the RRC reconfiguration complete message to the S-CU 172. In one implementation, the C-DU 174C sends an UL RRC Message Transfer message including the RRC reconfiguration complete message to the S-CU 172. The UE 102 begins to communicates 693 in DC with the MN 104A and SN 106A, and communicates 693 with the S-CU 172 via the C-DU 174C in accordance with the C-SN configuration. More specifically, the UE 102 communicates with the C-DU 174C using the configuration included in the C-DU configuration, received during the event 648. If the C-SN configuration includes a configuration generated by the S-CU 172, the UE 102 communicates with the S-CU 172 in accordance with the configuration generated by the S-CU 172 and included in the C-SN configuration.

In some implementations, the S-SN configuration includes an S-DU configuration generated by the S-DU 174A. In one implementation, the S-CU 172 includes the S-DU configuration or the S-SN configuration in the UE Context Setup Request message (event 625). The T-DU 174B can generate the T-DU configuration which can include a "delta" configuration or one or more configurations that augment the S-DU configuration. The UE 102 in this case can use the delta T-DU configuration together with the S-DU configuration to communicate with the T-DU 174B. Alternatively, the T-DU 174B may generate the T-DU configuration which can be a complete and self-contained configuration (i.e., a full configuration). The UE 102 in this case can directly use the T-DU configuration to communicate with the T-DU 174B without relying on the S-DU configuration.

In other implementations, the S-CU 172 includes neither the S-DU configuration nor the S-SN configuration in the UE Context Setup Request message (event 625). Because the T-DU 174B cannot use an S-DU configuration, the T-DU 174B may generate the T-DU configuration which can be a complete and self-contained configuration (i.e., a full configuration). The UE 102 in this case can directly use the T-DU configuration to communicate with the T-DU 174B without relying on the S-DU configuration.

In some implementations, the S-CU 172 includes the S-DU configuration or the S-SN configuration in the UE Context Setup Request message (event 627). The C-DU 174C may generate the C-DU configuration which can include a "delta" configuration or one or more configurations that augment the S-DU configuration. The UE 102 in this case can use the delta C-DU configuration together with the S-DU configuration to communicate with the C-DU 174C. Alternatively, the C-DU 174C may generate the C-DU configuration which can be a complete and self-contained configuration (i.e., a full configuration). The UE 102 in this case can directly use the C-DU configuration to communicate with the C-DU 174C without relying on the S-DU configuration or the T-DU configuration.

In other implementations, the S-CU 172 includes the T-DU configuration or the T-MN configuration in the UE Context Setup Request message (event 627). The C-DU 174C may generate the C-DU configuration which can include a "delta" configuration or one or more configurations that augment the T-DU configuration. The UE 102 in this case can use the delta C-DU configuration together with the T-DU configuration to communicate with the C-DU 174C. Alternatively, the C-DU 174C may generate the C-DU configuration which can be a complete and self-contained configuration (i.e., a full configuration). The UE 102 in this case can directly use the C-DU configuration to communicate with the C-DU 174C without relying on the T-DU configuration.

In other implementations, the S-CU 172 includes none of the S-DU configuration, the T-DU configuration, the S-SN configuration, or the T-SN configuration in the UE Context Setup Request message (event 625). The T-DU 174B may generate the C-DU configuration which can be a complete and self-contained configuration (i.e., a full configuration). The UE 102 in this case can directly use the C-DU configuration to communicate with the C-DU 174C with neither relying on the T-DU configuration nor the S-DU configuration.

In some implementations, the S-CU 172 includes the S-SN configuration in a CG-ConfigInfo IE (or an RRC inter-node message) and includes the CG-ConfigInfo IE in the UE Context Setup Request message (event 625, 627). In other implementations, the S-CU 172 includes the S-SN configuration in an RRC message (e.g., RRC reconfiguration message), includes the RRC message in a CG-ConfigInfo IE, and includes the CG-ConfigInfo IE in the UE Context Setup Request message (event 625, 627). In other implementations, the S-CU 172 includes the S-DU configuration in a CellGroupConfig IE and includes the CellGroupConfig IE in the UE Context Setup Request message (event 625, 627). In yet other implementations, the S-CU 172 includes the S-DU configuration in the UE Context Setup Request message (event 625, 627) without using an RRC wrapper IE (e.g., the CG-ConfigInfo IE).

In some implementations, the S-CU 172 includes the T-SN configuration in an CG-ConfigInfo IE (or an RRC inter-node message) and includes the CG-ConfigInfo IE in the UE Context Setup Request message (event 627). In other implementations, the S-CU 172 includes the T-SN configuration in an RRC message (e.g., RRC reconfiguration message), includes the RRC message in a CG-ConfigInfo IE, and includes the CG-ConfigInfo IE in the UE Context Setup Request message (event 627). In other implementations, the S-CU 172 includes the T-DU configuration in a CellGroupConfig IE and includes the CellGroupConfig IE in the UE Context Setup Request message (627). In yet other implementations, the S-CU 172 includes the T-DU configuration in the UE Context Setup Request message (627) without using an RRC wrapper IE (e.g., the CG-ConfigInfo IE).

In some implementations, the S-CU 172 includes a configuration ID in the conditional configuration or the handover command.

Figure 6C:
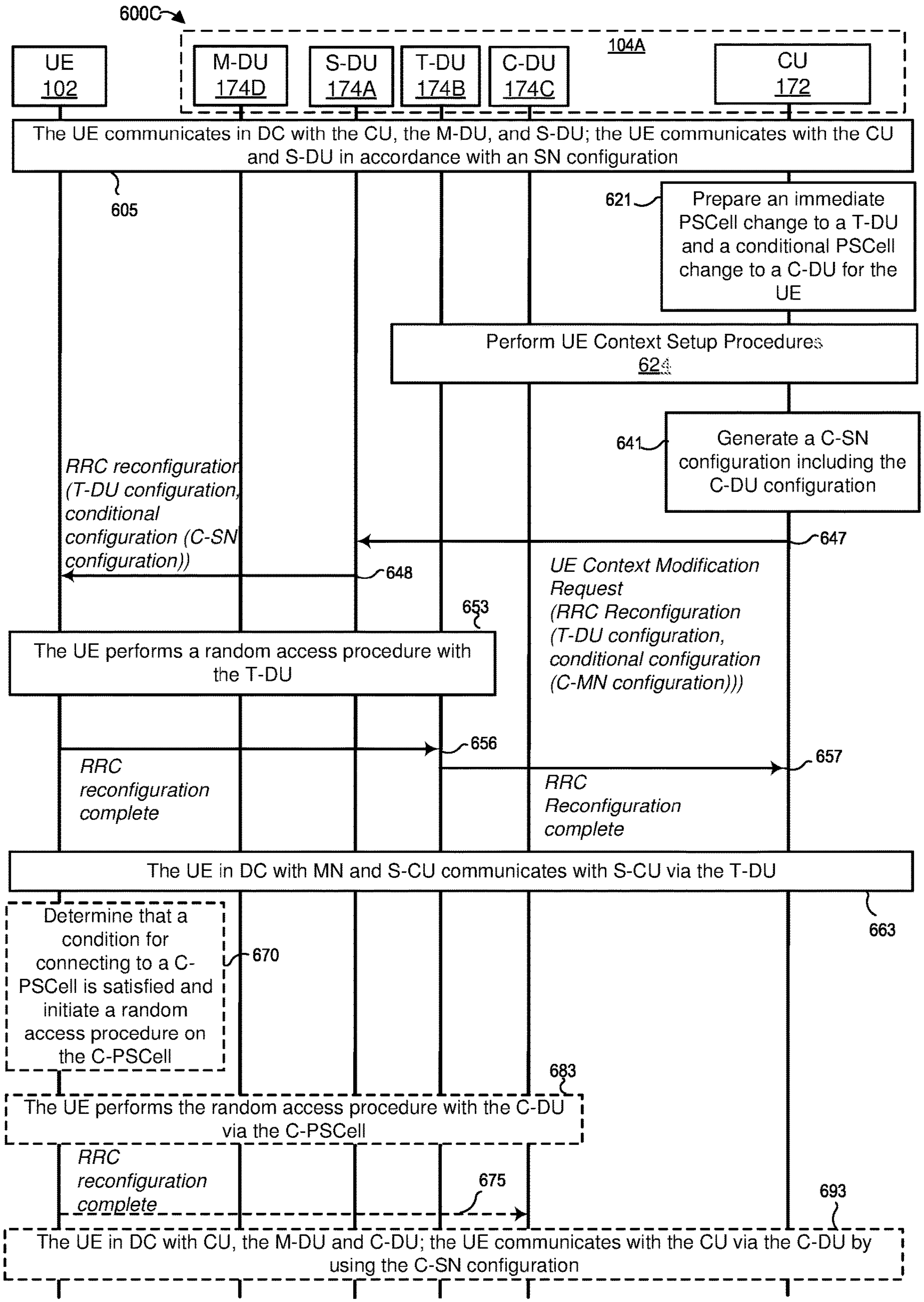
FIG. 6C is a messaging of an example scenario similar to the scenario of FIG. 6B, but with the UE operating in NR-DC with a distributed base station.

Now referring to FIG. 6C, a scenario 600C is similar to the scenario 600B of FIG. 6B, except that in this case the UE 102 communicates 605 in DC with two network elements implemented in a same base station 104A, for example. A DU 174D operates as an M-DU 174D, and the DU 174A operates as an S-DU 174, with which the UE 102 communicates via the CU 172. The UE 102 is connected to the M-DU 174D providing the cells of an MCG and operating as a master node, and to the S-DU 174A providing the cells of an SCG and operating as a secondary node. Both the M-DU 174D and the S-DU 174A connect to the same CU 172. The base station in this manner can support NR-DC operation described in 3GPP TS 37.340. Events in FIG. 6C similar to those discussed above with reference to FIG. 6B are labeled with same references numbers.

Next, FIG. 7A illustrates an example scenario 700A involving an immediate SN addition or change procedure (MN or SN initiated) as well as a CPAC procedure. The base station 104A in the scenario 700A operates as an MN, the base station 106A operates as an S-SN, and base station 104B operates as a T-SN.

Initially, the UE 102 communicates 706 (e.g., transmits and receives UL Data PDUs and/or DL Data PDUs) in SC with the MN 104A. Alternatively, the UE 102 can communicate 706 in DC with the MN 104A and the S-SN 106A via the PSCell 126A in accordance with an SN configuration. The S-SN 106A can transmit 730 an SN Change Required message to the MN 104A to initiate a SN-initiated immediate SN addition or change procedure. Alternatively, the MN 104A can determine 731 to perform an MN-initiated immediate SN addition or change in response to one or more measurement results received from the UE 102, or based on measurements of signals received from the UE 102.

In response to receiving 730 the SN Change Required message or in response to the determination 731, the MN 104A transmits 732 an SN Addition Request message to the T-SN 104B to request that the base station 104B as a T-SN for the UE 102. Upon receiving 732 the SN Addition Request message 708, the T-SN 104B determines 733 that it should configure a C-SN configuration for CPAC, so to make the SN change more robust. The T-SN 104B can make this determination based on one or more measurement results received from the MN 104A (e.g., via an X2 or Xn connection established between the MN 104A and the T-SN 104B), or in view of the topology, coverage, or deployment of the C-PCell, for example.

In response to receiving 732 the SN Addition Request message, the T-SN 104B sends 734 an SN Addition Request Acknowledge message including a T-SN configuration and a conditional configuration, which includes a C-SN configuration for the MN 104A. Alternatively, the T-SN 104B can include the conditional configuration in the T-SN configuration. The MN 104A can transmit 735 an SN Change Confirm message to the S-SN 106A in response to receiving 730 the SN Change Required. Further, in response to the event 734, the MN 104A can transmit 736 the RRC reconfiguration message including the T-SN configuration and the conditional configuration, which in turn includes the C-SN configuration for the UE 102. The UE 102 can transmit 737 an RRC reconfiguration complete message in response to the RRC reconfiguration message. The MN 104A can transmit 738 an SN Reconfiguration Complete message to the T-SN 104B. The SN Reconfiguration Complete message can include the RRC reconfiguration complete message received during the event 737. In some implementations, the event 735 can occur before or after the event 736 or 737. In other implementations, the MN 104A sends the SN Change Required message without sending the SN Reconfiguration Complete message.

To transmit the RRC reconfiguration message 736 to the UE 102, the MN 104A in some implementations may include the RRC reconfiguration message in an RRC container message and transmit the RRC container message to the UE 102. To transmit the RRC reconfiguration complete message 737 to the MN 104A, the UE 102 in some implementations may include the RRC reconfiguration complete message in an RRC container response message and transmit the RRC container response message to the UE 102 in response to the RRC container message.

In some cases, the conditional configuration field or IE included in the RRC reconfiguration of the event 736 includes a configuration ID that uniquely identifies the C-SN configuration or the conditional configuration. The T-SN 104B can allocate the configuration ID for example.

In response to receiving 736 the RRC reconfiguration message, the UE 102 performs 754 a random access procedure with the T-SN 104B on T-PSCell 124B, e.g. by using one or more random access configurations included in the C-SN configuration. If the UE 102 successfully completes the random access procedure 754, the UE 102 begins to communicate 764 in DC with the MN 104A and the T-SN 104B. The UE 102 communicates with the T-SN 104B using the configuration in the T-SN configuration. To access the T-PSCell 124B, the UE 102 in some implementations can disconnect from the PSCell 126A and/or the S-SN 106A.

The UE 102 at a later time can determine 770 that a condition for connecting to a C-PSCell is satisfied and initiate a random access procure on the C-PSCell in response to this determination. The UE 102 then performs 784 the random access procedure with the T-SN 104B via the C-PSCell, e.g., using one or more random access configurations included in the C-SN configuration. If the UE 102 successfully completes the random access procedure 784, the UE 102 communicates 794 with the T-SN 104B via the C-PSCell in accordance with the configuration in the C-SN configuration. To access the C-PSCell, the UE 102 in some implementations disconnects from the T-PSCell 124B.

In some implementations, the UE 102 transmits an RRC message to the MN 104A in response to the detection 770. In response to the RRC message, the MN 104A can transmit an interface message to the T-SN 104B. In one implementation, the RRC message includes an RRC reconfiguration complete message similar to the RRC reconfiguration complete message of the event 737, and the MN 104A can include the RRC reconfiguration complete message in the interface message. The RRC reconfiguration complete message can include a transaction identity/identifier (ID) set to a value different from the RRC reconfiguration complete message of the event 737. The UE 102 can set the value of the transaction ID to a value of a transaction ID included in the C-SN configuration of the event 736. The RRC message can be a ULInformationTransferMRDC message, an RRCConnectionReconfigurationComplete message, or an RRCReconfigurationComplete message. In another implementation, the RRC message does not include a RRC reconfiguration complete message. The RRC message can be a UEAssistanceInformation message, a notification message, or an indication message. In some implementations, the interface message can be a SN Reconfiguration Complete message. In yet other implementations, the interface message can be a notification message (e.g., Notification Control Indication message or Activity Notification message). In still other implementations, the interface message can be an RRC Transfer message.

The C-SN configuration can include multiple configuration parameters for the UE 102 to communicate with the T-SN 104B via the C-PSCell and may include random access configurations for the UE 102 to perform a random access procedure with the T-SN 104B via the C-PSCell 126A. The configuration parameters can configure radio resources for the UE 102 to communicate with the T-SN 104B via the C-PSCell 126A as well as zero, one, or more candidate secondary cells (C-SCells) of the T-SN 104B. The multiple configuration parameters can configure zero, one, or more radio bearers, which can include an SRB and/or one or more DRBs.

The T-SN configuration can include multiple configuration parameters for the UE 102 to communicate with the T-SN 104B via the T-PSCell 124B and zero, one, or more secondary cells (SCells) of the T-SN 104B. The multiple configuration parameters can configure radio resources for the UE 102 to communicate with the T-SN 104B via the T-PSCell 124B as well as zero, one, or more SCells of the T-SN 104B. The configuration parameters may configure zero, one, or more radio bearers, which can include an SBR and/or one or more DRBs.

In some implementations, the T-SN 104B includes, in the conditional configuration information, a trigger condition the UE 102 detects at the event 770. In other implementations, the T-SN 104B includes the trigger condition in the C-SN configuration. In yet other implementations, the T-SN 104B can include the C-SN configuration and the trigger condition in the RRC reconfiguration message of the event 734 as respective elements (e.g., fields, IEs) of the message.

In some implementations, the SN Change Required, SN Addition Request, SN Addition Request Acknowledge, and SN Reconfiguration Complete messages conform to 3GPP TS 37.340 and 36.423 or 38.423. When the MN 104 is a gNB, the RRC container message can be an RRCReconfiguration message and the RRC container response message can be an RRCReconfigurationComplete message. When the MN 104 is implemented as an eNB or ng-eNB, the RRC container message can be an RRCConnectionReconfiguration message, and the RRC container response message can be an RRCConnectionReconfigurationComplete message.

If the T-SN 104B is a next generation eNB (ng-eNB), the RRC reconfiguration message 734, 736 is an RRCConnectionReconfiguration message, and the RRC reconfiguration complete message 737 is an RRCConnectionReconfigurationComplete message. When the T-SN 104B is an gNB, the RRC reconfiguration message 734, 736 is am RRCReconfiguration message, and the RRC reconfiguration complete message 737 is an RRCReconfigurationComplete message.

In some implementations, the C-SN configuration can include a group configuration (CellGroupConfig) IE that configures the C-PSCell 126A and may configure zero, one, or more C-SCells of the SN 106A. In one implementation, the C-SN configuration can be an RRCReconfiguration message, RRCReconfiguration-IEs or the CellGroupConfig IE that conforms to 3GPP TS 38.331. The full configuration indication may be a field or an IE that conforms to 3GPP TS 38.331. In other implementations, the C-SN configuration can include an SCG-ConfigPartSCG-r12 IE that configures the C-PSCell 126A and may configure zero, one, or more C-SCells of the SN 106A. In one implementation, the C-SN configuration can be an RRCConnectionReconfiguration message, RRCConnectionReconfiguration-IEs or the ConfigPartSCG-r12 IE that conforms to 3GPP TS 36.331. The full configuration indication may be a field or an IE that conforms to 3GPP TS 36.331.

In some implementations, the T-SN configuration can include a CellGroupConfig 1E that configures the PSCell as well as zero, one, or more SCells of the SN 106A. The T-SN configuration can further include one or more additional configurations. In one implementation, the T-SN configuration can be an RRCReconfiguration-IEs or the CellGroupConfig IE that conforms to 3GPP TS 38.331. In other implementations, the T-SN configuration can include an SCG-ConfigPartSCG-r12 IE that configures the PSCell as well as zero, one, or more SCells of the SN 106A. The T-SN configuration can further include one or more additional configurations. In one implementation, the T-SN configuration can be an RRCConnectionReconfiguration-IEs or the ConfigPartSCG-r12 IE that conforms to 3GPP TS 36.331.

In some implementations, the S-MN 104A includes the S-SN configuration in a CG-ConfigInfo IE (or an RRC inter-node message) and includes the CG-ConfigInfo IE in the SN Addition Request message (event 732). In other implementations, the S-MN 104A can include the S-SN configuration in an RRC message (e.g., RRC reconfiguration message), includes the RRC message in a CG-ConfigInfo IE, and includes the CG-ConfigInfo IE in the SN Addition Request message (event 732). In yet other implementations, the S-MN 104A does not include the S-SN configuration in the SN Addition Request message (event 732).

The T-SN configuration in some implementations can be a complete and self-contained configuration (i.e., a full configuration). The T-SN configuration may include a full configuration indication (an information element (IE) or a field) that identifies the T-SN configuration as a full configuration. The UE 102 in this case can directly use the T-SN configuration to communicate with the SN 104B without relying on the S-SN configuration. On the other hand, the T-SN 104B generates the T-SN configuration which can include a “delta” configuration, or one or more configurations that augment the S-SN configuration. The UE 102 in this case can use the delta T-SN configuration together with the S-SN configuration to communicate with the SN 104B.

The C-SN configuration in some implementations can be a complete and self-contained configuration (i.e., a full configuration). The C-SN configuration may include a full configuration indication (an information element (IE) or a field) that identifies the C-SN configuration as a full configuration. The UE 102 in this case can directly use the C-SN configuration to communicate with the T-SN 104B with neither relying on the S-SN configuration nor the T-SN configuration. In other cases, the T-SN 104B generates the C-SN configuration which can include a “delta” configuration, or one or more configurations that augment the S-SN configuration. The UE 102 in this case can use the delta C-SN configuration together with the S-SN configuration to communicate with the SN 104B. In yet other cases, the T-SN 104B generates the C-SN configuration which can include a “delta” configuration, or one or more configurations that augment the T-SN configuration. The UE 102 in this case can use the delta C-SN configuration together with the T-SN configuration to communicate with the SN 104B.

FIG. 7B illustrates a generally similar scenario 700B that also involves an immediate SN addition or change procedure (MN or SN initiated) with a CPAC procedure. In this scenario, the UE 102 performs the CPAC procedure after failing to complete the immediate procedure. Moreover, the UE 102 in some implementations can treat the failure of the immediate procedure as an equivalent of the trigger condition being satisfied (see also the discussion of FIG. 3B above). Events in FIG. 7B similar to those of FIG. 7A are labeled with same references numbers. The differences between the scenarios of FIGS. 7A and 7B are discussed below.

In response to the RRC reconfiguration message of the event 737, the UE attempts to connect to the T-PSCell 124B. However, the UE 102 fails 771 to connect to the T-PSCell 124B. In some implementations or scenarios, the UE 102 starts a timer (e.g., timer T304 or T307) in response to receiving 737 the RRC reconfiguration message. The UE 102 can fail to complete a random access procedure on the T-PCell 124B before the timer expires and, due to expiration of the timer, the UE 102 determines that the immediate procedure failed.

In response to detecting 771 the failure of the immediate procedure, the UE 102 can initiate 772 a random access procedure on the C-PSCell. The UE 102 performs 784 the random access procedure with the T-SN 104B via the C-PSCell when the UE 102 determines the C-PCell is suitable, although the UE 102 may not have detected that the trigger condition for the CPAC procedure is satisfied. Thus, the UE 102 initiates 784 the random access procedure on the C-PCell in response to the failure of the immediate procedure if the UE 102 determines the C-PCell is suitable, regardless of whether the UE 102 determines that the trigger condition is satisfied. In other implementations, however, the UE 102 begins to periodically check whether the trigger condition is satisfied after detecting 771 the failure of the immediate procedure.

Now referring to FIGS. 8A and 8B, the UE 102 in some cases can manage configurations related to SN addition or change procedures, immediate and conditional (CSAC).

An example scenario 800A of FIG. 8A involves immediate SN addition or change procedure (MN initiated) with a CSAC procedure. The base station 104A in the scenario 800A operates as an MN, the base station 106A operates as an S-SN, the base station 104B operates as a T-SN, and the base station 106B operates as C-SN. The differences between the scenarios FIG. 7A and FIG. 8A are described below.

Initially, the UE 102 operates 807 in SC with the MN 104A and uses an S-MN configuration to communicate data (e.g., UL Data PDUs and/or DL Data PDUs); or the UE 102 operates 807 in DC with the MN 104A and the S-SN 106A, using an SN configuration to communicate data with the S-SN 106A. The MN 104A can determine 839 that it should initiate an immediate SN addition or change as well as a CSAC procedure (e.g., in response to one or more measurement results received from the UE 102 or from measurements on signals received from the UE 102). The MN 104A can make the determination to perform the immediate SN change based on one or more measurement results received from the UE, e.g., if the one or more measurement results are above a first threshold. The MN 104A can make this determination to perform the CSAC based on one or more measurement results received from the UE, e.g., if the one or more measurement results are above the first threshold or a second threshold. The second threshold can be different from the first threshold: e.g., the first threshold can be higher than the second threshold, so that the MN 104A can communicate the UE 102 via the T-SN 104B with better signal strength/quality than the C-SN 106B.

In response to the determination of the event 839, the S-MN 104A transmits 851 an SN Request message to the C-SN 106B, and the C-SN 106B transmits 852 an SN Request Acknowledge message including a C-SN configuration in response. The events 851 and 852 together define an SN request procedure 850. In some implementations, the SN Request message is an SN Addition Request message with an indication of conditional operation, and the SN Request Acknowledge message is an SN Addition Request Acknowledge message.

In response to the determination 839, the MN 104A further can transmit 855 an SN Addition Request message to the T-SN 104B. The T-SN 104B in response transmits 856 an SN Addition Request Acknowledge message including an RRC reconfiguration message with a T-SN configuration. The events 855 and 856 collectively define an SN addition procedure 854. The base stations can execute the procedures 850 and 854 in the order illustrated in FIG. 8B, or execute the procedure 854 prior to executing the procedure 850, or execute the procedures 850 and 854 concurrently.

The MN 104A transmits 835, to the UE 102, an RRC container message including the RRC reconfiguration message of the event 856 and a conditional configuration, which can include the C-SN configuration. The UE 102 in response transmits 836 an RRC container response message. The UE 102 in some implementations includes an RRC reconfiguration complete message in the RRC container response message to respond the RRC reconfiguration message. The MN 104A in turn transmits 838 an SN Reconfiguration Complete message to the T-SN 104B. In response to the RRC reconfiguration message of the event 835, the UE 102 performs 854 a random access procedure with T-SN 104B via the T-PSCell 124B, e.g., using one or more random access configurations included in the T-SN configuration. After the UE 102 completes the random access procedure 854, the UE 102 begins to communicate 864 in DC with the MN 104A and the T-SN 104B, and uses the T-SN configuration to communicate with the T-SN 104B. To access the T-PSCell 124B, the UE 102 in some implementations disconnects from the PSCell 126A and/or the S-SN 106A.

The UE 102 later can determine 870 that the trigger condition for connecting to the C-PSCell 126B is satisfied and initiate a random access procedure on the C-PSCell 126B. The UE 102 then performs 885 the random access procedure with the C-SN 106B via the C-PSCell 126B, e.g., by using one or more random access configurations included in the C-SN configuration. The UE 102 communicates 895 with the C-SN 106B via the C-PSCell in accordance with the configurations in the C-SN configuration. To access the C-PSCell, the UE 102 in some implementations disconnects from the T-PSCell 124B.

In some implementations, the MN 104A includes the C-SN configuration in a conditional configuration field or IE. In other implementations, the MN 104A includes the C-SN configuration in an additional RRC container message and then includes the additional RRC container message in the conditional configuration field or IE. In some implementations, the MN 104A includes a first transaction ID in the RRC container message of the event 835 and include a second transaction ID in the additional RRC container message. The MN 104A can set the first and second transaction ID to different first and second values, respectively. The UE 102 can include a transaction ID in the RRC container response message and set a value of the transaction ID to the first value.

In some implementations, the MN 104A includes a trigger condition in the conditional configuration of the event 835. In other implementations, the MN 104A include the C-SN configuration and a trigger condition in the RRC container message of the event 835.

In some implementations, the UE 102 transmits an additional RRC container response message to the MN 104A in response to the detection 870. In response to the additional RRC container message, the MN 104A sends an interface message to the T-SN 104B. The UE 102 can include a transaction ID in the additional RRC container response message and set a value of the transaction ID to the second value of the second transaction ID in the additional RRC container message. The MN 104A can identify the additional RRC container response message responding to the additional RRC container message by using the value of the transaction ID.

In some implementations, the additional RRC container response message may include an RRC reconfiguration complete message similar to the RRC reconfiguration complete message of the event 838, and the MN 104A can include the RRC reconfiguration complete message in the interface message. The RRC reconfiguration complete message may include a transaction identifier set to a value different from a value of a transaction ID included in the RRC reconfiguration complete message of the event 836. The UE 102 can set the value of the transaction ID to a value of a transaction ID included in the C-SN configuration. In some implementations, the interface message can be a SN Reconfiguration Complete message. In other implementations, the interface message can be a notification message (e.g., a Notification Control Indication message or an Activity Notification message). In yet other implementations, the interface message can be an RRC Transfer message.

When the MN 104 is implemented a gNB, the RRC container message of the event 835 and the additional RRC container message can be RRCReconfiguration messages, and the RRC container response message 836 and the additional RRC container response message can be RRCReconfigurationComplete messages. When the MN 104 is implemented as an eNB or ng-eNB, the RRC container message of the event 835 and the additional RRC container message can be an RRCConnectionReconfiguration message and the RRC container response message 816, and the additional RRC container response message can be RRCConnectionReconfigurationComplete messages.

In some implementations, the S-MN 104A includes the S-SN configuration in the SN Addition Request message (event 855). The T-SN 104B generates the T-SN configuration which can include a "delta" configuration or one or more configurations that augment the S-SN configuration. The UE 102 in this case can use the delta T-SN configuration together with the S-SN configuration to communicate with the T-SN 104B. Alternatively, the T-SN 104B may generate the T-SN configuration which can be a complete and self-contained configuration (i.e., a full configuration). The UE 102 in this case can directly use the T-SN configuration to communicate with the T-SN 104B without relying on the S-SN configuration.

In other implementations, the S-MN 104A does not include the S-SN configuration in the SN Addition Request message (event 855). Because the T-SN 104B cannot refer to an S-SN configuration, the T-SN 104B may generate the T-SN configuration which can be a complete and self-contained configuration (i.e., a full configuration). The UE 102 in this case can directly use the T-SN configuration to communicate with the T-SN 104B without relying on the S-SN configuration.

In some implementations, the S-MN 104A includes the S-SN configuration in the SN Request message (event 851). The C-SN 106B may generate the C-SN configuration which can include a "delta" configuration or one or more configurations that augment the S-SN configuration. The UE 102 in this case can use the delta C-SN configuration together with the S-SN configuration to communicate with the C-SN 106B. In other implementations, the S-MN 104A may include the T-SN configuration in the SN Request message (event 851). The C-SN 106B may generate the C-SN configuration which can include a "delta" configuration or one or more configurations that augment the T-SN configuration. The UE 102 in this case can use the delta C-SN configuration together with the T-SN configuration to communicate with the C-SN 106B. In yet other implementations, the C-SN 106B may generate the C-SN configuration which can be a complete and self-contained configuration (i.e., a full configuration). The UE 102 in this case can directly use the C-SN configuration to communicate with the C-SN 106B without relying on the S-SN configuration or the T-SN configuration.

In additional implementations, the S-MN 104A includes neither the S-SN configuration or the T-SN configuration in the SN Request message (event 851). The C-SN 104B may generate the C-SN configuration which can be a complete and self-contained configuration (i.e., a full configuration). The UE 102 in this case can directly use the C-SN configuration to communicate with the C-SN 106B without relying on the T-SN configuration or the S-SN configuration.

In some implementations, the S-MN 104A includes the S-SN configuration in a CG-ConfigInfo IE (or an RRC inter-node message) and includes the CG-ConfigInfo IE in the SN Request message (event 851) or the SN Addition Request message (event 855). In other implementations, the S-MN 104A can include the S-SN configuration in an RRC message (e.g., RRC reconfiguration message), include the RRC message in a CG-ConfigInfo IE, and include the CG-ConfigInfo IE in the SN Request message (event 851) or the SN Addition Request message (event 855).

In other implementations, the S-MN 104A includes the T-SN configuration in a CG-ConfigInfo IE (or an RRC inter-node message) and include the CG-ConfigInfo IE in the SN Request message (event 851). In other implementations, the S-MN 104A can include the T-SN configuration in an RRC message (e.g., RRC reconfiguration message), include the RRC message in a CG-ConfigInfo IE, and include the CG-ConfigInfo IE in the SN Request message (event 851).

Next, FIG. 8B illustrates a scenario 800B that also involves an immediate SN addition or change procedure (MN-initiated in this case) with a CSAC procedure. In this scenario, the UE 102 performs the CSAC procedure after failing to complete the immediate procedure. Moreover, the UE 102 in some implementations can treat the failure of the immediate procedure as an equivalent of the trigger condition being satisfied (see also the discussion of FIG. 3B above). Events in FIG. 8B similar to those of FIG. 8A are labeled with same references numbers. The differences between the scenarios of FIGS. 8A and 8B are discussed below.

In response to the RRC reconfiguration message of the event 835, the UE attempts to connect to the T-PSCell 124B. However, the UE 102 fails 871 to connect to the T-PSCell 124B. In some implementations or scenarios, the UE 102 starts a timer (e.g., timer T304 or T307) in response to receiving 835 the RRC reconfiguration message. The UE 102 can fail to complete a random access procedure on the T-PSCell 124B before the timer expires, and the UE 102 determines that the immediate procedure failed.

In response to detecting 871 the failure of the immediate procedure, the UE 102 initiates 872 a random access procedure on the C-PSCell 126B. The UE 102 performs 885 the random access procedure with the C-SN 104B via the C-PSCell 126B when the UE 102 determines the C-PCell 126B is suitable, although the UE 102 may not detect the condition configured by the trigger condition configuration. In other words, the UE 102 initiates 885 the random access procedure regardless of whether the UE 102 determines that the trigger condition is satisfied. In other implementations, however, the UE 102 begins to periodically check the trigger condition after detecting 871 the failure of the immediate procedure.

Next, several example methods which a base station can implement to support robust mobility scenarios at a UE are discussed with reference to FIGS. 9-12, followed by a discussion of several methods which a UE of this disclosure can implement with reference to FIGS. 13A-19.

Figure 9:
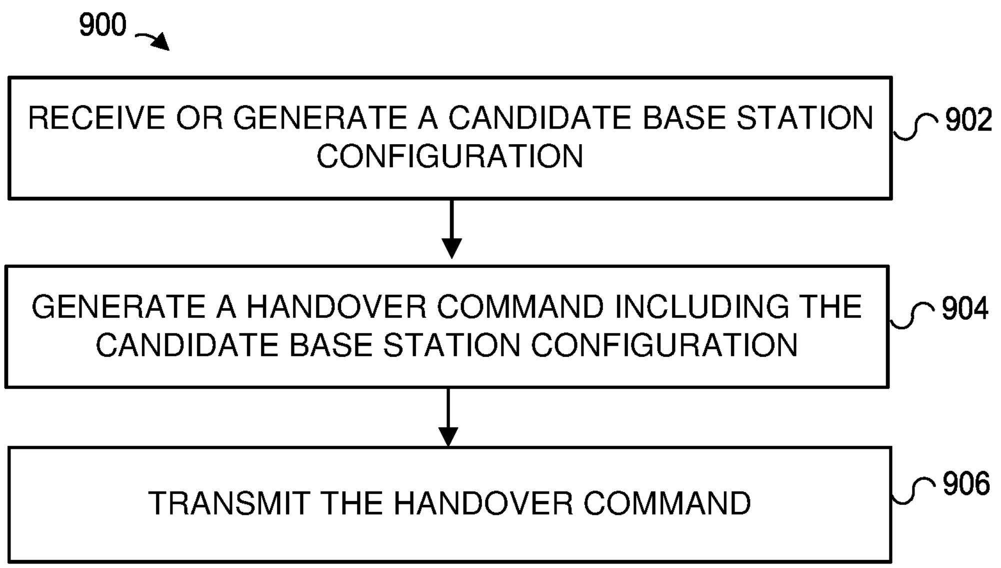
FIG. 9 is a flow diagram of an example method for transmitting conditional configuration using a handover command, which can be implemented in the MN of this disclosure.

Referring first to FIG. 9, an example method 900 for providing conditional configuration along with a message related to immediate handover to a UE can be implemented in a base station such as the T-MN 104B of FIGS. 3A, 3B and 4, the MN 104A of FIG. 5, or the S-CU 172 of FIG. 6A for example. The method 900 begins at block 902, where the base station receives (event 316 of FIGS. 3A and 3B; event 628 of FIG. 6A) or generates (event 412 of FIG. 4; event 512 of FIG. 5) a candidate base station configuration for a UE, such as the UE 102. At block 904, the base station generates a handover command for immediate handover, which includes the candidate base station configuration (event 317 of FIGS. 3A and 3B; event 412 of FIG. 4; event 512 of FIG. 5; event 640 of FIG. 6A). The base station at block 906 transmits the handover command (event 317 of FIGS. 3A and 3B; event 417 of FIG. 4; event 517 of FIG. 5; event 645 of FIG. 6A).

Figure 10:
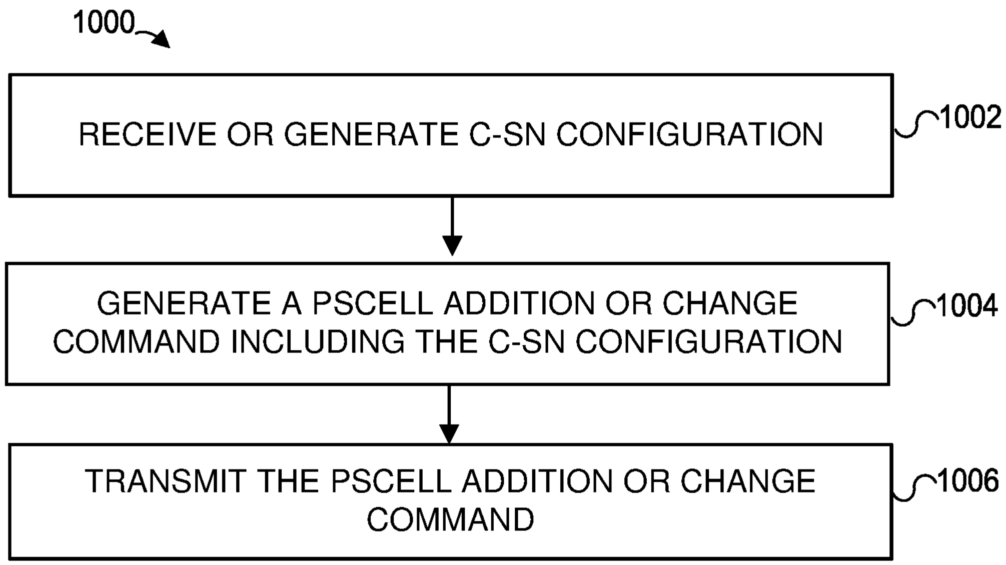
FIG. 10 is a flow diagram of an example method for transmitting a command for immediate PSCell addition or change with C-SN configuration, which can be implemented in an SN of this disclosure.

FIG. 10 illustrates an example method 1000 for providing a candidate secondary base station (C-SN) configuration with a command related to an immediate PSCell addition, which can be implemented in a base station such as the SN 106A of FIG. 6B or the T-SN 104B of FIGS. 7A and 7B.

The method 1000 begins at block 1002, where the base station receives or generates a C-SN configuration (procedure 641 of FIGS. 6B and 6C; events 733 of FIGS. 7A and 7B). At block 1004, the base station generates a PSCell addition or change command for immediate PSCell addition or change, which includes the C-SN configuration (event 641 of FIG. 6B; event 733 of FIGS. 7A and 7B). The base station at block 1006 transmits the PSCell addition or change command to the UE (event 647 of FIGS. 6B and 6C; event 734 of FIGS. 7A and 7B).

Figure 11A:
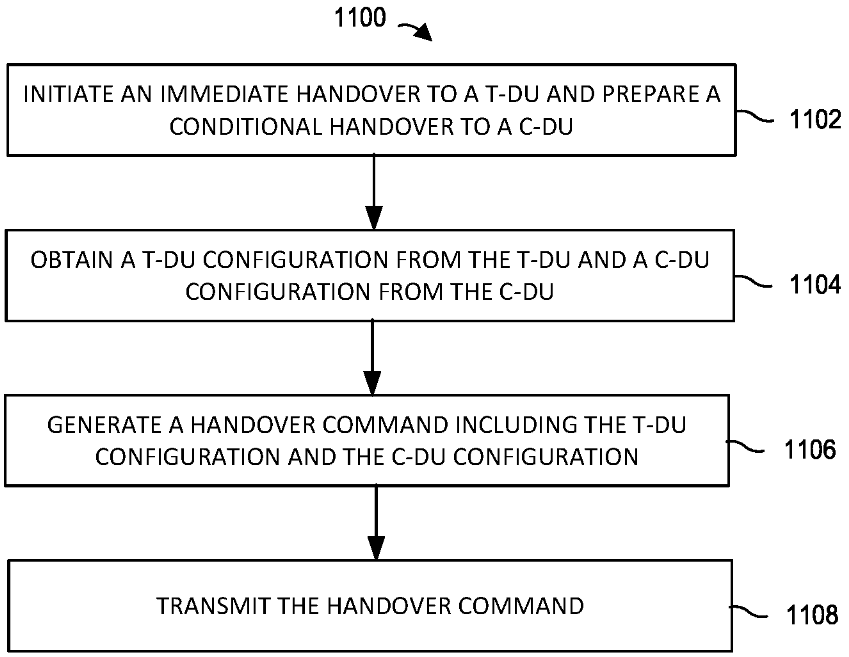
FIG. 11A is a flow diagram of an example method for including conditional configuration for a conditional handover to a candidate DU in a handover command, which can be implemented in a CU of this disclosure.

FIG. 11A illustrates an example method 1100A for providing an immediate base station configuration related to a handover along with a candidate base station configuration, which can be implemented in a CU of a distributed base station, such as the S-CU 172 of the scenario of FIG. 6A.

The method 1100A begins at block 1102, where the CU determines that it should initiate an immediate handover of a UE to a target DU and prepare a conditional handover to a candidate DU (event 620 of FIG. 6A). At block 1104, the CU obtains a T-DU configuration from the T-DU for immediate handover (event 626 of FIG. 6A) and a C-DU configuration from the C-DU for conditional handover (event 628 of FIG. 6A). The CU at block 1106 generates a handover command including the T-DU configuration and the C-DU configuration (events 640, 645 of FIG. 6A). The CU at block 1108 transmits the handover command (event 645 of FIG. 6A).

Figure 11B:
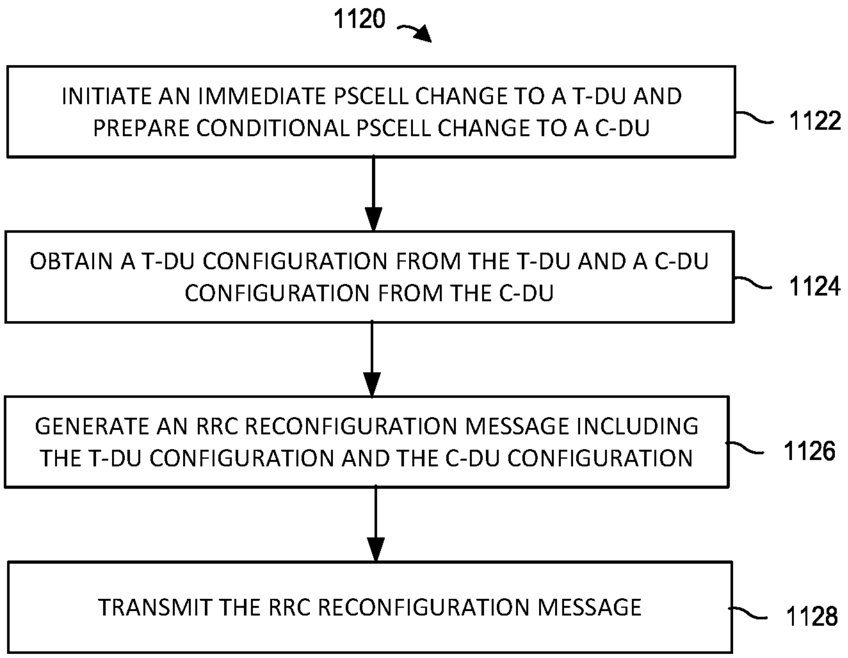
FIG. 11B is a flow diagram of an example method for including conditional configuration for a conditional PSCell change to a candidate DU in an RRC reconfiguration message, which can be implemented in a CU of this disclosure.

FIG. 11B depicts an example method 1120 for preparing an immediate PSCell change together with a conditional PSCell change, which can be implemented in a CU, such as the S-CU 172 of FIG. 6B.

The method 1120 begins at block 122, where the CU determines that it should initiate an immediate procedure for changing the serving PSCell for a UE and prepare a conditional PSCell change to a PSCell of a C-DU (event 621 of FIG. 6B). At block 1124, the CU obtains a T-DU configuration from the T-DU (event 626 of FIGS. 6A and 6B) and a C-DU configuration from the C-DU (event 628 of FIGS. 6A and 6B). The CU at block 1126 generates an RRC reconfiguration message including the T-DU configuration and the C-DU configuration (events 641, 647 of FIG. 6B). The CU at block 1128 transmits the RRC reconfiguration message (event 647 of FIG. 6B).

Figure 12:
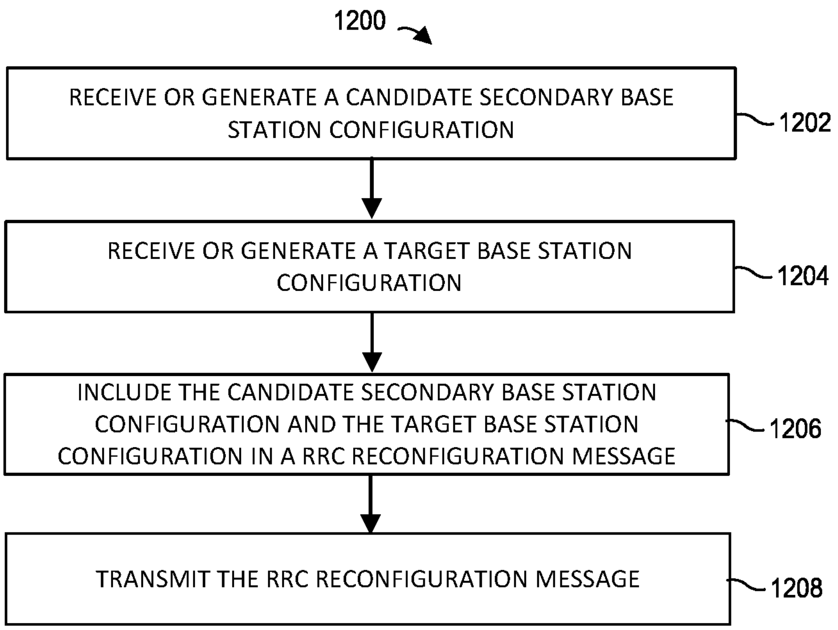
FIG. 12 is a flow diagram of an example method for providing RRC reconfiguration with C-SN configuration, which can be implemented in an SN of this disclosure.

Next, FIG. 12 illustrates an example method 1200 for preparing a candidate secondary base station configuration and an immediate secondary base station configuration, which can be implemented in a base station such as the T-SN 104B of FIGS. 7A and 7B, or the S-MN 104A of FIGS. 8A and 8B.

The method 1200 begins at block 1202, where the base station receives or generates a candidate secondary base station configuration (event 733 of FIGS. 7A and 7B; event 852 of FIGS. 8A and 8B) for CPAC or CSAC for a UE. At block 1204, the base station receives or generates a target secondary base station configuration for immediate PSCell addition or change (event 733 of FIGS. 7A and 7B; event 856 of FIGS. 8A and 8B). At block 1206, the base station includes the candidate secondary base station configuration and the T-SN configuration in an RRC reconfiguration message (event 734 of FIGS. 7A and 7B; event 835 of FIGS. 8A and 8B). The base station at block 1208 transmits the RRC reconfiguration message (event 734 of FIGS. 7A and 7B; event 835 of FIGS. 8A and 8B).

Figure 13A:
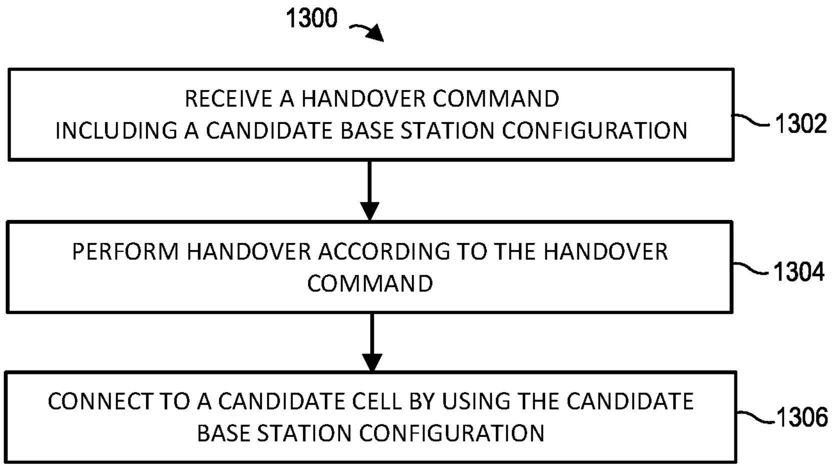
FIG. 13A is a flow diagram of an example method for executing an immediate handover followed by a conditional procedure, which can be implemented in the UE of this disclosure.

FIG. 13A depicts an example method 1300 for performing an immediate handover and applying a conditional base station configuration when connecting to a candidate cell, which can be implemented in a UE such as the UE 102.

The method 1300 begins at block 1302, where the UE receives a handover command for immediate handover, which includes a candidate base station configuration (event 318 of FIGS. 3A and 3B; event 418 of FIG. 4; event 518 of FIG. 5; event 646 of FIG. 6A). At block 1304, the UE performs handover according to the handover command (event 350 of FIGS. 3A and 3B; event 450 of FIG. 4; event 550 of FIG. 5; event 653 of FIG. 6A). The UE at block 1306 connects to a candidate cell in accordance with the candidate base station configuration (event 380 or 390 of FIGS. 3A and 3B; event 480 or 490 of FIG. 4; event 580 or 590 of FIG. 5; event 682 or 692 of FIG. 6A).

Figure 13B:
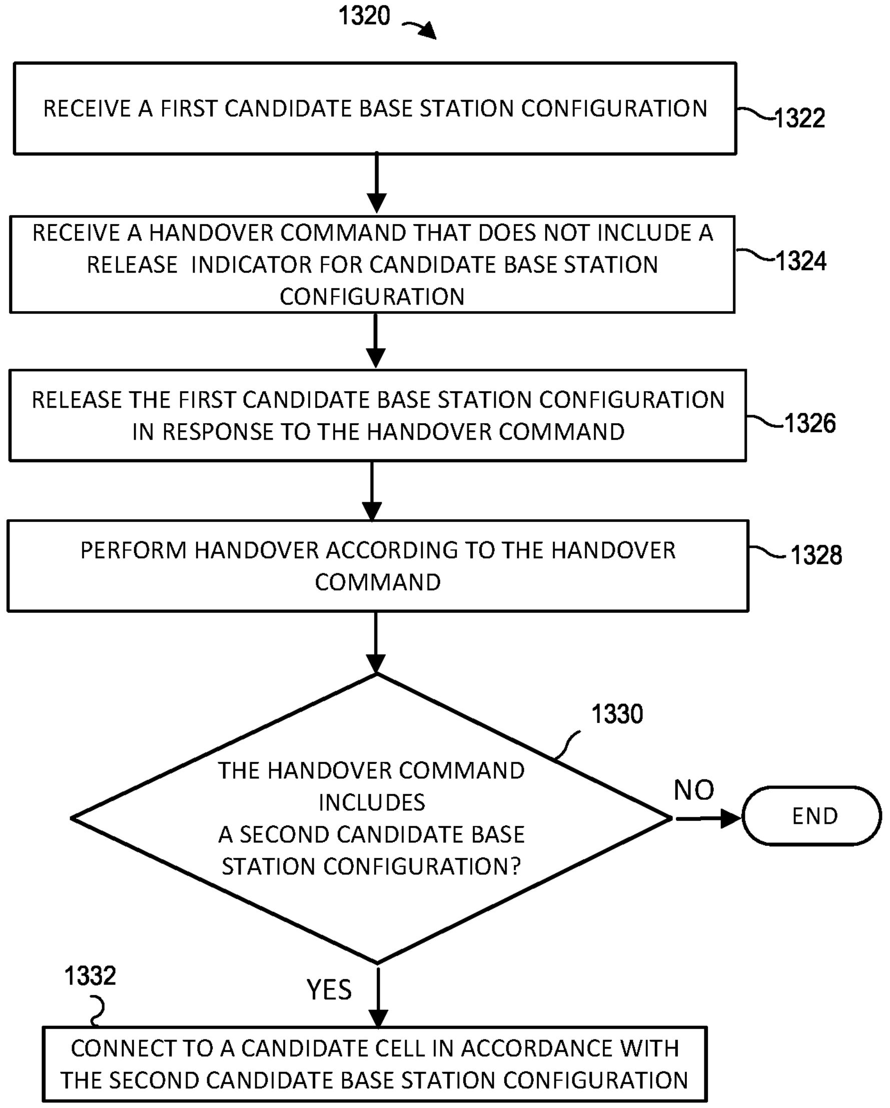
FIG. 13B is a flow diagram of an example method for executing an immediate handover and a conditional procedure in accordance with the conditional configuration included in the handover command, which can be implemented in the UE of this disclosure.

FIG. 13B depicts an example method 1320 for performing an immediate handover and managing a candidate base station configuration, which can be implemented in a UE. According to this method, the UE receives a message associated with an immediate handover procedure and, in response, releases a prior conditional configuration but retains the new conditional configuration included in the message.

The method 1320 begins at block 1322, where the UE receives a first candidate base station configuration. The UE at block 1324 receives a handover command, which in this implementation does not include a release indicator for a candidate base station configuration (event 318 of FIGS. 3A and 3B; event 418 of FIG. 4; event 518 of FIG. 5; event 646 of FIG. 6A). When present in a message, the release indicator can be an IE, a field, or a certain value of another field.

At block 1326, the UE releases the first, prior candidate base station configuration in response to the handover command. Next, at block 1328, the UE then performs the handover according to the handover command (event 350 of FIG. 3A; event 450 of FIG. 4; event 550 of FIG. 5; event 653 of FIG. 6A). At block 1330, the UE determines whether the handover command includes a second, new candidate base station configuration. The method ends when the handover does not include a new candidate base station configuration. Otherwise, the flow proceeds to block 1332, where the UE connects to a candidate cell in accordance with the second candidate base station configuration (event 380 or 390 of FIGS. 3A and 3B; event 480 or 490 of FIG. 4; event 580 or 590 of FIG. 5; event 682 or 692 of FIG. 6A).

Figure 14A:
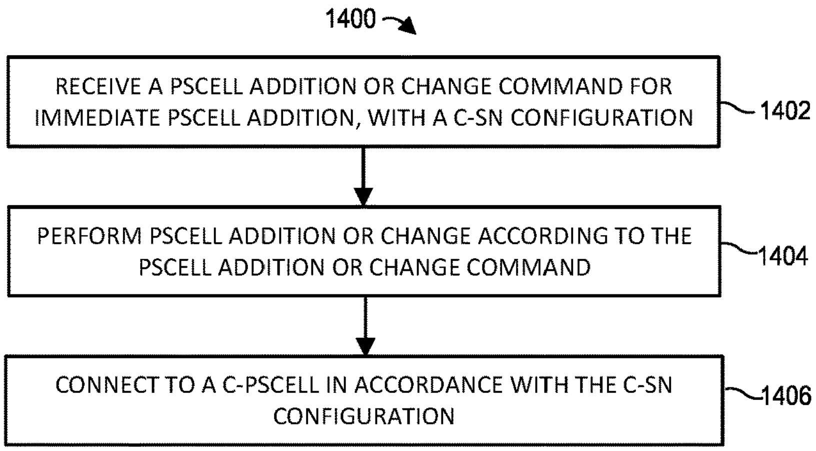
FIG. 14A is a flow diagram of an example method for performing an immediate PSCell addition or change procedure and then connecting to a C-PSCell in accordance with a conditional configuration, which can be implemented in the UE of this disclosure.

FIG. 14A depicts an example method 1402 for performing an immediate PSCell addition or change and applying a conditional PSCell change or addition configuration when connecting to a candidate PSCell, which can be implemented in a UE.

The method 1400 begins at block 1402, where the UE receives a PSCell addition or change command for immediate PSCell addition or change, which includes a candidate secondary node (C-SN) configuration (event 648 of FIGS. 6B and 6C; event 736 of FIGS. 7A and 7B; event 835 of FIGS. 8A and 8B). At block 1404, the UE performs the immediate PSCell addition or change according to the PSCell addition or change command (event 653 of FIGS. 6B and 6C; event 754 of FIGS. 7A and 7B; event 854 of FIGS. 8A and 8B). The UE at block 1406 connects to a C-PSCell by using the C-SN configuration (event 683 or 693 of FIGS. 6B and 6C; event 784 or 794 of FIGS. 7A and 7B; event 885 or 895 of FIGS. 8A and 8B).

Figure 14B:
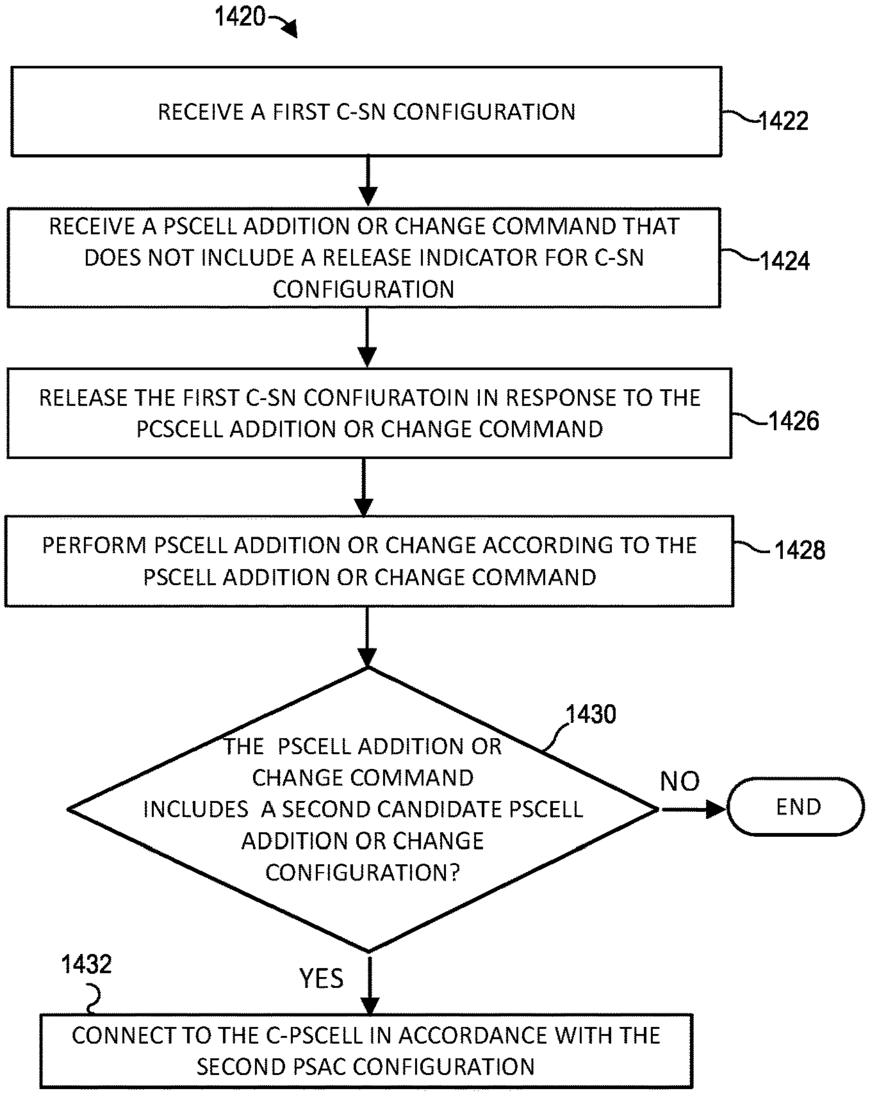
FIG. 14B is a flow diagram of an example method for performing an immediate PSCell addition or change procedure and then connecting to a C-PSCell in accordance with the conditional configuration received with a command related to the immediate PSCell addition or change procedure, which can be implemented in the UE of this disclosure.

FIG. 14B illustrates an example method for performing an immediate PSCell addition or change and applying a conditional PSCell change or addition configuration when connecting to a candidate PSCell, which can be implemented in a UE. According to this method, the UE receives a message associated with an immediate PSCell addition or change procedure and, in response, releases a prior conditional configuration but retains the new conditional configuration included in the message.

The method 1420 begins at block 1422, where the UE receives a first C-SN configuration. The UE at block 1424 receives a PSCell addition or change command for immediate PSCell addition or change, which does not include a release indicator for a candidate base station configuration. At block 1426, the UE releases the first, prior C-SN configuration in response to the PSCell addition or change command. At block 1428, the UE performs the immediate PSCell addition or change according to the PSCell addition or change command (event 653 of FIGS. 6B and 6C; event 754 of FIGS. 7A and 7B; event 854 of FIGS. 8A and 8B). Next, at block 1430, the UE checks whether the PSCell addition or change command includes a second, new C-SN configuration. The method ends when the handover does not include a new candidate base station configuration. Otherwise, the flow proceeds to block 1432, where the UE connects to a candidate cell in accordance with the second candidate base station configuration (event 683 or 693 of FIGS. 6B and 6C; event 784 or 794 of FIGS. 7A and 7B; event 885 or 895 of FIGS. 8A and 8B).

Figure 15:
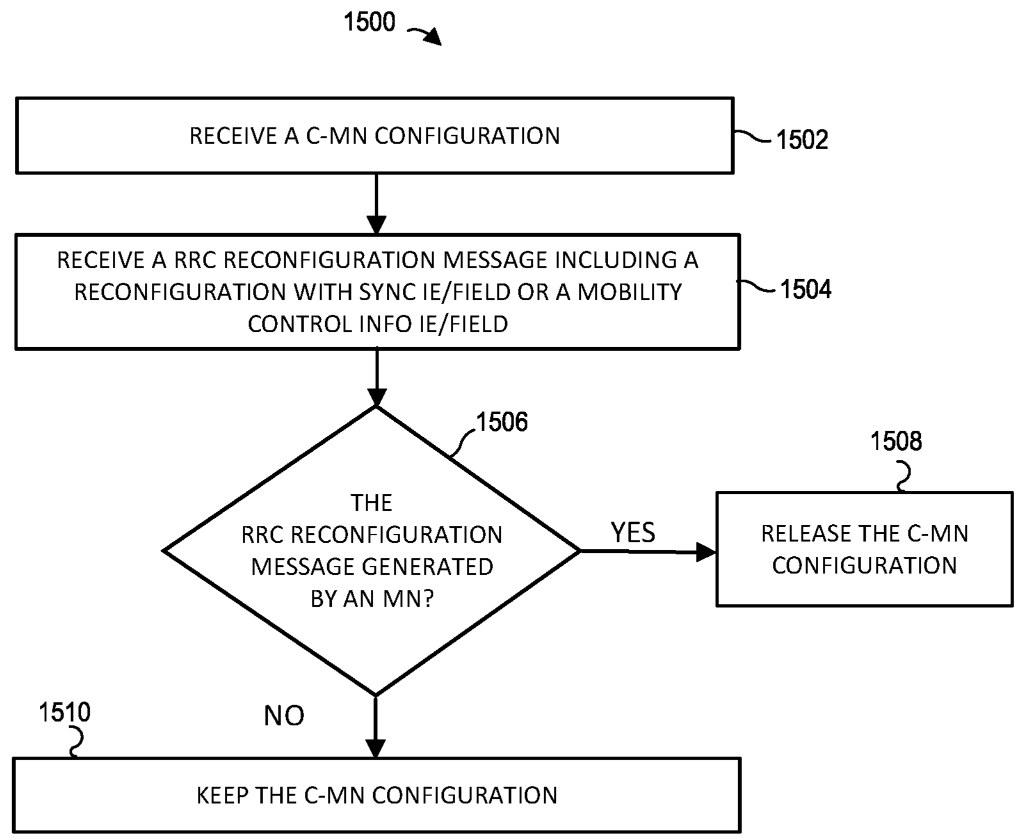
FIG. 15 is a flow diagram of an example method in the UE of this disclosure for determining whether the UE should retain or release C-MN configuration after receiving an RRC reconfiguration message.

Now referring to FIG. 15, an example method 1500 for performing an immediate handover and retaining or releasing a conditional base station configuration can be implemented in a UE such as the UE 102 discussed above. According to this method, the UE determines whether an RRC reconfiguration pertains to an immediate handover or an immediate PSCell addition or change, and retains or releases C-MN configuration based on this determination.

The method 1500 begins at block 1502, where the UE receives a C-MN configuration. The UE at block 1504 receives an RRC reconfiguration message including a reconfiguration with sync IE/field or a mobility control info IE/field. In various scenarios, the RRC reconfiguration message is a handover command for immediate handover or a PSCell addition or change command for immediate PSCell addition or change. At block 1506, the UE determines whether the RRC reconfiguration message was generated by an MN (and thus the RRC reconfiguration message is a handover command or relates to a handover). If the RRC reconfiguration message was generated by an MN, the flow proceeds to block 1508, where the UE releases the C-MN configuration. Otherwise, when the RRC reconfiguration message was not generated by an MN (and thus the RRC reconfiguration pertains to an immediate PSCell addition or change), the flow proceeds to block 510, where the UE retains the C-MN configuration.

Figure 16A:
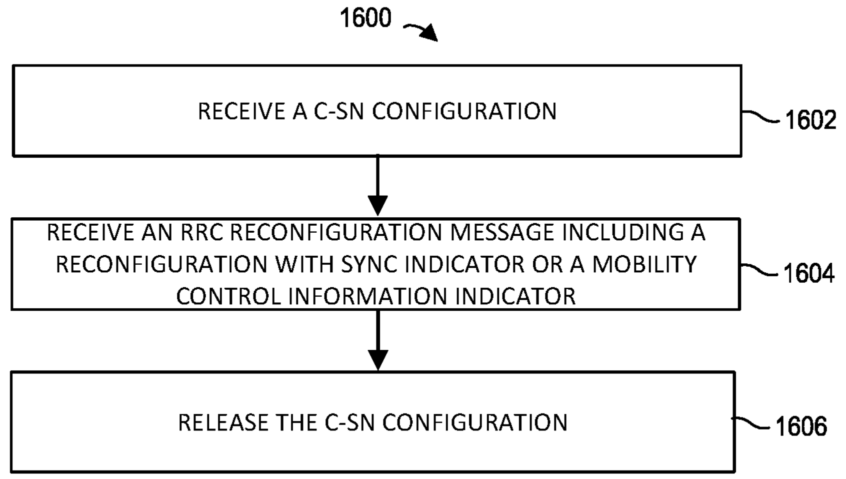
FIG. 16A is a flow diagram of an example method for releasing C-SN configuration in response to receiving an RRC reconfiguration message, which can be implemented in the UE of this disclosure.

Next, FIG. 16A illustrates an example method 1600 for managing a stored C-SN configuration, which can be implemented in a UE such as the UE 102. The method 1600 begins at block 1602, where the UE receives a C-SN configuration. The UE at block 1604 receives an RRC reconfiguration message including a reconfiguration with sync field/IE or a mobility control info field or IE. At block 1606, the UE releases the C-SN configuration.

Figure 16B:
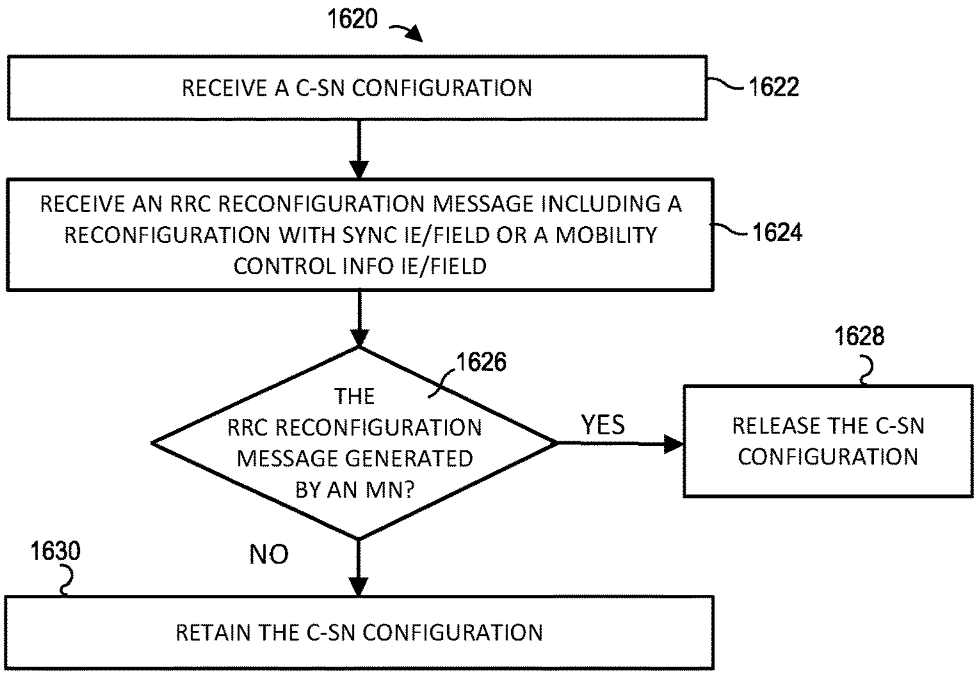
FIG. 16B is a flow diagram of an example method in the UE of this disclosure for determining whether the UE should retain or release C-SN configuration after receiving an RRC reconfiguration message.

FIG. 16B depicts an example method 1620 for managing a stored C-SN configuration, which can be implemented in a UE such as the UE 102. The method 1620 begins at block 1622, where the UE receives a C-SN configuration. The UE at block 1624 receives an RRC reconfiguration message including a reconfiguration with sync field/IE or a mobility control info field or IE. In some implementations, the RRC reconfiguration message is a handover command for immediate handover or a PSCell addition or change command for immediate PSCell addition or change. At block 1626, the UE determines whether the RRC reconfiguration message was generated by a MN (and thus the RRC reconfiguration message is a handover command for immediate handover). When the RRC reconfiguration message was generated by a MN, the flow proceeds to block 1628, where the UE releases the C-SN configuration. Otherwise, the flow proceeds to block 1630, where the UE retains the C-SN configuration.

Figure 16C:
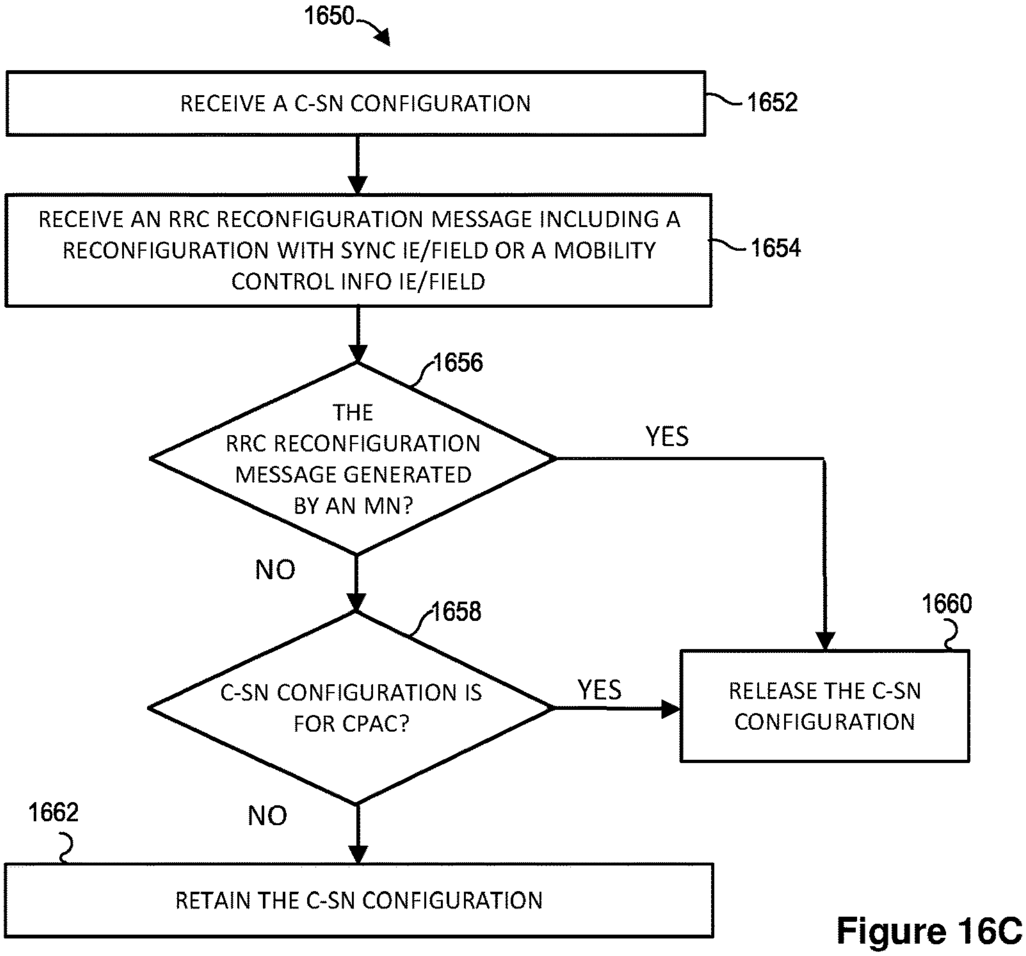
FIG. 16C is a flow diagram of an example method in the UE of this disclosure for determining whether the UE should retain or release conditional configuration after receiving an RRC reconfiguration message.

FIG. 16C illustrates an example method 1650 for managing a stored C-SN configuration, which can be implemented in a UE. The method 1650 begins at block 1652, where the UE receives a C-SN configuration. The UE at block 1654 receives an RRC reconfiguration message including a reconfiguration with sync field/IE or a mobility control info field or IE. In some implementations, the RRC reconfiguration message is a handover command for immediate handover or a PSCell addition or change command for immediate PSCell addition or change. At block 1656, the UE determines whether the RRC reconfiguration message is generated by a MN (and thus the RRC reconfiguration message is a handover command or pertains to handover) and, if so, the flow proceeds to block 1660, where the UE releases the C-SN configuration. Otherwise, the flow proceeds to block 1658, where the UE determines whether the stored C-SN configuration pertains to CPAC or another conditional procedure. If the stored C-SN configuration pertains to CPAC, the flow proceeds to block 1660. Otherwise, the flow proceeds to block 1662, and the UE retains the C-SN configuration.

Figure 17:
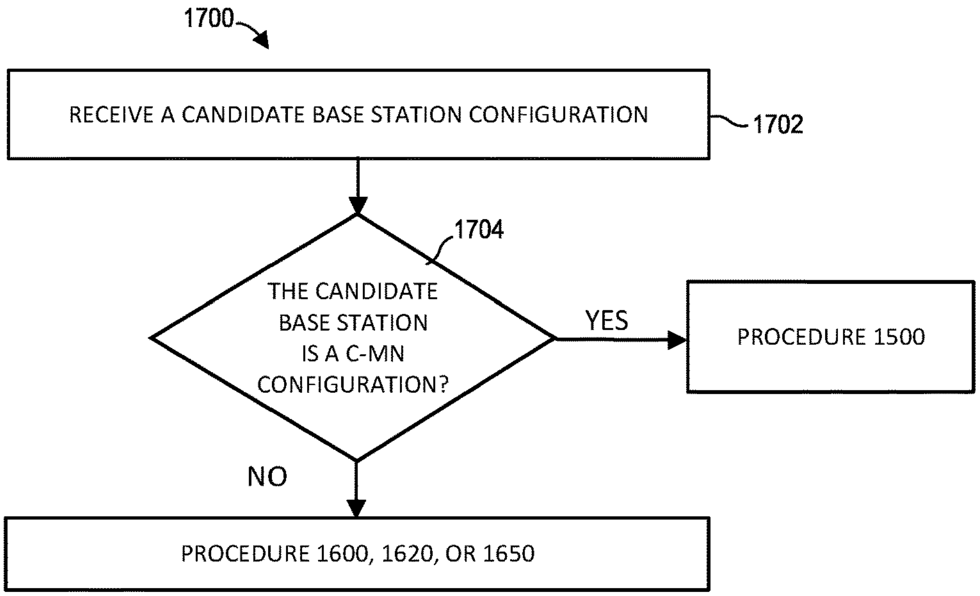
FIG. 17 is a flow diagram of an example method for managing stored C-SN configuration, which can be implemented in the UE of this disclosure.

FIG. 17 illustrates an example method 1700 for determining whether the UE should execute one of the method discussed above, which can be implemented in a UE. The method 1700 begins at block 1702, where the UE receives a candidate base station configuration. The UE at block 1704 determines whether the candidate base station configuration is a C-MN configuration and, if so, the UE executes the method 1500 of FIG. 15. Otherwise, the UE executes a method 1600, 1620, or 1650 discussed above.

Figure 18:
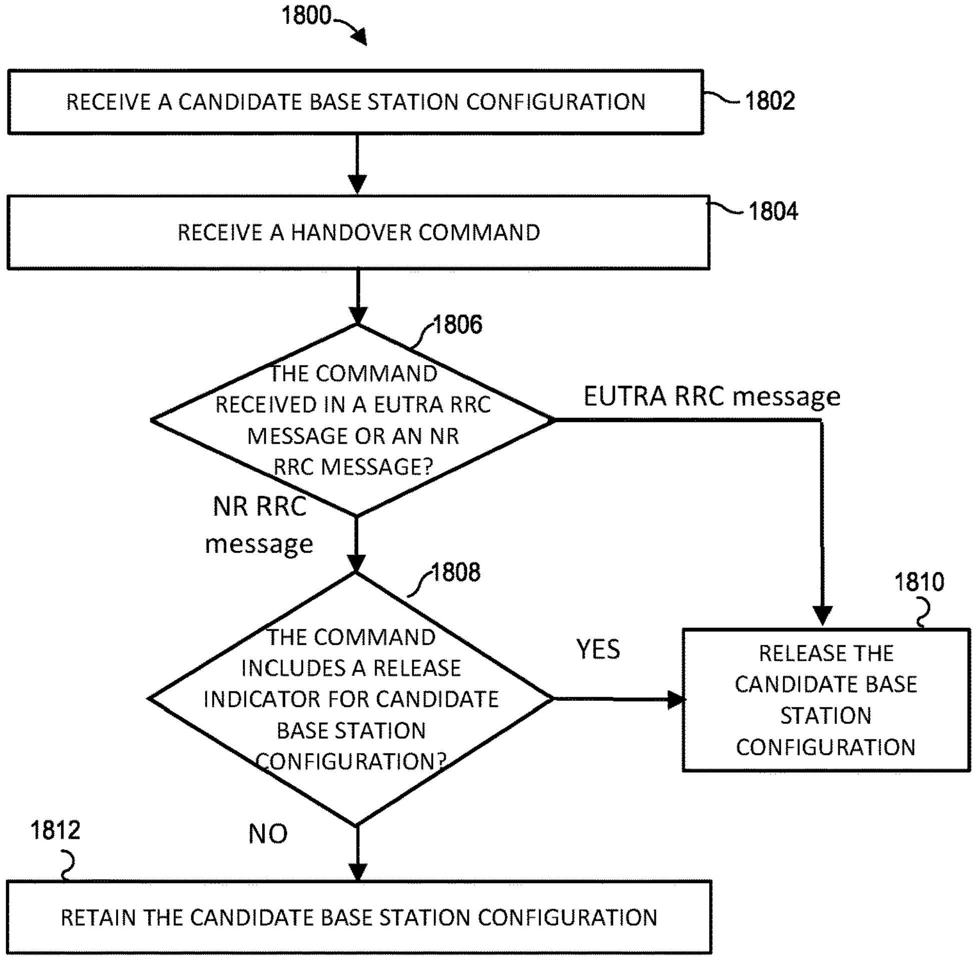
FIG. 18 is a flow diagram of an example method for managing stored conditional configuration after receiving a handover command, which can be implemented in the UE of this disclosure.

FIG. 18 illustrates an example method 1800 for managing a stored candidate base station configuration when receiving a handover command for immediate handover, which can be implemented in a UE. According to this method, the UE determines whether it should retain or release a candidate base station configuration (i.e., conditional configuration) in view of the RAT via which the UE received the handover command.

The method 1800 begins at block 1802, where the UE receives a candidate base station configuration. At block 1802, the UE receives a handover command. Next, at block 1806, the UE determines whether the handover command arrived in an EUTRA RRC message or an NR RRC message. If the handover command arrived in an EUTRA RRC message, the UE at block 1810 releases the candidate base station configuration. On the other hand, if the handover command arrived in an NR RRC message, the UE at block 1808 determines whether the handover command includes a release indicator for a candidate base station configuration. If the release indicator is present, the flow proceeds to block 1810. Otherwise, the UE retains the candidate base station configuration at block 1812.

Figure 19:
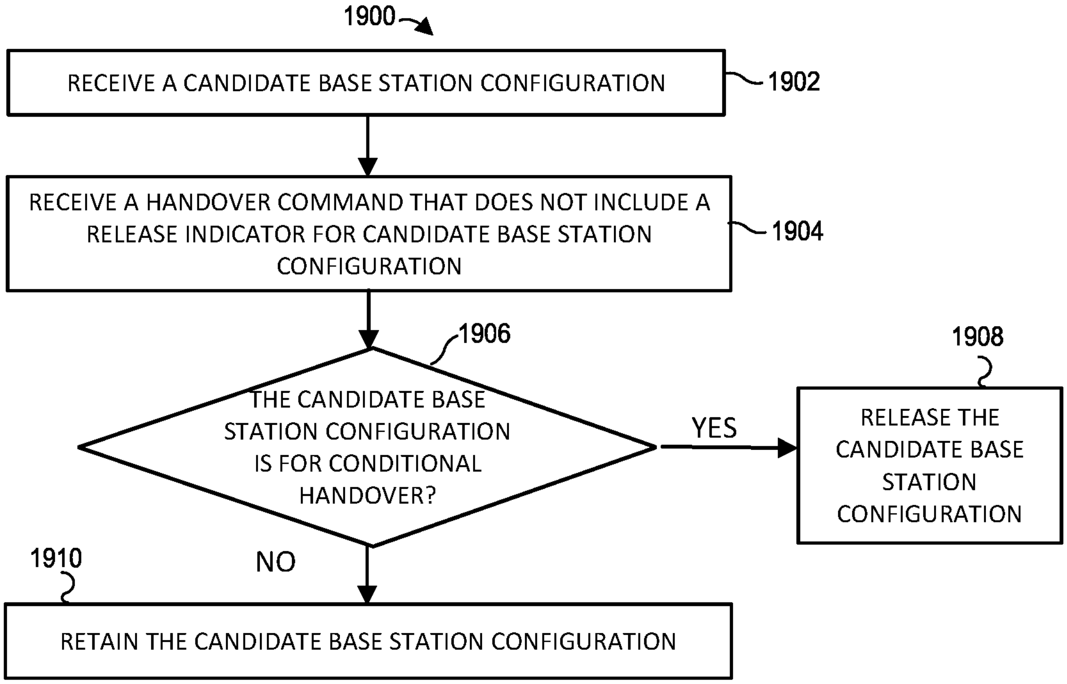
FIG. 19 is a flow diagram of an example method for managing stored conditional configuration after receiving a handover command that does not include a release indicator for conditional configuration, which can be implemented in the UE of this disclosure.

FIG. 19 illustrates another example method 1900 for managing a stored candidate base station configuration after processing a handover command for immediate handover, which can be implemented in a UE. According to this technique, the UE determines whether it should release or retain a previously received candidate base station configuration based on the type of a conditional procedure to which the candidate base station pertains.

The method 1900 begins at block 1902, where the UE receives a candidate base station configuration. The UE at block 1904 receives a handover command that does not include a release indicator for a candidate base station configuration. At block 1906, the UE determines whether the prior candidate base station configuration is for conditional handover and, if so, the UE releases the stored candidate base station configuration at block 1908 (as discussed above, the handover command also can include new candidate base station, which the UE can manage differently). When the UE determines at block 1906 that the stored candidate base station configuration is not for a conditional handover, the flow proceeds to block 1910, where the UE retains the candidate base station configuration.

Figure 20:
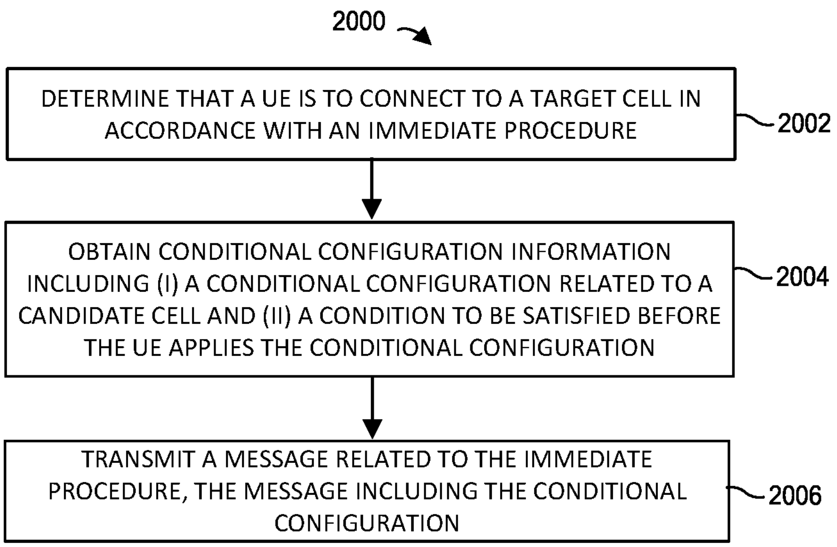
FIG. 20 is a flow diagram of an example method for configuring an immediate and a conditional procedure, which can be implemented in a base station of this disclosure.

For further clarity, FIG. 20 illustrates a flow diagram of an example method 2000 for configuring an immediate and a conditional procedure, which can be implemented in a base station of this disclosure. The method 2000 begins at block 2002, where the base station determines that a UE is to connect to a target cell in accordance with an immediate procedure (event 311 of FIGS. 3A and 3B; event 411 of FIG. 4; event 512 of FIG. 5; event 620 of FIG. 6A; event 621 of FIGS. 6B and 6C; event 732 of FIGS. 7A and 7B; event 839 of FIGS. 8A and 8B). At block 2004, the base station obtains conditional configuration information including (i) a conditional configuration related to a candidate cell operating in the RAN, and (ii) a condition to be satisfied before the UE applies the conditional configuration (event 316 of FIGS. 3A and 3B; event 412 of FIG. 4; event 512 of FIG. 5; event 628 of FIG. 6A; event 733 of FIGS. 7A and 7B; event 852 of FIGS. 8A and 8B). At block 2006, the base station transmits a message related to the immediate procedure, and includes the conditional configuration in the message (event 318 of FIGS. 3A and 3B; event 417 of FIG. 4; event 517 of FIG. 5; event 645 of FIG. 6A; event 647 of FIGS. 6B and 6C; event 734 of FIGS. 7A and 7B; event 835 of FIGS. 8A and 8B).

Figure 21:
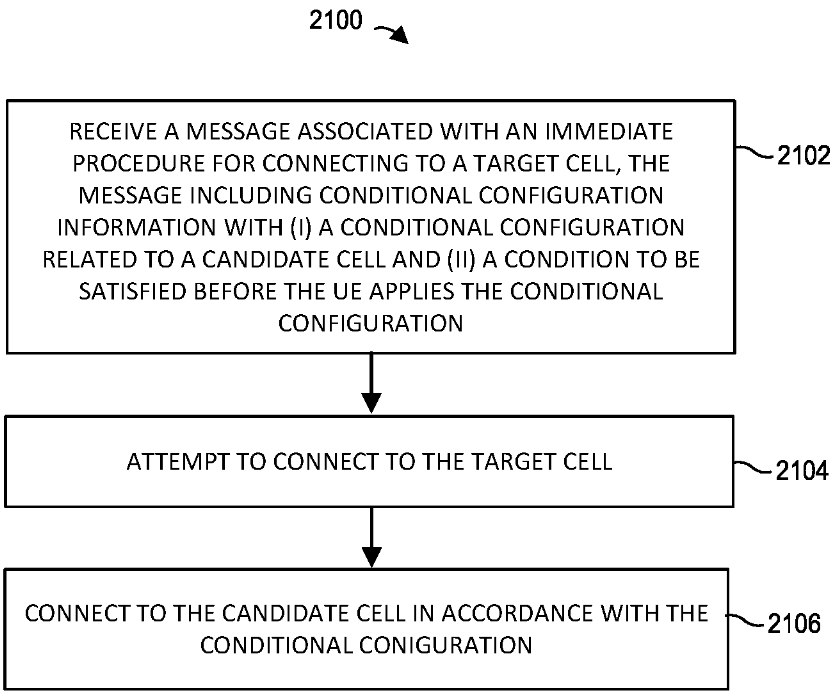
FIG. 21 is a flow diagram of an example method for managing configuration for an immediate and a conditional procedure, which can be implemented in a UE of this disclosure.

FIG. 21 is a flow diagram of an example method 2100 for managing configuration for an immediate and a conditional procedure, which can be implemented in a UE of this disclosure. At block 2102, the UE receives, from a base station, a message associated with an immediate procedure for connecting to a target cell, the message including conditional configuration information with (i) a conditional configuration related to a candidate cell and (ii) a condition to be satisfied before the UE applies the conditional configuration during a conditional procedure (event 318 of FIGS. 3A and 3B; event 418 of FIG. 4; event 518 of FIG. 5; event 646 of FIG. 6A; event 648 of FIGS. 6B and 6C; event 736 of FIGS. 7A and 7B; event 835 of FIGS. 8A and 8B).

At block 2104, the UE attempts to connect to the target cell in response to the message (event 350 of FIG. 3A; event 371 of FIG. 3B; event 450 of FIG. 4; event 550 of FIG. 5; event 653 of FIGS. 6A-C; event 754 of FIG. 7A; event 771 of FIG. 7B; event 854 of FIG. 8A; event 871 of FIG. 8B).

At block 2106, the UE connects to the candidate cell in accordance with the conditional configuration, subsequently to the attempt to connect to the target cell, which may be successful or unsuccessful (event 380 or 390 of FIGS. 3A and 3B; event 480 or 490 of FIG. 4; event 580 or 590 of FIG. 5; event 682 or 692 of FIG. 6A; event 683 or 693 of FIGS. 6B and 6C; event 784 or 794 of FIGS. 7A and 7B; event 885 or 895 of FIGS. 8A and 8B).

Next, several example techniques that a DU of this disclosure can implement are discussed with reference to FIGS. 22-24.

Figure 22:
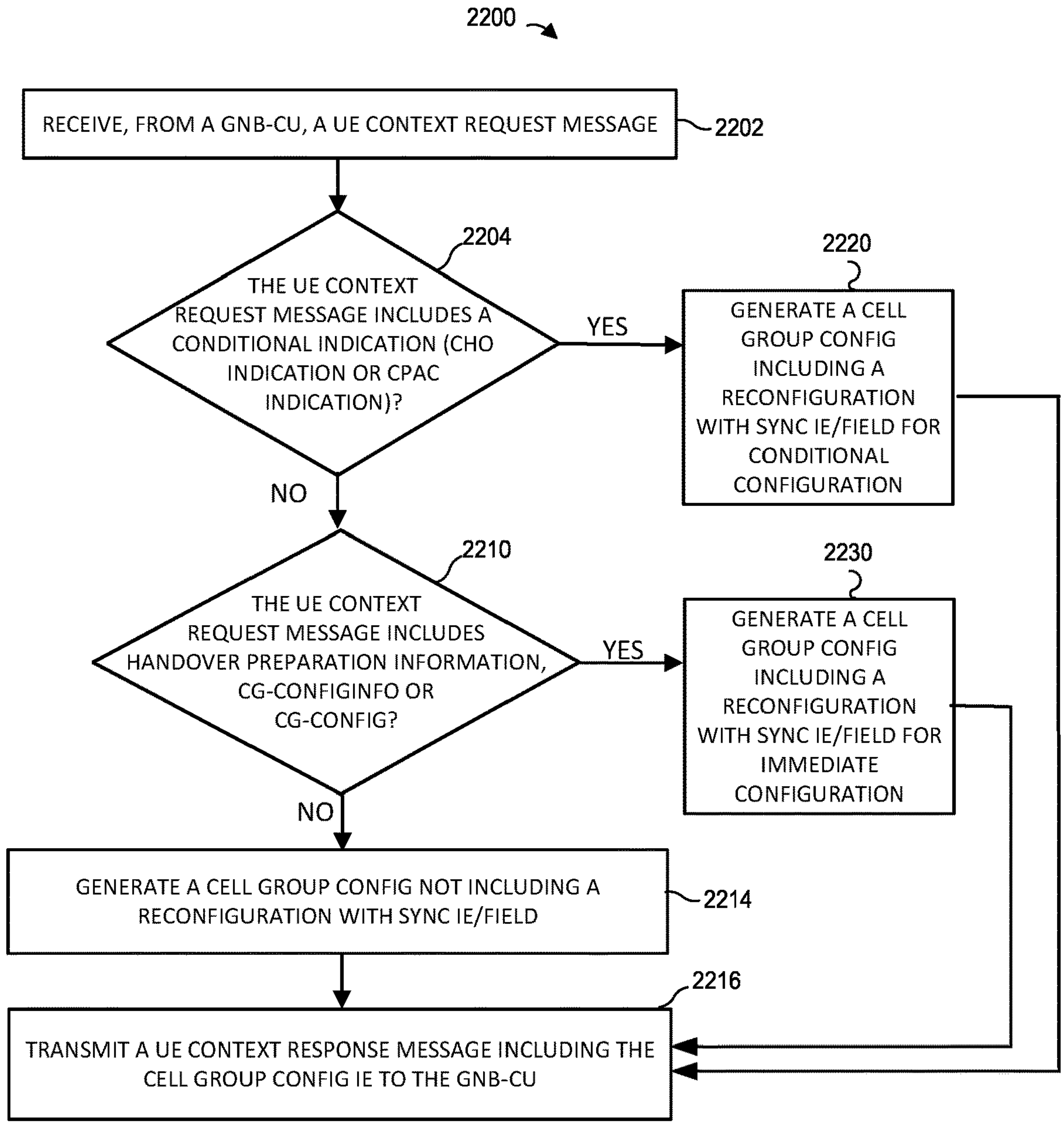
FIG. 22 is a flow diagram of an example method for generating configuration for an immediate or a conditional procedure, which can be implemented in a DU of this disclosure.

FIG. 22 is a flow diagram of an example method 2200 for generating configuration for an immediate or a conditional procedure, which can be implemented in a DU of this disclosure. At block 2202, the DU receives, from a gNB-CU, a UE Context Request message (e.g., event 625 or 627 of FIG. 6A, 6B, or 6C). The UE Context Request message can be for example a UE Context Setup Request message or the UE Context Modification Request message that conforms to TS 38.473. At block 2204, the DU determines whether the UE Context Request message includes a conditional indication (CHO Indication or CPAC Indication) and, if so, the DU generates a cell group configuration (e.g. CellGroupConfig IE) including a Reconfiguration with Sync IE/field for conditional configuration at block 2220. The DU at block 2216 transmits a UE Context Response message including the cell group configuration generated at block 2220 to the gNB-CU (event 628 of FIGS. 6A, 6B, and 6C). The UE Context Response message can be the UE Context Setup Response message or the UE Context Modification Response message that conforms to TS 38.473. When the DU determines at block 2204 that the UE Context Request message does not include a Conditional Indication, the flow proceeds to block 2210, where the DU further determines whether the UE Context Request message includes handover preparation information (e.g. HandoverPreparationInformation IE), a CG-ConfigInfo IE, or a CG-Config IE. When the message includes handover preparation information, the flow proceeds to block 2230, where the DU generates a cell group configuration (e.g. CellGroupConfig IE) including a Reconfiguration with Sync IE/field for immediate configuration. The DU at block 2216 transmits a UE Context Response message including the cell group configuration generated at block 2230 to the gNB-CU (event 626 of FIGS.

6A, 6B, and 6C). If, at block 2210, the DU determines that the message does not include handover preparation information, the DU generates a cell group configuration (e.g. CellGroupConfig IE) without a reconfiguration with sync IE/field, at block 2214. The DU at block 2216 transmits to the gNB-CU a UE Context Response message including the cell group configuration generated at block 2214.

Figure 23:
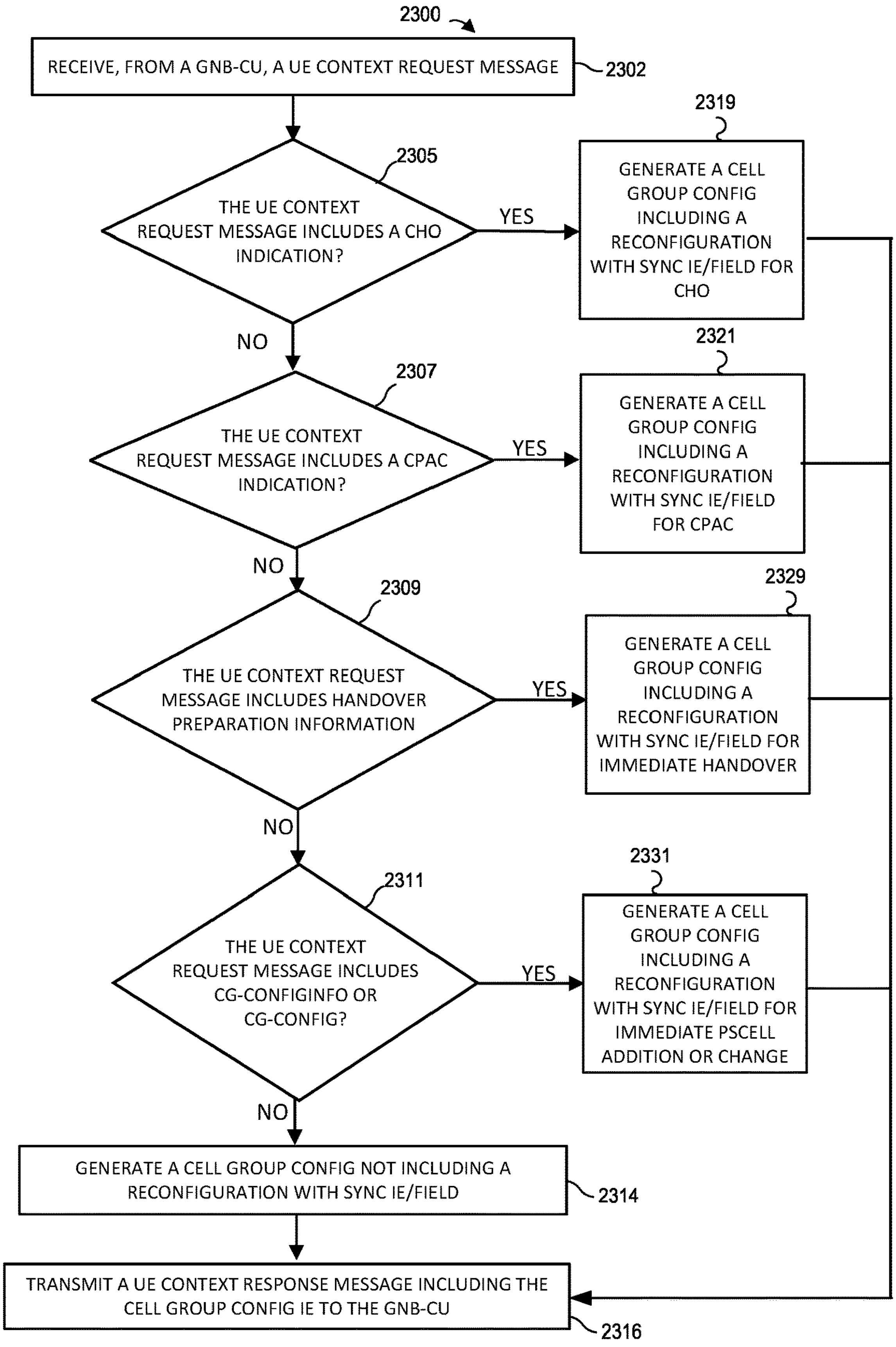
FIG. 23 is a flow diagram of another example method for generating configuration for an immediate or a conditional procedure, which can be implemented in a DU of this disclosure.

FIG. 23 is a flow diagram of another example method 2300 for generating configuration for an immediate or a conditional procedure, which can be implemented in a DU of this disclosure. At block 2302, the DU receives, from a gNB-CU, a UE Context Request message (e.g., event 625 or 627 of FIGS. 6A, 6B, and 6C). At block 2305, the DU determines whether the UE Context Request message includes a CHO Indication and, if so, the DU generates a cell group configuration (e.g. CellGroupConfig IE) including a reconfiguration with sync IE/field for conditional configuration at block 2319. The DU at block 2316 transmits a UE Context Response message including the cell group configuration generated at block 2319 to the gNB-CU (event 628 of FIG. 6A). When the DU determines at block 2305 that the UE Context Request message does not include a CHO Indication, the flow proceeds to block 2307, where the DU further determines whether the UE Context Request message includes a CPAC indication. When the message includes a CPAC indication, the flow proceeds to block 2321, where the DU generates a cell group configuration (e.g. CellGroupConfig IE) including a reconfiguration with sync IE/field for CPAC. The DU at block 2316 transmits a UE Context Response message including the cell group configuration generated at block 2321 to the gNB-CU (event 628 of FIGS. 6B and 6C). If the DU at block 2307 determines that the message not include a CPAC indication, the DU further checks at block 2309 whether the UE Context Request message includes handover preparation information and if so, the flow proceeds to block 2329, where the DU generates a cell group configuration (e.g. CellGroupConfig IE) including a reconfiguration with sync IE/field for immediate handover. The DU at block 2316 transmits a UE Context Response message including the cell group configuration generated at block 2329 to the gNB-CU (event 626 of FIG. 6A). Otherwise, when the message does not include handover preparation information (block 2309), the DU determines at block 2311 whether the UE Context Request message includes a CG-ConfigInfo or a CG-Config IE and, if so, the DU generates a cell group configuration (e.g. CellGroupConfig IE) including a reconfiguration with sync IE/field for immediate PSCell Addition or Change at block 2331. The DU then at block 2316 transmits a UE Context Response message including the cell group configuration generated at block 2331 to the gNB-CU (event 626 of FIGS. 6B and 6C). If the DU determines at block 2311 that the UE Context Request message does not include a CG-ConfigInfo or a CG-Config IE, the DU generates a cell group configuration (e.g. CellGroupConfig IE) without a reconfiguration with sync IE/field, at block 2314. Then, the DU at block 2316 transmits a UE Context Response message including the cell group configuration generated at block 2314 to the gNB-CU.

Figures 1, 24:
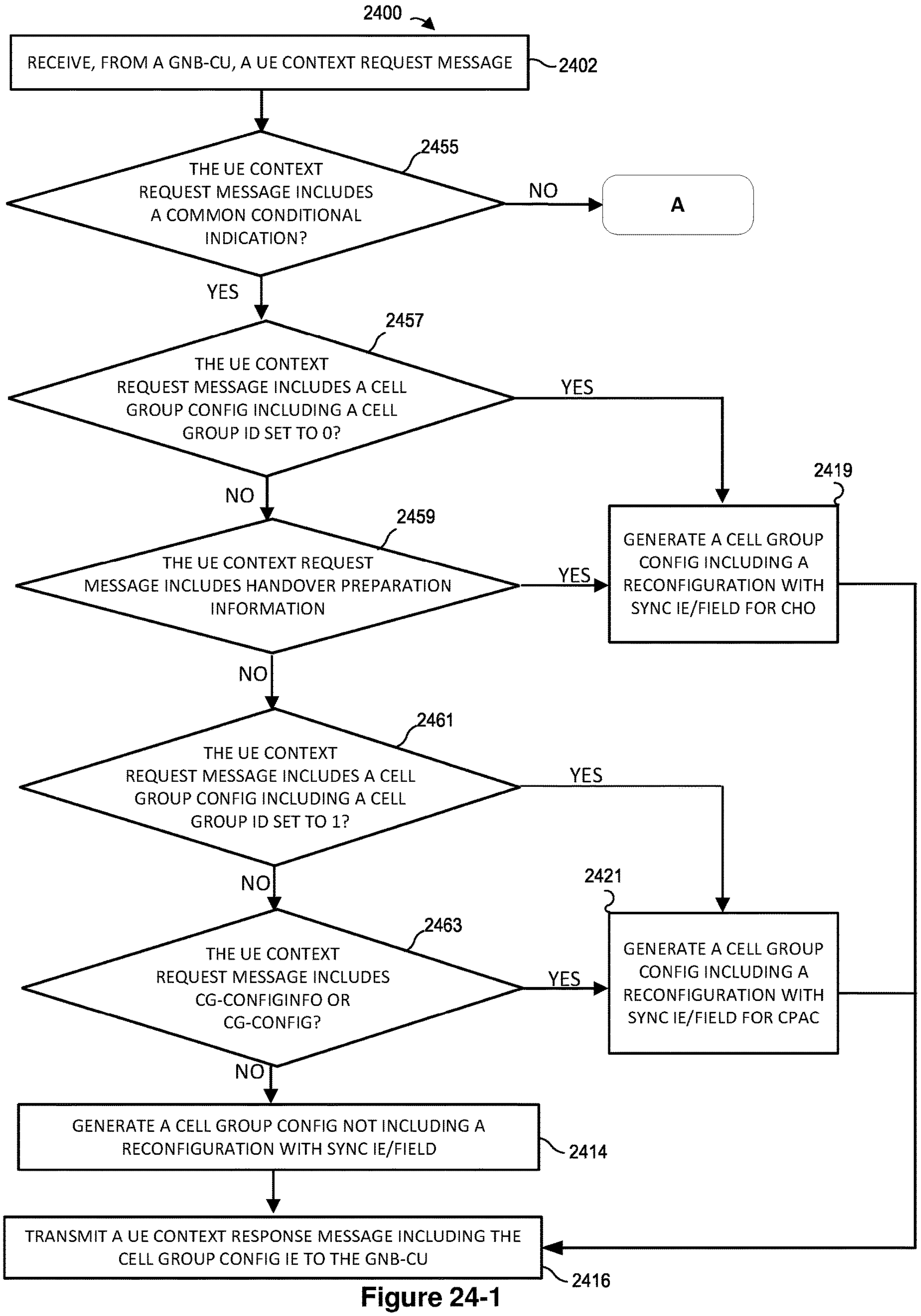
Figures 2, 24:
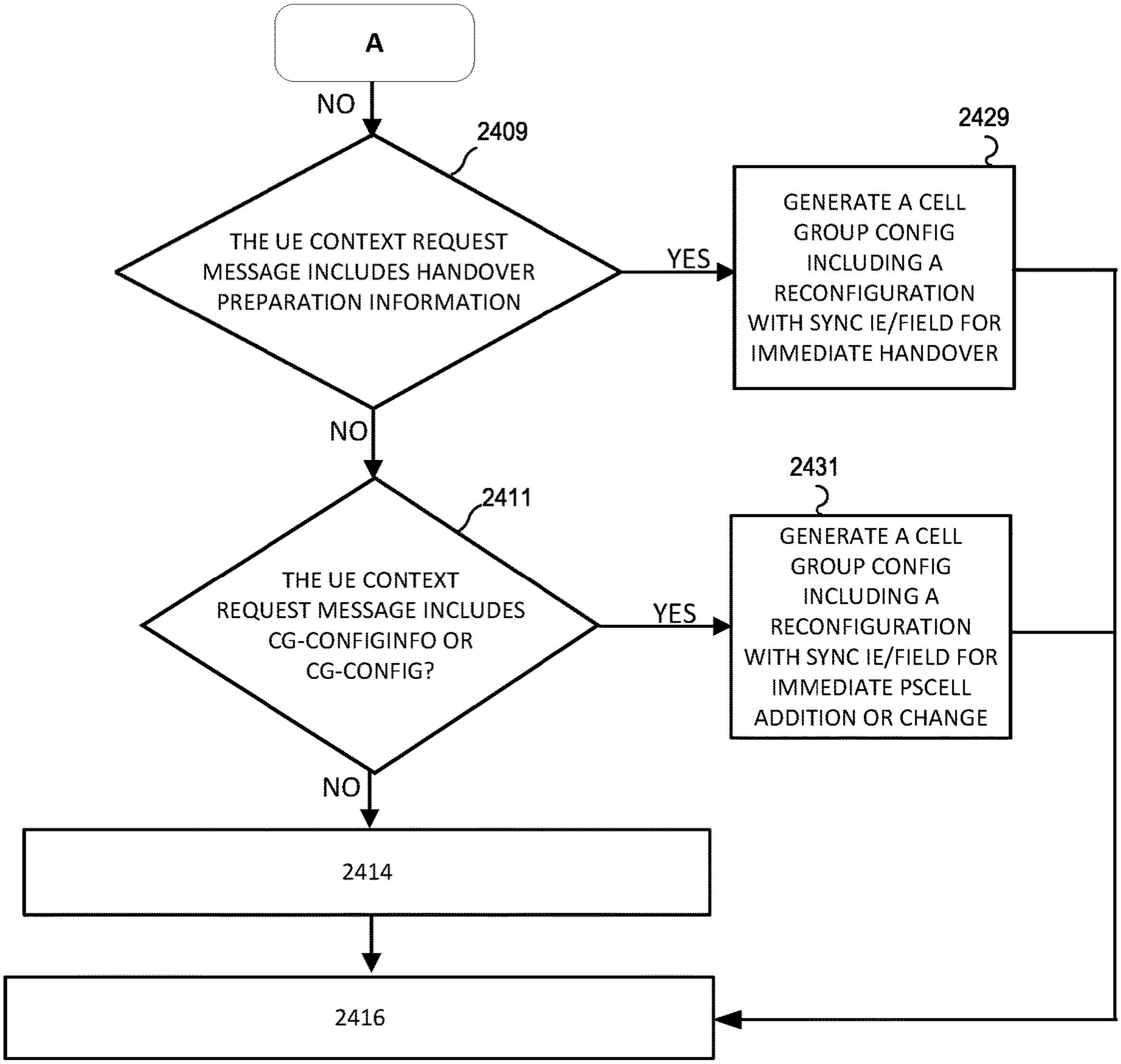

FIGS. 24-1 and 24-2 illustrate a flow diagram of yet another example method 2400 for generating configuration for an immediate or a conditional procedure, which can be implemented in a DU of this disclosure. At block 2402, the DU receives, from a gNB-CU, a UE Context Request message (e.g., event 625 or 627 of FIGS. 6A, 6B, and 6C). At block 2455, the DU determines whether the UE Context Request message includes a common conditional indication. The flow proceeds to block A, illustrated in FIG. 24-2, when the UE Context Request message does not include a common conditional indication. In particular, at block 2409, the DU determines whether the UE Context Request message includes handover preparation information and, if so, the flow proceeds to block 2429.

The DU at block 2429 generates a cell group configuration (e.g. CellGroupConfig 1E) including a reconfiguration with sync IE/field for immediate handover. The DU at block 2416 then transmits a UE Context Response message including the cell group configuration generated at block 2429 to the gNB-CU (event 626 of FIG. 6A). Otherwise, the flow proceeds to block 2411, where the DU further determines whether the UE Context Request message includes a CG-ConfigInfo or CG-Config IE. If the message includes such an IE, the flow proceeds to block 2431, where the DU generates a cell group configuration (e.g. CellGroupConfig IE) including a reconfiguration with sync IE/field for immediate PSCell Addition or Change. The DU then at block 2416 transmits a UE Context Response message including the cell group configuration generated at block 2431 to the gNB-CU (event 626 of FIGS. 6B and 6C). If the UE at block 2411 determines that the message does not include a CG-ConfigInfo or CG-Config IE, the flow proceeds to block 2414, where the DU generates a cell group configuration without a reconfiguration with sync IE/field. The DU at block 2416 transmits UE Context Response message including the cell group configuration generated at block 2414 to the gNB-CU.

Referring again to FIG. 24-1, if the DU determines at block 2455 that the UE Context Request message includes a common conditional indication, the flow proceeds to block 2457, where the DU further determines whether the UE Context Request message includes a cell group configuration with a Cell Group ID set to 0. When the result of this determination is yes, the flow proceeds to block 2419 where the DU generates a cell group configuration (e.g. CellGroupConfig IE) including a reconfiguration with sync IE/field for CHO. The DU at block 2316 then transmits a UE Context Response message including the cell group configuration generated at block 2419 to the gNB-CU (event 626 of FIG. 6A).

If the result of the determination at block 2457 is no, the DU the determination is NO, the DU further checks whether the UE Context Request message includes handover preparation information and if so, the flow proceeds to block 2419. The DU at block 2416 transmits a UE Context Response message including the cell group configuration generated at block 2419 to the gNB-CU (event 628 of FIG. 6A). If at block 2459 the result of the determination is no, the DU at block 2461 further determines whether the UE Context Request message includes a cell group configuration with a Cell Group ID set to 1 and, if so, the DU generates a cell group configuration (e.g. CellGroupConfig IE) including a reconfiguration with sync IE/field for conditional CPAC at block 2421. The DU at block 2416 transmits a UE Context Response message including the cell group configuration generated at block 2421 to the gNB-CU (event 628 of FIG. 6B or 6C). If at block 2461 the result of the determination is no, the DU at block 2463 determines whether the UE Context Request message includes a CG-ConfigInfo or CG-Config and, if so, proceeds to block 2421 and then to block 2416 (event 628 of FIG. 6B or 6C). If the result of the determination at block 2463 is no, the DU generates a cell group configuration not including a reconfiguration with sync IE/field at block 2414. The DU then at block 2416 transmits a UE Context Response message including the cell group configuration generated at block 2414 to the gNB-CU.

The following description may be applied to the description above.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

The following list of examples reflects another additional embodiments explicitly contemplated by the present disclosure.

Example 1. A method in a base station operating in a RAN, for configuring a UE, includes: determining, by processing hardware, that the UE is to connect to a target cell in the RAN in accordance with an immediate procedure; obtaining, by the processing hardware, conditional configuration information including (i) a conditional configuration related to a candidate cell operating in the RAN, and (ii) a condition to be satisfied before the UE applies the conditional configuration; and transmitting, by the processing hardware, a message related to the immediate procedure and including the conditional configuration.

Example 2. The method of example 1, wherein determining that the UE is to connect to the target cell includes receiving a handover request from a source base station; and transmitting the message includes transmitting an acknowledgement of the handover request to the source base station.

Example 3. The method of example 2, wherein the handover request is a first handover request; the method further comprising: determining, subsequently to receiving the handover request, that the UE should hand over to a candidate base station distinct from the base station in accordance with the conditional configuration, subject to the condition; transmitting a second handover request to the candidate base station; receiving, from the candidate base station, the conditional configuration in an acknowledgement of the second handover request.

Example 4. The method of example 2, wherein the candidate cell is a candidate primary cell associated with the base station; and obtaining the conditional configuration information includes generating, at the base station, the conditional configuration for the candidate primary cell.

Example 5. The method of example 3 or 4, wherein the acknowledgement of the handover request to the source base station includes a handover command to be forwarded to the UE, the handover command including the conditional configuration.

Example 6. The method of example 1, wherein the target cell is a target primary cell (PCell) or a target primary secondary cell (PSCell) associated with the base station; the candidate cell is a candidate PCell or a candidate PSCell associated with the base station; and obtaining the conditional configuration information includes generating the configuration information at the base station.

Example 7. The method of example 6, the target cell is associated with a first distributed unit (DU) of the base station; the candidate cell is associated with a second DU of the base station; and obtaining the conditional configuration information includes generating the configuration information at a central unit (CU) of the base station.

Examples 8. The method of example 6 or 7, wherein transmitting the message includes transmitting a handover command to the UE.

Example 9. The method of example 7, wherein the base station operates as a secondary node (SN) to provide dual connectivity (DC) to the UE; and transmitting the message includes transmitting, to the UE, a command to reconfigure a radio connection, the command associated with a protocol for managing radio resources.

Example 10. The method of example 1, wherein determining that the UE is to connect to the target cell includes receiving an SN addition request from an MN; and transmitting the message includes transmitting an acknowledgement of the SN addition request to the MN.

Example 11. The method of example 10, wherein the acknowledgement of the SN addition request includes a command to reconfigure a radio connection, to be forwarded to the UE, the command including the conditional configuration.

Example 12. The method of example 1, wherein the determining and the obtaining are performed at the base station operating as an MN; the method further comprising: transmitting, to a target SN with which the target cell is associated, an SN addition request, with the conditional configuration; and transmitting, to a candidate SN with which the candidate cell is associated, an SN addition or change request.

Example 13. The method of example 12, further comprising: transmitting, to the UE, a container message associated with a protocol for managing radio resources, the container message including configuration related to the immediate procedure and the conditional configuration.

Example 14. The method of any of the preceding examples, wherein obtaining the conditional configuration includes: receiving, at a distributed unit (DU) of the base station from a central unit (CU) of the base station, a UE context request message; transmitting, in response to the UE context request message, a UE context setup message including a cell group configuration included in the conditional configuration.

Example 15. The method of example 14, further comprising: generating, at the DU, the cell group configuration for the conditional configuration in response to determining that the UE context request message includes a conditional indication.

Example 16. The method of example 14, further comprising: including a reconfiguration with sync indication in the cell group configuration.

Example 17. The method of example 14, further comprising:

generating, at the DU, the cell group configuration for a conditional handover in response to determining that the UE context request message includes a conditional handover indication.

Example 18. The method of example 14, further comprising: generating, at the DU, the cell group configuration for a conditional handover in response to determining that the UE context request message includes a cell group identifier set to zero.

Example 19. The method of example 14, further comprising: generating, at the DU, the cell group configuration for conditional PSCell addition or change (CPAC) in response to determining that the UE context request message includes a CPAC indication.

Example 20. The method of example 14, further comprising: generating, at the DU, the cell group configuration for CPAC in response to determining that the UE context request message includes a cell group identifier set to one.

Example 21. A base station including processing hardware and configured to implement a method of any of examples 1-20.

Example 22. A method in a user equipment (UE) for mobility configuration, the method comprising: receiving, by processing hardware and from a base station, a message associated with an immediate procedure for connecting to a target cell, the message including conditional configuration information with (i) a conditional configuration related to a candidate cell and (ii) a condition to be satisfied before the UE applies the conditional configuration during a conditional procedure; attempting, by the processing hardware, to connect to the target cell in response to the message; and connecting to the candidate cell in accordance with the conditional configuration, subsequently to the attempting.

Example 23. The method of example 22, further comprising: failing to connect to the target cell; and connecting to the candidate cell in response to the failing.

Example 24. The method of example 23, including connecting to the candidate cell in response to the failing while the condition for applying the conditional configuration is not satisfied.

Example 25. The method of example 22, further comprising: failing to connect to the target cell; and initiating a procedure for periodically checking whether the condition is satisfied in response to the failing.

Example 26. The method of example 22, further comprising: successfully connecting to the target cell; and initiating a procedure for periodically checking whether the condition is satisfied in response to the successfully connecting.

Example 27. The method of example 22, wherein: the target cell is associated with a target base station; and the candidate cell is associated with a candidate base station distinct from the target base station.

Example 28. The method of example 22, wherein the target cell and the candidate cell are associated with a same base station.

Example 29. The method of example 22, wherein: the target cell is associated with a first distributed unit (DU) of the base station; and the candidate cell is associated with a second DU of the base station.

Example 30. The method of example 22, wherein receiving the message includes receiving a handover command.

Example 31. The method of example 22, wherein the conditional configuration relates to conditional handover.

Example 32. The method of example 22, wherein: receiving the message includes receiving a command to reconfigure a radio connection, the command associated with a protocol for managing radio resources.

Example 33. The method of example 32, wherein the immediate procedure and the conditional procedure are PSCell change procedures.

Example 34. The method of example 32, wherein: the immediate procedure and the conditional procedure are SN addition or change procedures.

Example 35. A user equipment (UE) including processing hardware and configured to implement a method of any of examples 22-34.

What is claimed is:

1. A method in a distributed unit, DU, of a distributed base station, for configuring a user equipment (UE), the method comprising:

receiving, from a central unit, CU, of the distributed base station, a UE context request message;

in a first instance, determining that the UE context request message includes a conditional indication related to a conditional procedure and generating, based on the conditional indication, configuration information related to the conditional procedure, including generating a cell group configuration with a reconfiguration with sync information element (IE) or field;

in a second instance, determining that the UE context request message does not include a conditional indication related to a conditional procedure and determining that the UE context request message includes a handover preparation information, generating, based on the handover preparation information, configuration information related to an immediate procedure, including generating a cell group configuration with a reconfiguration with sync IE or field; and transmitting, to the CU, a UE context response message including the configuration information.

2. The method of claim 1, wherein receiving the UE context request message includes receiving a UE Context Setup Request message.

3. The method of claim 1, wherein receiving the UE context request message includes receiving a UE Context Modification Request message.

4. The method of claim 1, wherein the conditional procedure is conditional handover.

5. The method of claim 1, wherein the conditional procedure is conditional Primary Secondary Cell, PSCell, change.

6. A method in a central unit (CU) of a distributed base station, for configuring a user equipment, UE, the method comprising:

transmitting, to a distributed unit (DU) of the distributed base station, a UE context request message;

in a first instance, including, in the UE context request message, a conditional indication related to a conditional procedure and receiving, based on the transmitting, a UE context response message including configuration information related to the conditional procedure, the configuration information including a cell group configuration with a reconfiguration with sync information element (IE) or field; and in a second instance, omitting from the UE context request message, a conditional indication related to a conditional procedure and including, in the UE context request message, a handover preparation information and receiving, based on the transmitting, a UE context response message including configuration information related to an immediate procedure with a reconfiguration with sync IE or field.

7. The method of claim 6, wherein transmitting the UE context request message includes transmitting a UE Context Setup Request message.

8. The method of claim 6, wherein transmitting the UE context request message includes transmitting a UE Context Modification Request message.

9. The method of claim 6, wherein the conditional procedure is conditional handover.

10. The method of claim 6, wherein the conditional procedure is conditional PSCell change.

11. A distributed unit (DU) of a base station, the DU including processing hardware and configured to:

receive, from a central unit (CU) of the distributed base station, a UE context request message;

in a first instance, determine that the UE context request message includes a conditional indication related to a conditional procedure, generate, based on the conditional indication, configuration information related to the conditional procedure, including a cell group configuration with a reconfiguration with sync information element (IE) or field;

in a first instance, determine that the UE context request message does not include a conditional indication related to a conditional procedure and if the UE context request message includes a handover preparation information, generate, based on the handover preparation information, configuration information related to an immediate procedure including generate a cell group configuration with a reconfiguration with sync IE or field; and transmit, to the CU, a UE context response message including the configuration information.

12. The base station of claim 11, wherein the UE context request message is a UE Context Setup Request message.

13. The base station of claim 11, wherein the UE context request message is a UE Context Modification Request message.

14. The base station of claim 11, wherein the conditional procedure is conditional handover.

15. The base station of claim 11, wherein the conditional procedure is conditional Primary Secondary Cell, PSCell, change.

16. The base station of claim 11, further configured to:

receive a reconfiguration with sync indication in the cell group configuration.

* * * * *